United States Patent
Steendam et al.

(10) Patent No.: US 9,790,367 B2
(45) Date of Patent: Oct. 17, 2017

(54) POLYCARBONATE COMPOSITIONS FOR REDUCED SPLAY IN COMBINATION WITH SUSTAINED OR IMPROVED IMPACT RESISTANCE

(71) Applicant: SABIC Global Technologies B.V., Bergen op Zoom (NL)

(72) Inventors: Wilhelmus Johannes Daniel Steendam, Bergen op Zoom (NL); Chiel Albertus Leenders, Fijnaart (NL); Robert Walter Venderbosch, Bergen op Zoom (NL); Mark Adrianus Johannes Van Der Mee, Breda (NL); Sjoerd Franciscus Gerardus Maria Van Nispen, Oudenbosch (NL); Tony Farrell, Bergen op Zoom (NL)

(73) Assignee: SABIC Global Technologies B.V., Bergen Op Zoom (NL)

( * ) Notice: Subject to any disclaimer, the term of this patent is extended or adjusted under 35 U.S.C. 154(b) by 187 days.

(21) Appl. No.: 14/152,736

(22) Filed: Jan. 10, 2014

(65) Prior Publication Data

US 2014/0200303 A1    Jul. 17, 2014

Related U.S. Application Data

(60) Provisional application No. 61/751,611, filed on Jan. 11, 2013.

(51) Int. Cl.
   *C08L 83/08* (2006.01)
   *C08L 69/00* (2006.01)
   *C08G 77/448* (2006.01)
   *C08K 3/00* (2006.01)

(52) U.S. Cl.
   CPC .............. *C08L 83/08* (2013.01); *C08L 69/00* (2013.01); *C08G 77/448* (2013.01); *C08K 3/0033* (2013.01)

(58) Field of Classification Search
   CPC ....... C08L 83/08; C08L 69/00; C08G 77/448; C08K 3/0033

USPC ......................................... 524/451, 537, 508
See application file for complete search history.

(56) References Cited

U.S. PATENT DOCUMENTS

| | | | | |
|---|---|---|---|---|
| 5,637,643 | A | * 6/1997 | Umeda | ................... C08L 69/00 264/176.1 |
| 2006/0270767 | A1 | 11/2006 | Van Gisbergen et al. | |
| 2007/0161738 | A1 | 7/2007 | Chung et al. | |
| 2010/0010141 | A1* | 1/2010 | Nakamura | .............. C08L 69/00 524/451 |
| 2013/0069277 | A1 | 3/2013 | Nakaniwa et al. | |

FOREIGN PATENT DOCUMENTS

WO    WO2011114692 A1    9/2011

OTHER PUBLICATIONS

Paulson Training Program (www.paulsontraining.com/from-the-plastics-point-of-view-splay/)—Downloaded Apr. 7, 2016.*
Tan et al. "Further Study on the Miscibility of Poly(ethylene Terephthalate)-Polycarbonate Blends", J. Appl. Polym. Sci., vol. 48, 747-749, (1993).*
Hobbs et al. "Partial miscibility of poly(butylene terephthalate)/BPA polycarbonate melt blends", Polym. Bull. 17, 335-339 (1987).*

* cited by examiner

*Primary Examiner* — Bijan Ahvazi
*Assistant Examiner* — Ronald Grinsted
(74) *Attorney, Agent, or Firm* — Baker & Hostetler LLP

(57) ABSTRACT

Disclosed herein are methods and compositions of blended polycarbonate compositions with simultaneously decreased splay and improved impact characteristics. The resulting compositions, comprising one or more polycarbonate polymers, a splay reducer, and a filler, can be used in the manufacture of articles while still retaining the advantageous physical properties of blended polycarbonate compositions with decreased splay. This abstract is intended as a scanning tool for purposes of searching in the particular art and is not intended to be limiting of the present invention.

41 Claims, No Drawings

POLYCARBONATE COMPOSITIONS FOR REDUCED SPLAY IN COMBINATION WITH SUSTAINED OR IMPROVED IMPACT RESISTANCE

CROSS-REFERENCE TO RELATED APPLICATIONS

This application claims the benefit of U.S. Provisional Application No. 61/751,611, filed on Jan. 11, 2013, which is incorporated herein by reference in its entirety.

FIELD OF INVENTION

The present invention relates to blended polycarbonate compositions having improved impact properties and surface properties, e.g. decreased splay.

BACKGROUND OF THE INVENTION

Mineral fillers are probably the most widely used additives in thermoplastic resins. Commonly used mineral fillers include talc, wollastonite, clay and mica. These materials are typically employed for economic reasons, i.e., to reduce the cost of relatively high priced resins, and/or to impart a particular property to a resin; e.g., enhancement of specific properties such as impact strength, co-efficient of linear thermal expansion, tensile strength, tensile modulus, and flexural modulus. Use of mineral fillers in thermoplastic resins, with the concomitant improvement of properties described above can result in important improvements to articles manufactured using these resins such as reduced warpage in molded parts and articles fabricated from these formulations. The main challenge from a property balance perspective is to achieve high impact and toughness values in conjunction with stiffness and tensile strength properties as well as surface properties, e.g. splay, since these typically tend to go in opposing directions.

Accordingly, it would be beneficial to provide blended polycarbonate compositions comprising a mineral filler that have improved impact properties while retaining other desirable properties such as surface properties, particularly splay.

SUMMARY OF THE INVENTION

In one aspect, the invention relates to blended polycarbonate compositions comprising a filler, e.g. a talc, and a splay-reducing component, e.g. a polyester such as poly(alkylene terephthalate), to provide improved surface characteristics such as decreased splay. In various aspects, the invention relates to blended polycarbonate compositions comprising a polycarbonate component, e.g. a polycarbonate polymer, a poly(carbonate-siloxane) copolymer, or a combination thereof, a splay-reducing component, and a filler component, e.g. a talc filler.

In various further aspects, the invention relates to blended polycarbonate compositions comprising one or more polycarbonate polymers, an impact modifier, a polyethylene terephthalate and a talc filler. In a further aspect, the talc is a micronized talc with a submicron mean particle size. Thus, in a further aspect, the resulting compositions are therefore capable of being used in the production of articles wherein excellent impact properties are required in conjunction with a requirement for reduced splay to minimize production waste and cost.

In various aspects, the invention relates to blended polycarbonate compositions comprising surface-treated fillers such as talc along with a a splay-reducing component to provide both improved impact properties and surface properties. In a further aspect, the invention relates to blended polycarbonate compositions comprising surface-treated fillers such as talc along with a polyethylene terephthalate to provide both improved impact properties and surface properties. The combination of surface-treated fillers and a polyethylene terephthalate of the present invention improves the both the impact properties and surface properties. In various further aspects, the invention relates to blended polycarbonate compositions comprising one or more polycarbonate polymers, an impact modifier, a polyethylene terephthalate and a surface-treated talc composition. In a further aspect, the surface-treated talc is a micronized talc with a submicron mean particle size, which has been treated with a silane composition. Thus, in a further aspect, the resulting compositions are therefore capable of being used in the production of articles wherein excellent impact properties are required in conjunction with appropriate flow, stiffness, ductility and heat deflection properties.

In various aspects, the invention relates to blended polycarbonate compositions with improved surface characteristics comprising: (a) from about 65 wt % to about 94 wt % of a polycarbonate component comprising a polycarbonate polymer, a poly(carbonate-siloxane) copolymer, or a combination thereof; (b) from about 1 wt % to about 20 wt % of a splay-reducing component; and (c) from about 5 wt % to about 25 wt % of a filler component; wherein all weight percent values are based on the total weight of the composition; and wherein the composition exhibits a splay less than that of that of a reference composition consisting essentially of substantially the same proportions of the same polycarbonate component and the same filler component.

In various aspects, the invention relates to blended polycarbonate compositions with improved surface characteristics comprising: (a) from about 65 wt % to about 94 wt % of a polycarbonate component comprising a polycarbonate polymer, a poly(carbonate-siloxane) copolymer, or a combination thereof; (b) from about 1 wt % to about 20 wt % of a splay-reducing component comprising a polyester polymer, an (isophthalic acid-terephthalic acid-resorcinol)-bisphenol A copolyestercarbonate copolymer, or combinations thereof; and (c) from about 5 wt % to about 25 wt % of a filler component; wherein all weight percent values are based on the total weight of the composition; and wherein the composition exhibits a splay less than that of that of a reference composition consisting essentially of substantially the same proportions of the same polycarbonate component and the same filler component.

In a further aspect, described herein are blended polycarbonate compositions with improved surface characteristics comprising: from about 30 wt % to about 85 wt % of a polycarbonate component; from about 1 wt % to about 10 wt % of a poly(alkylene terephthalate) component; from about 10 wt % to about 30 wt % of an impact modifier component; and from about 5 wt % to about 25 wt % of a filler component; wherein all weight percent values are based on the total weight of the composition; and wherein the composition exhibits a splay less than that of that of a reference composition consisting essentially of substantially the same proportions of the same polycarbonate component, the same impact modifier component, and the same filler component.

In various further aspects, the invention relates to articles comprising the disclosed compositions.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE INVENTION

It is also to be understood that the terminology used herein is for the purpose of describing particular aspects only and is not intended to be limiting. As used in the specification and in the claims, the term "comprising" can include the embodiments "consisting of" and "consisting essentially of." Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a polycarbonate poly" includes mixtures of two or more polycarbonate polymers.

As used herein, the term "combination" is inclusive of blends, mixtures, alloys, reaction products, and the like.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally substituted alkyl" means that the alkyl group can or cannot be substituted and that the description includes both substituted and unsubstituted alkyl groups.

As used herein, the term "effective amount" refers to an amount that is sufficient to achieve the desired modification of a physical property of the composition or material. For example, an "effective amount" of a PET refers to an amount that is sufficient to achieve the desired improvement in the property modulated by the formulation component, e.g. splaying, under applicable test conditions and without adversely affecting other specified properties. The specific level in terms of wt % in a composition required as an effective amount will depend upon a variety of factors including the amount and type of polycarbonate, amount and type of impact modifier, amount and type of talc, and end use of the article made using the composition.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent ("wt %") of a component, unless specifically stated to the contrary, is based on the total weight of the formulation or composition in which the component is included. For example if a particular element or component in a composition or article is said to have 8% by weight, it is understood that this percentage is relative to a total compositional percentage of 100% by weight.

Compounds are described using standard nomenclature. For example, any position not substituted by any indicated group is understood to have its valence filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs.

The term "alkyl group" as used herein is a branched or unbranched saturated hydrocarbon group of 1 to 24 carbon atoms, such as methyl, ethyl, n propyl, isopropyl, n butyl, isobutyl, t butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "aralkyl" as used herein is an aryl group having an alkyl, alkynyl, or alkenyl group as defined above attached to the aromatic group. An example of an aralkyl group is a benzyl group.

The term "carbonate group" as used herein is represented by the formula OC(O)OR, where R can be hydrogen, an alkyl, alkenyl, alkynyl, aryl, aralkyl, cycloalkyl, halogenated alkyl, or heterocycloalkyl group described above.

The term "organic residue" defines a carbon containing residue, i.e., a residue comprising at least one carbon atom, and includes but is not limited to the carbon-containing groups, residues, or radicals defined hereinabove. Organic residues can contain various heteroatoms, or be bonded to another molecule through a heteroatom, including oxygen, nitrogen, sulfur, phosphorus, or the like. Examples of organic residues include but are not limited alkyl or substituted alkyls, alkoxy or substituted alkoxy, mono or di-substituted amino, amide groups, etc. Organic residues can preferably comprise 1 to 18 carbon atoms, 1 to 15, carbon atoms, 1 to 12 carbon atoms, 1 to 8 carbon atoms, 1 to 6 carbon atoms, or 1 to 4 carbon atoms. In a further aspect, an organic residue can comprise 2 to 18 carbon atoms, 2 to 15, carbon atoms, 2 to 12 carbon atoms, 2 to 8 carbon atoms, 2 to 4 carbon atoms, or 2 to 4 carbon atoms.

A very close synonym of the term "residue" is the term "radical," which as used in the specification and concluding claims, refers to a fragment, group, or substructure of a molecule described herein, regardless of how the molecule is prepared. For example, a 2,4-dihydroxyphenyl radical in a particular compound has the structure:

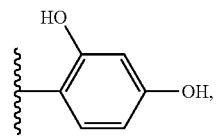 [SMILES: *c1ccc(O)cc1O]

regardless of whether 2,4-dihydroxyphenyl is used to prepare the compound. In some embodiments the radical (for example an alkyl) can be further modified (i.e., substituted alkyl) by having bonded thereto one or more "substituent radicals." The number of atoms in a given radical is not critical to the present invention unless it is indicated to the contrary elsewhere herein.

"Organic radicals," as the term is defined and used herein, contain one or more carbon atoms. An organic radical can have, for example, 1-26 carbon atoms, 1-18 carbon atoms, 1-12 carbon atoms, 1-8 carbon atoms, 1-6 carbon atoms, or 1-4 carbon atoms. In a further aspect, an organic radical can have 2-26 carbon atoms, 2-18 carbon atoms, 2-12 carbon atoms, 2-8 carbon atoms, 2-6 carbon atoms, or 2-4 carbon atoms. Organic radicals often have hydrogen bound to at least some of the carbon atoms of the organic radical. One example, of an organic radical that comprises no inorganic atoms is a 5,6,7,8-tetrahydro-2-naphthyl radical. In some embodiments, an organic radical can contain 1-10 inorganic heteroatoms bound thereto or therein, including halogens, oxygen, sulfur, nitrogen, phosphorus, and the like. Examples of organic radicals include but are not limited to an alkyl, substituted alkyl, cycloalkyl, substituted cycloalkyl, mono-substituted amino, di-substituted amino, acyloxy, cyano, carboxy, carboalkoxy, alkylcarboxamide, substituted alkylcarboxamide, dialkylcarboxamide, substituted dialkylcarboxamide, alkylsulfonyl, alkylsulfinyl, thioalkyl, thiohaloalkyl, alkoxy, substituted alkoxy, haloalkyl, haloalkoxy, aryl, substituted aryl, heteroaryl, heterocyclic, or substituted heterocyclic radicals, wherein the terms are defined elsewhere herein. A few non-limiting examples of organic radicals that include heteroatoms include alkoxy radicals, trifluoromethoxy radicals, acetoxy radicals, dimethylamino radicals and the like.

The terms "residues" and "structural units", used in reference to the constituents of the polymers, are synonymous throughout the specification.

As used herein, the terms "number average molecular weight" or "$M_n$" can be used interchangeably, and refer to the statistical average molecular weight of all the polymer chains in the sample and is defined by the formula:

$$M_n = \frac{\sum N_i M_i}{\sum N_i},$$

where $M_i$ is the molecular weight of a chain and $N_i$ is the number of chains of that molecular weight. $M_n$ can be determined for polymers, e.g. polycarbonate polymers, by methods well known to a person having ordinary skill in the art using molecular weight standards, e.g. polycarbonate standards or polystyrene standards, preferably certified or traceable molecular weight standards.

As used herein, the terms "weight average molecular weight" or "Mw" can be used interchangeably, and are defined by the formula:

$$M_w = \frac{\sum N_i M_i^2}{\sum N_i M_i},$$

where $M_i$ is the molecular weight of a chain and $N_i$ is the number of chains of that molecular weight. Compared to $M_n$, $M_w$ takes into account the molecular weight of a given chain in determining contributions to the molecular weight average. Thus, the greater the molecular weight of a given chain, the more the chain contributes to the $M_w$. $M_w$ can be determined for polymers, e.g. polycarbonate polymers, by methods well known to a person having ordinary skill in the art using molecular weight standards, e.g. polycarbonate standards or polystyrene standards, preferably certified or traceable molecular weight standards.

As used herein, the terms "polydispersity index" or "PDI" can be used interchangeably, and are defined by the formula:

$$PDI = \frac{M_w}{M_n}.$$

The PDI has a value equal to or greater than 1, but as the polymer chains approach uniform chain length, the PDI approaches unity.

The terms "BisA" or "bisphenol A," which can be used interchangeably, as used herein refers to a compound having a structure represented by the formula:

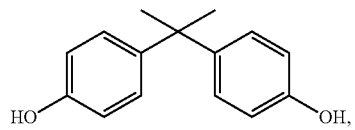

BisA can also be referred to by the name 4,4'-(propane-2,2-diyl)diphenol; p,p'-isopropylidenebisphenol; or 2,2-bis(4-hydroxyphenyl)propane. BisA has the CAS #80-05-7.

As used herein, "polycarbonate" refers to an oligomer or polymer comprising residues of one or more dihydroxy compounds, e.g. dihydroxy aromatic compounds, joined by carbonate linkages; it also encompasses homopolycarbonates, copolycarbonates, and (co)polyester carbonates.

As used herein, the terms "PC-PS," "polycarbonate-siloxane copolymer," "poly(carbonate-siloxane) copolymer," and "polycarbonate-polysiloxane copolymer," which can be used interchangeably, refer to a copolymer comprising repeating carbonate and siloxane units. The terms are inclusive of block copolymers having polysiloxane and polycarbonate blocks.

As used herein, the terms "ABS" and "acrylonitrile-butadiene-styrene copolymer," which can be used interchangeably, refer to an acrylonitrile-butadiene-styrene polymer which can be an acrylonitrile-butadiene-styrene terpolymer or a blend of styrene-butadiene rubber and styrene-acrylonitrile copolymer.

As used herein, the term "impact modifier" refers to a component of the disclosed impact modified polycarbonate blend compositions wherein the impact modifier is a polymeric material effective in improving the impact properties of the disclosed impact modified polycarbonate blend compositions, e.g. the notched Izod impact strength of the composition. As used herein, an impact modifier can be a one or more polymers such as acrylonitrile butadiene styrene copolymer (ABS), methacrylate butadiene styrene copolymer (MBS), bulk polymerized ABS (BABS), and/or silicon-graft copolymers.

The term "PET" refers to poly(ethylene terephthalate). As used herein the terms "poly(ethylene terephthalate)" and "PET" include PET homopolymers PET copolymers and PETG. As used herein the term PET copolymer refers to PET that has been modified by up to 10 mole percent with one or more added comonomers. For example the term PET copolymer includes PET modified with up to 10 mole percent isophthalic acid on a 100 mole percent carboxylic acid basis. In another example the term PET copolymer includes PET modified with up to 10 mole percent 1,4 cyclohexane dimethanol (CHDM) on a 100 mole percent diol basis. As used herein the term PETG refers to PET modified with 10 to 50 percent CHDM on a 100 mole percent diol basis.

The term "PBT" is used herein to mean a crystallizable poly(alkylene terephthalate), i.e. a polyester of terephthalic acid and butanediol.

The term "PCTG" is used herein to mean an amorphous polyester of terephthalic acid and a mixture of predominately 4-cyclohexanedimethanol and a lesser amount of ethylene glycol.

As used herein, the terms "ITR-PC," and (isophthalic acid-terephthalic acid-resorcinol)-bisphenol A copolyester-carbonate refer to copolyestercarbonates comprising a polycarbonate unit and a polyester unit, the polyester unit derived from the reaction of isophthalic acid, terephthalic acid, and a resorcinol moiety.

The term "talc" is used herein to mean a mineral composed of hydrated magnesium silicate. The term "surface treated talc" (or "surface modified talc" or "coated talc") is used herein to mean particles of talc, whose surface has been fully or partially, physically or chemically, modified using a surface treating agent. Such agents can be of organic or inorganic nature. These agents can include fatty acids, fatty acid esters, silicones, Teflon, silanes, silane coupling agents, metal salts of fatty acid, or polyethylene glycol.

As used herein the term "micronization" means the production of particles having an average diameter of 1-100 μm.

As used herein the terms "weight percent," "wt %," "wt %," and "wt. %," which can be used interchangeably, indicate the percent by weight of a given component based on the total weight of the composition, unless otherwise specified. That is, unless otherwise specified, all weight percent values are based on the total weight of the composition. It should be understood that the sum of weight percent values for all components in a disclosed composition or formulation are equal to 100.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

Blended Polycarbonate Compositions

As briefly described above, the present disclosure relates in one aspect to blended polycarbonate compositions with improved surface properties. In various aspects, the invention relates to blended polycarbonate compositions comprising surface-treated fillers such as talc along with a component selected from a polyalkylene terephthalate, an (isophthalic acid-terephthalic acid-resorcinol)-bisphenol A copolyestercarbonate copolymer (ITR-PC), or a combination thereof, to provide both improved impact properties and surface properties. The combination of surface-treated fillers and a component selected from a polyalkylene terephthalate, an (isophthalic acid-terephthalic acid-resorcinol)-bisphenol A copolyestercarbonate copolymer (ITR-PC), or a combination thereof of the present invention improves the both the impact properties and surface properties. In various further aspects, the invention relates to blended polycarbonate compositions comprising one or more polycarbonate polymers, an impact modifier, a polyethylene terephthalate and a surface-treated talc composition. In a further aspect, the blended polycarbonate composition comprises a polycarbonate, a poly(carbonate-siloxane) copolymer, or combinations thereof.

In various aspects, the present disclosure relates in one aspect to blended polycarbonate compositions with improved surface properties. In various aspects, the invention relates to blended polycarbonate compositions comprising surface-treated fillers such as talc along with a polyethylene terephthalate to provide both improved impact properties and surface properties. The combination of surface-treated fillers and a polyethylene terephthalate of the present invention improves the both the impact properties and surface properties. In various further aspects, the invention relates to blended polycarbonate compositions comprising one or more polycarbonate polymers, an impact modifier, a polyethylene terephthalate and a surface-treated talc composition. In a further aspect, the surface-treated talc is a micronized talc with a submicron mean particle size, which has been treated with a silane composition. Thus, in a further aspect, the resulting compositions are therefore capable of being used in the production of articles wherein excellent impact properties are required in conjunction with appropriate flow, stiffness, ductility and heat deflection properties.

In various aspects, the invention relates to blended polycarbonate compositions with improved surface characteristics comprising: (a) from about 65 wt % to about 94 wt % of a polycarbonate component comprising a polycarbonate polymer, a poly(carbonate-siloxane) copolymer, or a combination thereof; (b) from about 1 wt % to about 20 wt % of a splay-reducing component; and (c) from about 5 wt % to about 25 wt % of a filler component; wherein all weight percent values are based on the total weight of the composition; and wherein the composition exhibits a splay less than that of that of a reference composition consisting essentially of substantially the same proportions of the same polycarbonate component and the same filler component.

In various aspects, the invention relates to blended polycarbonate compositions with improved surface characteristics comprising: (a) from about 65 wt % to about 94 wt % of a polycarbonate component comprising a polycarbonate polymer, a poly(carbonate-siloxane) copolymer, or a combination thereof; (b) from about 1 wt % to about 20 wt % of a splay-reducing component comprising a polyester polymer, an (isophthalic acid-terephthalic acid-resorcinol)-bisphenol A copolyestercarbonate copolymer, or combinations thereof; and (c) from about 5 wt % to about 25 wt % of a filler component; wherein all weight percent values are based on the total weight of the composition; and wherein the composition exhibits a splay less than that of that of a reference composition consisting essentially of substantially the same proportions of the same polycarbonate component and the same filler component.

In a further aspect, described herein are blended polycarbonate compositions with improved surface characteristics comprising: (a) from about 30 wt % to about 85 wt % of a polycarbonate component; (b) from about 1 wt % to about 10 wt % of a polyethylene terephthalate component; (c) from about 10 wt % to about 30 wt % of an impact modifier component; and (d) from about 5 wt % to about 25 wt % of a filler component; wherein all weight percent values are based on the total weight of the composition; and wherein the composition exhibits a splay less than that of that of a reference composition consisting essentially of substantially the same proportions of the same polycarbonate component, the same impact modifier component, and the same filler component.

In various aspects, the invention relates to blended polycarbonate compositions with improved surface characteristics comprising: (a) from about 20 wt % to about 45 wt % of a first polycarbonate component; (b) from about 20 wt % to about 45 wt % of a second polycarbonate component; (c) from about 2 wt % to about 8 wt % of a poly(alkylene ester) component; (d) from about 10 wt % to about 30 wt % of an impact modifier component; and (e) from about 5 wt % to about 25 wt % of a surface-treated talc filler component; wherein all weight percent values are based on the total weight of the composition; wherein the composition exhibits an Izod notched impact strength of at least about 15 kJ/m$^2$ determined in accordance with ISO 180; and wherein the composition exhibits a splay less than that of that of a reference composition consisting essentially of substantially the same proportions of the same first polycarbonate component, the same second polycarbonate component, the same impact modifier component, and essentially the same talc filler component without surface treatment.

In various aspects, the invention relates to blended polycarbonate compositions with improved surface characteristics comprising: (a) from about 20 wt % to about 45 wt % of a first polycarbonate component; (b) from about 20 wt % to about 45 wt % of a second polycarbonate component; (c) from about 2 wt % to about 8 wt % of a poly(alkylene ester) component; (d) from about 12 wt % to about 24 wt % of an impact modifier component; and (e) from about 10 wt % to about 20 wt % of a surface-treated talc filler component; wherein all weight percent values are based on the total weight of the composition; wherein the composition exhibits an Izod notched impact strength of at least about 15 kJ/m$^2$ determined in accordance with ISO 180; and wherein the composition exhibits a splay less than that of that of a reference composition consisting essentially of substantially the same proportions of the same first polycarbonate component, the same second polycarbonate component, the same impact modifier component, and essentially the same talc filler component without surface treatment.

In various aspects, the invention relates to blended polycarbonate compositions with improved surface characteristics comprising: (a) from about 25 wt % to about 30 wt % of a first polycarbonate component; (b) from about 25 wt % to about 30 wt % of a second polycarbonate component; (c) from about 2.5 wt % to about 7.5 wt % of a poly(alkylene ester) component; (d) from about 14.0 wt % to about 22.0 wt % of an impact modifier component; and (e) from about 12.5 wt % to about 17.5 wt % of a surface-treated talc filler component; wherein all weight percent values are based on the total weight of the composition; wherein the composition exhibits an Izod notched impact strength of at least about 20 kJ/m$^2$ determined in accordance with ISO 180; and wherein the composition exhibits a splay less than that of that of a reference composition consisting essentially of substantially the same proportions of the same first polycarbonate component, the same second polycarbonate component, the same impact modifier component, and essentially the same talc filler component without surface treatment.

In various aspects, the invention relates to blended polycarbonate compositions with improved surface characteristics comprising: (a) from about 25 wt % to about 30 wt % of a first polycarbonate component; (b) from about 25 wt % to about 30 wt % of a second polycarbonate component; (c) from about 5.0 wt % to about 7.5 wt % of a poly(alkylene ester) component; (d) from about 17.0 wt % to about 22.0 wt % of an impact modifier component; and (e) about 15.0 wt % of a surface-treated talc filler component; wherein all weight percent values are based on the total weight of the composition; wherein the composition exhibits an Izod notched impact strength of at least about 20 kJ/m$^2$ determined in accordance with ISO 180; and wherein the composition exhibits a splay less than that of that of a reference composition consisting essentially of substantially the same proportions of the same first polycarbonate component, the same second polycarbonate component, the same impact modifier component, and essentially the same talc filler component without surface treatment.

In a further aspect, described herein are blended polycarbonate compositions with improved surface characteristics comprising: (a) from about 30 wt % to about 85 wt % of a polycarbonate component; (b) from about 1 wt % to about 10 wt % of a poly(alkylene terephthalate) component; (c) from about 10 wt % to about 30 wt % of an impact modifier component; and (d) from about 5 wt % to about 25 wt % of a filler component; wherein all weight percent values are based on the total weight of the composition; and wherein the composition exhibits a splay less than that of that of a reference composition consisting essentially of substantially the same proportions of the same polycarbonate component, the same impact modifier component, and the same filler component.

In a further aspect, described herein are blended polycarbonate compositions with improved surface characteristics comprising: (a) from about 20 wt % to about 45 wt % of a first polycarbonate component; (b) from about 20 wt % to about 45 wt % of a second polycarbonate component; (c) from about 2 wt % to about 8 wt % of a poly(alkylene terephthalate) component; (d) from about 10 wt % to about 30 wt % of an impact modifier component; and (e) from about 5 wt % to about 25 wt % of a surface-treated talc filler component; wherein all weight percent values are based on the total weight of the composition; wherein the composition exhibits an Izod notched impact strength of at least about 15 kJ/m$^2$ determined in accordance with ISO 180; and wherein the composition exhibits a splay less than that of that of a reference composition consisting essentially of substantially the same proportions of the same first polycarbonate component, the same second polycarbonate component, the same impact modifier component, and essentially the same talc filler component without surface treatment.

In a further aspect, described herein are blended polycarbonate compositions with improved surface characteristics comprising: (a) from about 20 wt % to about 45 wt % of a first polycarbonate component; (b) from about 20 wt % to about 45 wt % of a second polycarbonate component; (c) from about 2 wt % to about 8 wt % of a poly(alkylene terephthalate) component; (d) from about 12 wt % to about 24 wt % of an impact modifier component; and (e) from about 10 wt % to about 20 wt % of a surface-treated talc filler component; wherein all weight percent values are based on the total weight of the composition; wherein the composition exhibits an Izod notched impact strength of at least about 15 kJ/m$^2$ determined in accordance with ISO 180; and wherein the composition exhibits a splay less than that of that of a reference composition consisting essentially of substantially the same proportions of the same first polycarbonate component, the same second polycarbonate component, the same impact modifier component, and essentially the same talc filler component without surface treatment.

In a further aspect, described herein are blended polycarbonate compositions with improved surface characteristics comprising: (a) from about 25 wt % to about 30 wt % of a first polycarbonate component; (b) from about 25 wt % to about 30 wt % of a second polycarbonate component; (c) from about 2.5 wt % to about 7.5 wt % of a poly(alkylene terephthalate) component; (d) from about 14.0 wt % to about 22.0 wt % of an impact modifier component; and (e) from about 12.5 wt % to about 17.5 wt % of a surface-treated talc filler component; wherein all weight percent values are based on the total weight of the composition; wherein the composition exhibits an Izod notched impact strength of at least about 20 kJ/m$^2$ determined in accordance with ISO 180; and wherein the composition exhibits a splay less than that of that of a reference composition consisting essentially of substantially the same proportions of the same first polycarbonate component, the same second polycarbonate component, the same impact modifier component, and essentially the same talc filler component without surface treatment.

In a further aspect, described herein are blended polycarbonate compositions with improved surface characteristics comprising: (a) from about 25 wt % to about 30 wt % of a first polycarbonate component; (b) from about 25 wt % to about 30 wt % of a second polycarbonate component; (c) from about 5.0 wt % to about 7.5 wt % of a poly(alkylene terephthalate) component; (d) from about 17.0 wt % to about 22.0 wt % of an impact modifier component; and (e) about 15.0 wt % of a surface-treated talc filler component; wherein all weight percent values are based on the total weight of the composition; wherein the composition exhibits an Izod notched impact strength of at least about 20 kJ/m$^2$ determined in accordance with ISO 180; and wherein the composition exhibits a splay less than that of that of a reference composition consisting essentially of substantially the same proportions of the same first polycarbonate component, the same second polycarbonate component, the same impact modifier component, and essentially the same talc filler component without surface treatment.

In a further aspect, described herein are blended polycarbonate compositions with improved surface characteristics comprising: (a) from about 30 wt % to about 85 wt % of a polycarbonate component; (b) from about 1 wt % to about 10 wt % of a polyethylene terephthalate component; (c) from about 10 wt % to about 30 wt % of an impact modifier component; and (d) from about 5 wt % to about 25 wt % of a filler component; wherein all weight percent values are based on the total weight of the composition; and wherein the composition exhibits a splay less than that of that of a reference composition consisting essentially of substantially the same proportions of the same polycarbonate component, the same impact modifier component, and the same filler component.

In a further aspect, described herein are blended polycarbonate compositions with improved surface characteristics comprising: (a) from about 20 wt % to about 45 wt % of a first polycarbonate component; (b) from about 20 wt % to about 45 wt % of a second polycarbonate component; (c) from about 2 wt % to about 8 wt % of a polyethylene terephthalate component; (d) from about 10 wt % to about 30 wt % of an impact modifier component; and (e) from about 5 wt % to about 25 wt % of a surface-treated talc filler component; wherein all weight percent values are based on the total weight of the composition; wherein the composition exhibits an Izod notched impact strength of at least about 15 kJ/m² determined in accordance with ISO 180; and wherein the composition exhibits a splay less than that of that of a reference composition consisting essentially of substantially the same proportions of the same first polycarbonate component, the same second polycarbonate component, the same impact modifier component, and essentially the same talc filler component without surface treatment.

In a further aspect, described herein are blended polycarbonate compositions with improved surface characteristics comprising: (a) from about 20 wt % to about 45 wt % of a first polycarbonate component; (b) from about 20 wt % to about 45 wt % of a second polycarbonate component; (c) from about 2 wt % to about 8 wt % of a polyethylene terephthalate component; (d) from about 12 wt % to about 24 wt % of an impact modifier component; and (e) from about 10 wt % to about 20 wt % of a surface-treated talc filler component; wherein all weight percent values are based on the total weight of the composition; wherein the composition exhibits an Izod notched impact strength of at least about 15 kJ/m² determined in accordance with ISO 180; and wherein the composition exhibits a splay less than that of that of a reference composition consisting essentially of substantially the same proportions of the same first polycarbonate component, the same second polycarbonate component, the same impact modifier component, and essentially the same talc filler component without surface treatment.

In a further aspect, described herein are blended polycarbonate compositions with improved surface characteristics comprising: (a) from about 25 wt % to about 30 wt % of a first polycarbonate component; (b) from about 25 wt % to about 30 wt % of a second polycarbonate component; (c) from about 2.5 wt % to about 7.5 wt % of a polyethylene terephthalate component; (d) from about 14.0 wt % to about 22.0 wt % of an impact modifier component; and (e) from about 12.5 wt % to about 17.5 wt % of a surface-treated talc filler component; wherein all weight percent values are based on the total weight of the composition; wherein the composition exhibits an Izod notched impact strength of at least about 20 kJ/m² determined in accordance with ISO 180; and wherein the composition exhibits a splay less than that of that of a reference composition consisting essentially of substantially the same proportions of the same first polycarbonate component, the same second polycarbonate component, the same impact modifier component, and essentially the same talc filler component without surface treatment.

In a further aspect, described herein are blended polycarbonate compositions with improved surface characteristics comprising: (a) from about 25 wt % to about 30 wt % of a first polycarbonate component; (b) from about 25 wt % to about 30 wt % of a second polycarbonate component; (c) from about 5.0 wt % to about 7.5 wt % of a polyethylene terephthalate component; (d) from about 17.0 wt % to about 22.0 wt % of an impact modifier component; and (e) about 15.0 wt % of a surface-treated talc filler component; wherein all weight percent values are based on the total weight of the composition; wherein the composition exhibits an Izod notched impact strength of at least about 20 kJ/m² determined in accordance with ISO 180; and wherein the composition exhibits a splay less than that of that of a reference composition consisting essentially of substantially the same proportions of the same first polycarbonate component, the same second polycarbonate component, the same impact modifier component, and essentially the same talc filler component without surface treatment.

In a further aspect, described herein are blended polycarbonate compositions with improved surface characteristics comprising: (a) from about 65 wt % to about 94 wt % of a component selected from a polycarbonate, a poly(carbonate-siloxane) copolymer, or a combination thereof; (b) from about 1 wt % to about 10 wt % of a splay-reducing component; and (c) from about 5 wt % to about 25 wt % of a filler component; wherein all weight percent values are based on the total weight of the composition; and wherein the composition exhibits a splay less than that of that of a reference composition consisting essentially of substantially the same proportions of the same polycarbonate component, the same impact modifier component, and the same filler component.

In a further aspect, the blend polycarbonate composition exhibits a splay at least about 30% less than the reference composition. In a still further aspect, the blended polycarbonate composition exhibits a splay at least about 35% less than the reference composition. In a yet further aspect, the blended polycarbonate composition exhibits a splay at least about 40% less than the reference composition. In an even further aspect, the blended polycarbonate composition exhibits a splay at least about 45% less than the reference composition. In a still further aspect, the blended polycarbonate composition exhibits a splay at least about 50% less than the reference composition. In various aspects, splay is determined by scanning a molded article using a flat-bed high definition scanner and each pixel is assigned a black/white value (or L-value); and wherein the splay value for the article is the standard deviation for the L-values calculated for the ensemble data set of L-values.

In a further aspect, the blended polycarbonate composition exhibits an Izod notched impact strength of at least about 6.0 kJ/m² determined in accordance with ISO 180. In a still further aspect, the blended polycarbonate composition exhibits an Izod notched impact strength of at least about 6.5 kJ/m² determined in accordance with ISO 180. In a yet further aspect, the blended polycarbonate composition exhibits an Izod notched impact strength of at least about 7.0 kJ/m² determined in accordance with ISO 180. In an even further aspect, the blended polycarbonate composition exhibits an Izod notched impact strength of at least about 7.5 kJ/m² determined in accordance with ISO 180. In a still further aspect, the blended polycarbonate composition exhibits an Izod notched impact strength of at least about 8.0 kJ/m² determined in accordance with ISO 180. In a yet further aspect, the blended polycarbonate composition exhibits an Izod notched impact strength of at least about 8.5 kJ/m² determined in accordance with ISO 180. In an even further aspect, the blended polycarbonate composition exhibits an Izod notched impact strength of at least about 9.0 kJ/m² determined in accordance with ISO 180.

In a further aspect, the polycarbonate component of the blended polycarbonate composition is prepared by an interfacial polymerization process.

In a further aspect, the impact modifier component comprises one more of an acrylonitrile butadiene styrene ("ABS") copolymer, a methacrylate butadiene styrene ("MBS") copolymer, a bulk polymerized ABS ("BABS") copolymer, and a silicon graft copolymer. In a still further aspect, the impact modifier component comprises an acrylonitrile butadiene styrene ("ABS") copolymer. In a yet further aspect, the impact modifier component comprises a methacrylate butadiene styrene ("MBS") copolymer. In an even further aspect, the impact modifier component comprises a bulk polymerized ABS ("BABS") copolymer. In a still further aspect, the impact modifier component comprises a silicon graft copolymer.

In a further aspect, the filler component is an inert mineral filler. In a still further aspect, the mineral filler is an inert miller filler. In a yet further aspect, the filler component is a platy filler. In an even further aspect, the platy filler is an inert mineral filler. In a still further aspect, the inert mineral filler is one or more of talc, kaolin, mica, and clay. In a yet further aspect, the inert mineral filler is talc. In an even further aspect, the inert mineral filler is a surface-treated talc. In a still further aspect, the surface-treated talc is Luzenac® R7 talc.

In various aspects, the blend polycarbonate compositions of the present invention further comprise an additive selected from coupling agents, antioxidants, mold release agents, UV absorbers, light stabilizers, heat stabilizers, lubricants, plasticizers, pigments, dyes, colorants, anti-static agents, nucleating agents, anti-drip agents, acid scavengers, and combinations of two or more of the foregoing. In a further aspect, the blend polycarbonate compositions of the present invention further comprise at least one polymer additive selected from a flame retardant, a colorant, a primary anti-oxidant, and a secondary anti-oxidant.

Polycarbonate Polymer

In one aspect, the disclosed blended polycarbonate compositions with improved surface characteristics, e.g. decreased splaying, of the present invention comprise a polycarbonate polymer composition. In various aspects, the disclosed blended polycarbonate compositions can have useful mechanical properties such as impact strength and multi-axial impact strength.

In one aspect, a polycarbonate can comprise any polycarbonate material or mixture of materials, for example, as recited in U.S. Pat. No. 7,786,246, which is hereby incorporated in its entirety for the specific purpose of disclosing various polycarbonate compositions and methods. The term polycarbonate can be further defined as compositions have repeating structural units of the formula (1):

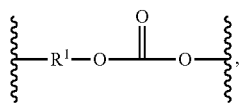
(1)

in which at least 60 percent of the total number of $R^1$ groups are aromatic organic radicals and the balance thereof are aliphatic, alicyclic, or aromatic radicals. Preferably, each $R^1$ is an aromatic organic radical and, more preferably, a radical of the formula (2):

-$A^1$-$Y^1$-$A^2$- (2)

wherein each of $A^1$ and $A^2$ is a monocyclic divalent aryl radical and $Y^1$ is a bridging radical having one or two atoms that separate $A^1$ from $A^2$. In various aspects, one atom separates $A^1$ from $A^2$. For example, radicals of this type include, but are not limited to, radicals such as —O—, —S—, —S(O)—, —S(O$_2$)—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ is preferably a hydrocarbon group or a saturated hydrocarbon group such as methylene, cyclohexylidene, or isopropylidene.

In a further aspect, polycarbonates can be produced by the interfacial reaction of dihydroxy compounds having the formula HO—$R^1$—OH, which includes dihydroxy compounds of formula (3):

HO-$A^1$-$Y^1$-$A^2$-OH (3), wherein $Y^1$, $A^1$ and $A^2$ are as described above. Also included are bisphenol compounds of general formula (4):

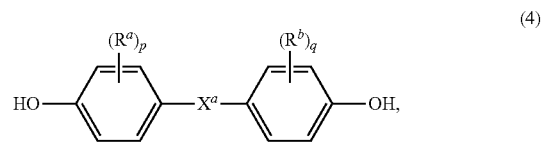
(4)

wherein $R^a$ and $R^b$ each represent a halogen atom or a monovalent hydrocarbon group and can be the same or different; p and q are each independently integers from 0 to 4; and $X^a$ represents one of the groups of formula (5):

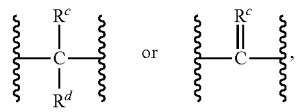

wherein $R^c$ and $R^d$ each independently represent a hydrogen atom or a monovalent linear or cyclic hydrocarbon group and $R^e$ is a divalent hydrocarbon group.

In various aspects, examples of suitable dihydroxy compounds include the dihydroxy-substituted hydrocarbons disclosed by name or formula (generic or specific) in U.S. Pat. No. 4,217,438. A nonexclusive list of specific examples of suitable dihydroxy compounds includes the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4- hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, 2,7-dihydroxycarbazole, 3,3-bis(4-hydroxyphenyl)phthalimidine, 2-phenyl-3,3-bis-(4-hydroxyphenyl)phthalimidine (PPPBP), and the like, as well as mixtures including at least one of the foregoing dihydroxy compounds.

In a further aspect, examples of the types of bisphenol compounds that can be represented by formula (3) includes 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl) n-butane, 2,2-bis(4-hydroxy-1-methylphenyl)propane, and 1,1-bis(4-hydroxy-t-butylphenyl)propane. Combinations including at least one of the foregoing dihydroxy compounds can also be used.

In various aspects, a polycarbonate can employ two or more different dihydroxy compounds or a copolymer of a dihydroxy compounds with a glycol or with a hydroxy- or acid-terminated polyester or with a dibasic acid or hydroxy acid in the event a carbonate copolymer rather than a homopolymer is desired for use. Polyarylates and polyester-carbonate resins or their blends can also be employed. Branched polycarbonates are also useful, as well as blends of linear polycarbonate and a branched polycarbonate. The branched polycarbonates can be prepared by adding a branching agent during polymerization.

In a further aspect, the branching agents include polyfunctional organic compounds containing at least three functional groups selected from hydroxyl, carboxyl, carboxylic anhydride, haloformyl, and mixtures thereof. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl)phenol), 4-chloroformyl phthalic anhydride, trimesic acid, and benzophenone tetracarboxylic acid. The branching agents can be added at a level of from 0.05-2.0 weight percent. Branching agents and procedures for making branched polycarbonates are described in U.S. Pat. Nos. 3,635,895 and 4,001,184. All types of polycarbonate end groups are contemplated as being useful in the thermoplastic composition.

In a further aspect, the polycarbonates are based on bisphenol A, in which each of $A^1$ and $A^2$ is p-phenylene and $Y^1$ is isopropylidene. In a still further aspect, the molecular weight (Mw) of the polycarbonate is about 10,000 to about 100,000. In a yet further aspect, the polycarbonate has a Mw of about 15,000 to about 55,000. In an even further aspect, the polycarbonate has a Mw of about 18,000 to about 40,000.

In a further aspect, the polycarbonate polymer comprises a linear polycarbonate homopolymer comprising repeating units of the formula:

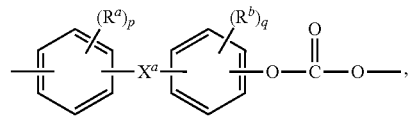

wherein $R^a$ and $R^b$ are each independently a C1-12 alkyl group, C1-12 alkenyl, C3-8 cycloalkyl, or C1-12 alkoxy; wherein p and q are each independently integers of 0 to 4; and wherein $X^a$ is a single bond, —O—, —S—, —S(O)—, —S(O)$_2$—, —C(O)—, a C1-11 alkylidene of formula —C($R^c$)($R^d$)—; wherein $R^c$ and $R^d$ are each independently hydrogen or C1-10 alkyl, or a group of the formula —C(=$R^e$)—; and wherein $R^e$ is a divalent C1-10 hydrocarbon group. In a still further aspect, the linear polycarbonate homopolymer comprises bisphenol A carbonate units. In a yet further aspect, the linear polycarbonate homopolymer is made via an interfacial polymerization process. In an even further aspect, the linear polycarbonate homopolymer is made via a melt polymerization process.

Polycarbonates, including isosorbide-based polyester-polycarbonate, can comprise copolymers comprising carbonate units and other types of polymer units, including ester units, and combinations comprising at least one of homopolycarbonates and copolycarbonates. An exemplary polycarbonate copolymer of this type is a polyester carbonate, also known as a polyester-polycarbonate. Such copolymers further contain carbonate units derived from oligomeric ester-containing dihydroxy compounds (also referred to herein as hydroxy end-capped oligomeric acrylate esters).

In one aspect, polycarbonates can be manufactured using an interfacial phase transfer process or melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium such as for example methylene chloride, and contacting the reactants with a carbonate precursor (such as phosgene) in the presence of a catalyst such as, for example, triethylamine or a phase transfer catalyst salt, under controlled pH conditions of, for example, from about 8 to about 10.

The polycarbonate compounds and polymers disclosed herein can, in various aspects, be prepared by a melt polymerization process. Generally, in the melt polymerization process, polycarbonates are prepared by co-reacting, in a molten state, the dihydroxy reactant(s) (i.e., isosorbide, aliphatic diol and/or aliphatic diacid, and any additional dihydroxy compound) and a diaryl carbonate ester, such as diphenyl carbonate, or more specifically in an aspect, an activated carbonate such as bis(methyl salicyl)carbonate, in the presence of a transesterification catalyst. The reaction can be carried out in typical polymerization equipment, such as one or more continuously stirred reactors (CSTRs), plug flow reactors, wire wetting fall polymerizers, free fall polymerizers, wiped film polymerizers, BANBURY® mixers, single or twin screw extruders, or combinations of the foregoing. In one aspect, volatile monohydric phenol can be removed from the molten reactants by distillation and the polymer is isolated as a molten residue.

The melt polymerization can include a transesterification catalyst comprising a first catalyst, also referred to herein as an alpha catalyst, comprising a metal cation and an anion. In an aspect, the cation is an alkali or alkaline earth metal comprising Li, Na, K, Cs, Rb, Mg, Ca, Ba, Sr, or a combination comprising at least one of the foregoing. The anion is hydroxide (OH⁻), superoxide (O²⁻), thiolate (HS⁻), sulfide (S²⁻), a $C_{1-20}$ alkoxide, a $C_{6-20}$ aryloxide, a $C_{1-20}$ carboxylate, a phosphate including biphosphate, a $C_{1-20}$ phosphonate, a sulfate including bisulfate, sulfites including bisulfites and metabisulfites, a $C_{1-20}$ sulfonate, a carbonate including bicarbonate, or a combination comprising at least one of the foregoing. In another aspect, salts of an organic acid comprising both alkaline earth metal ions and alkali metal ions can also be used. Salts of organic acids useful as catalysts are illustrated by alkali metal and alkaline earth metal salts of formic acid, acetic acid, stearic acid and ethyenediaminetetraacetic acid. The catalyst can also comprise the salt of a non-volatile inorganic acid. By "nonvolatile", it is meant that the referenced compounds have no appreciable vapor pressure at ambient temperature and pressure. In particular, these compounds are not volatile at temperatures at which melt polymerizations of polycarbonate are typically conducted. The salts of nonvolatile acids are alkali metal salts of phosphites; alkaline earth metal salts of phosphites; alkali metal salts of phosphates; and alkaline earth metal salts of phosphates. Exemplary transesterification catalysts include, lithium hydroxide, sodium hydroxide, potassium hydroxide, cesium hydroxide, magnesium hydroxide, calcium hydroxide, barium hydroxide, lithium formate, sodium formate, potassium formate, cesium formate, lithium acetate, sodium acetate, potassium acetate, lithium carbonate, sodium carbonate, potassium carbonate, lithium methoxide, sodium methoxide, potassium methoxide, lithium ethoxide, sodium ethoxide, potassium ethoxide, lithium phenoxide, sodium phenoxide, potassium phenoxide, sodium sulfate, potassium sulfate, $NaH_2PO_3$, $NaH_2PO_4$, $Na_2H_2PO_3$, $KH_2PO_4$, $CsH_2PO_4$, $Cs_2H_2PO_4$, $Na_2SO_3$, $Na_2S_2O_5$, sodium mesylate, potassium mesylate, sodium tosylate, potassium tosylate, magnesium disodium ethylenediamine tetraacetate (EDTA magnesium disodium salt), or a combination comprising at least one of the foregoing. It will be understood that the foregoing list is exemplary and should not be considered as limited thereto. In one aspect, the transesterification catalyst is an alpha catalyst comprising an alkali or alkaline earth salt. In an exemplary aspect, the transesterification catalyst comprising sodium hydroxide, potassium hydroxide, sodium carbonate, potassium carbonate, sodium methoxide, potassium methoxide, $NaH_2PO_4$, or a combination comprising at least one of the foregoing.

The amount of alpha catalyst can vary widely according to the conditions of the melt polymerization, and can be about 0.001 to about 500 µmol. In an aspect, the amount of alpha catalyst can be about 0.01 to about 20 µmol, specifically about 0.1 to about 10 µmol, more specifically about 0.5 to about 9 µmol, and still more specifically about 1 to about 7 µmol, per mole of aliphatic diol and any other dihydroxy compound present in the melt polymerization.

In another aspect, a second transesterification catalyst, also referred to herein as a beta catalyst, can optionally be included in the melt polymerization process, provided that the inclusion of such a second transesterification catalyst does not significantly adversely affect the desirable properties of the polycarbonate. Exemplary transesterification catalysts can further include a combination of a phase transfer catalyst of formula $(R^3)_4Q^+X$ above, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalyst salts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl⁻, Br⁻, a $C_{1-8}$ alkoxy group or a $C_{6-18}$ aryloxy group. Examples of such transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing. Other melt transesterification catalysts include alkaline earth metal salts or alkali metal salts. In various aspects, where a beta catalyst is desired, the beta catalyst can be present in a molar ratio, relative to the alpha catalyst, of less than or equal to 10, specifically less than or equal to 5, more specifically less than or equal to 1, and still more specifically less than or equal to 0.5. In other aspects, the melt polymerization reaction disclosed herein uses only an alpha catalyst as described hereinabove, and is substantially free of any beta catalyst. As defined herein, "substantially free of" can mean where the beta catalyst has been excluded from the melt polymerization reaction. In one aspect, the beta catalyst is present in an amount of less than about 10 ppm, specifically less than 1 ppm, more specifically less than about 0.1 ppm, more specifically less than or equal to about 0.01 ppm, and more specifically less than or equal to about 0.001 ppm, based on the total weight of all components used in the melt polymerization reaction.

In one aspect, an end-capping agent (also referred to as a chain-stopper) can optionally be used to limit molecular weight growth rate, and so control molecular weight in the polycarbonate. Exemplary chain-stoppers include certain monophenolic compounds (i.e., phenyl compounds having a single free hydroxy group), monocarboxylic acid chlorides, and/or monochloroformates. Phenolic chain-stoppers are exemplified by phenol and $C_1$-$C_{22}$ alkyl-substituted phenols such as p-cumyl-phenol, resorcinol monobenzoate, and p- and tertiary-butyl phenol, cresol, and monoethers of diphenols, such as p-methoxyphenol. Alkyl-substituted phenols with branched chain alkyl substituents having 8 to 9 carbon atoms can be specifically mentioned.

In another aspect, endgroups can be derived from the carbonyl source (i.e., the diaryl carbonate), from selection of monomer ratios, incomplete polymerization, chain scission, and the like, as well as any added end-capping groups, and can include derivatizable functional groups such as hydroxy groups, carboxylic acid groups, or the like. In one aspect, the endgroup of a polycarbonate, including an polycarbonate polymer as defined herein, can comprise a structural unit derived from a diaryl carbonate, where the structural unit can be an endgroup. In a further aspect, the endgroup is derived from an activated carbonate. Such endgroups can be derived from the transesterification reaction of the alkyl ester of an appropriately substituted activated carbonate, with a hydroxy group at the end of a polycarbonate polymer chain, under conditions in which the hydroxy group reacts with the ester carbonyl from the activated carbonate, instead of with the carbonate carbonyl of the activated carbonate. In this way, structural units derived from ester containing compounds or substructures derived from the activated carbonate and present in the melt polymerization reaction can form ester endgroups.

In one aspect, the melt polymerization reaction can be conducted by subjecting the reaction mixture to a series of temperature-pressure-time protocols. In some aspects, this involves gradually raising the reaction temperature in stages while gradually lowering the pressure in stages. In one aspect, the pressure is reduced from about atmospheric pressure at the start of the reaction to about 1 millibar (100 Pa) or lower, or in another aspect to 0.1 millibar (10 Pa) or lower in several steps as the reaction approaches completion. The temperature can be varied in a stepwise fashion beginning at a temperature of about the melting temperature of the reaction mixture and subsequently increased to final temperature. In one aspect, the reaction mixture is heated from room temperature to about 150° C. In such an aspect, the polymerization reaction starts at a temperature of about 150° C. to about 220° C. In another aspect, the polymerization temperature can be up to about 220° C. In other aspects, the polymerization reaction can then be increased to about 250° C. and then optionally further increased to a temperature of about 320° C., and all subranges there between. In one aspect, the total reaction time can be from about 30 minutes to about 200 minutes and all subranges there between. This procedure will generally ensure that the reactants react to give polycarbonates with the desired molecular weight, glass transition temperature and physical properties. The reaction proceeds to build the polycarbonate chain with production of ester-substituted alcohol by-product such as methyl salicylate. In one aspect, efficient removal of the by-product can be achieved by different techniques such as reducing the pressure. Generally the pressure starts relatively high in the beginning of the reaction and is lowered progressively throughout the reaction and temperature is raised throughout the reaction.

In one aspect, the progress of the reaction can be monitored by measuring the melt viscosity or the weight average molecular weight of the reaction mixture using techniques known in the art such as gel permeation chromatography. These properties can be measured by taking discrete samples or can be measured on-line. After the desired melt viscosity and/or molecular weight is reached, the final polycarbonate product can be isolated from the reactor in a solid or molten form. It will be appreciated by a person skilled in the art, that the method of making aliphatic homopolycarbonate and aliphatic-aromatic copolycarbonates as described in the preceding sections can be made in a batch or a continuous process and the process disclosed herein is preferably carried out in a solvent free mode. Reactors chosen should ideally be self-cleaning and should minimize any "hot spots." However, vented extruders similar to those that are commercially available can be used.

The compositions of the present invention can be blended with the aforementioned ingredients by a variety of methods involving intimate admixing of the materials with any additional additives desired in the formulation. Because of the availability of melt blending equipment in commercial polymer processing facilities, melt processing methods are generally preferred. Illustrative examples of equipment used in such melt processing methods include: co-rotating and counter-rotating extruders, single screw extruders, co-kneaders, disc-pack processors and various other types of extrusion equipment. The temperature of the melt in the present process is preferably minimized in order to avoid excessive degradation of the resins. It is often desirable to maintain the melt temperature between about 230° C. and about 350° C. in the molten resin composition, although higher temperatures can be used provided that the residence time of the resin in the processing equipment is kept short. In some embodiments the melt processed composition exits processing equipment such as an extruder through small exit holes in a die. The resulting strands of molten resin are cooled by passing the strands through a water bath. The cooled strands can be chopped into small pellets for packaging and further handling.

Thermoplastic compositions comprising blended polycarbonate compositions can be manufactured by various methods. For example, powdered polycarbonate, other polymer (if present), and/or other optional components are first blended, optionally with fillers in a HENSCHEL-Mixer® high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a sidestuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

In a further aspect, the polycarbonate component of the blended polycarbonate composition comprises Bisphenol A residues. In a still further aspect, the polycarbonate component of the blended polycarbonate composition has a weight average molecular weight of from about 15,000 g/mol to about 100,000 g/mol on an absolute polycarbonate molecular weight scale. In a still further aspect, the polycarbonate component of the blended polycarbonate composition has a weight average molecular weight of from about 20,000 g/mol to about 50,000 g/mol on an absolute polycarbonate molecular weight scale. In reference to the weight average molecular weight ($M_w$) of the polycarbonate component, including the first and second polycarbonate components, of the present invention, it is understood that the $M_w$ is the absolute $M_w$ determined by gel permeation chromatography relative to traceable polycarbonate standards.

In a further aspect, the polycarbonate component of the blended polycarbonate composition is prepared by an interfacial polymerization process.

In a further aspect, the polycarbonate component of the blended polycarbonate composition is present in an amount from about 30 wt % to about 80 wt %. In a still further aspect, the polycarbonate component of the blended polycarbonate composition is present in an amount from about 30 wt % to about 75 wt %. In a yet further aspect, the polycarbonate component of the blended polycarbonate composition is present in an amount from about 30 wt % to about 70 wt %. In an even further aspect, the polycarbonate component of the blended polycarbonate composition is present in an amount from about 30 wt % to about 65 wt %.

In a further aspect, the polycarbonate component of the blended polycarbonate composition comprises a first polycarbonate component and a second polycarbonate component.

In a further aspect, the first polycarbonate component has a weight average molecular weight of from about 15,000 g/mol to about 100,000 g/mol on an absolute polycarbonate molecular weight scale. In a still further aspect, the first polycarbonate component has a weight average molecular weight of from about 15,000 g/mol to about 50,000 g/mol on an absolute polycarbonate molecular weight scale. In a yet further aspect, the first polycarbonate component has a weight average molecular weight of from about 15,000 g/mol to about 45,000 g/mol on an absolute polycarbonate molecular weight scale. In an even further aspect, the first polycarbonate component has a weight average molecular weight of from about 15,000 g/mol to about 40,000 g/mol on an absolute polycarbonate molecular weight scale. In a still further aspect, the first polycarbonate component has a weight average molecular weight of from about 15,000 g/mol to about 35,000 g/mol on an absolute polycarbonate molecular weight scale. In a yet further aspect, the first polycarbonate component has a weight average molecular weight of from about 15,000 g/mol to about 30,500 g/mol on an absolute polycarbonate molecular weight scale. In an even further aspect, the first polycarbonate component has a weight average molecular weight of from about 15,000 g/mol to about 30,000 g/mol on an absolute polycarbonate molecular weight scale. In a still further aspect, the first polycarbonate component has a weight average molecular weight of from about 15,000 g/mol to about 29,000 g/mol on an absolute polycarbonate molecular weight scale.

In a further aspect, the first polycarbonate component has a weight average molecular weight of from about 20,000 g/mol to about 100,000 g/mol on an absolute polycarbonate molecular weight scale. In a still further aspect, the first polycarbonate component has a weight average molecular weight of from about 20,000 g/mol to about 50,000 g/mol on an absolute polycarbonate molecular weight scale. In a yet further aspect, the first polycarbonate component has a weight average molecular weight of from about 20,000 g/mol to about 45,000 g/mol on an absolute polycarbonate molecular weight scale. In an even further aspect, the first polycarbonate component has a weight average molecular weight of from about 20,000 g/mol to about 40,000 g/mol on an absolute polycarbonate molecular weight scale. In a still further aspect, the first polycarbonate component has a weight average molecular weight of from about 20,000 g/mol to about 35,000 g/mol on an absolute polycarbonate molecular weight scale. In a yet further aspect, the first polycarbonate component has a weight average molecular weight of from about 20,000 g/mol to about 30,500 g/mol on an absolute polycarbonate molecular weight scale. In an even further aspect, the first polycarbonate component has a weight average molecular weight of from about 20,000 g/mol to about 30,000 g/mol on an absolute polycarbonate molecular weight scale. In a still further aspect, the first polycarbonate component has a weight average molecular weight of from about 20,000 g/mol to about 29,000 g/mol on an absolute polycarbonate molecular weight scale.

In a further aspect, the first polycarbonate component has a weight average molecular weight of from about 25,000 g/mol to about 100,000 g/mol on an absolute polycarbonate molecular weight scale. In a still further aspect, the first polycarbonate component has a weight average molecular weight of from about 25,000 g/mol to about 50,000 g/mol on an absolute polycarbonate molecular weight scale. In a yet further aspect, the first polycarbonate component has a weight average molecular weight of from about 25,000 g/mol to about 45,000 g/mol on an absolute polycarbonate molecular weight scale. In an even further aspect, the first polycarbonate component has a weight average molecular weight of from about 25,000 g/mol to about 40,000 g/mol on an absolute polycarbonate molecular weight scale. In a still further aspect, the first polycarbonate component has a weight average molecular weight of from about 25,000 g/mol to about 35,000 g/mol on an absolute polycarbonate molecular weight scale. In a yet further aspect, the first polycarbonate component has a weight average molecular weight of from about 25,000 g/mol to about 30,500 g/mol on an absolute polycarbonate molecular weight scale. In an even further aspect, the first polycarbonate component has a weight average molecular weight of from about 25,000 g/mol to about 30,500 g/mol on an absolute polycarbonate molecular weight scale. In a still further aspect, the first polycarbonate component has a weight average molecular weight of from about 25,000 g/mol to about 30,000 g/mol on an absolute polycarbonate molecular weight scale. In a yet further aspect, the first polycarbonate component has a weight average molecular weight of from about 25,000 g/mol to about 29,000 g/mol on an absolute polycarbonate molecular weight scale.

In a further aspect, the first polycarbonate component is present in an amount from about 20 wt % to about 50 wt %. In a still further aspect, the first polycarbonate component is present in an amount from about 20 wt % to about 45 wt %. In a yet further aspect, the first polycarbonate component is present in an amount from about 20 wt % to about 40 wt %. In an even further aspect, the first polycarbonate component is present in an amount from about 20 wt % to about 35 wt %. In a still further aspect, the first polycarbonate component is present in an amount from about 20 wt % to about 30 wt %.

In a further aspect, the first polycarbonate component is present in an amount from about 22 wt % to about 50 wt %. In a still further aspect, the first polycarbonate component is present in an amount from about 22 wt % to about 45 wt %. In a yet further aspect, the first polycarbonate component is present in an amount from about 22 wt % to about 40 wt %. In an even further aspect, the first polycarbonate component is present in an amount from about 22 wt % to about 35 wt %. In a still further aspect, the first polycarbonate component is present in an amount from about 22 wt % to about 30 wt %.

In a further aspect, the first polycarbonate component is present in an amount from about 25 wt % to about 50 wt %. In a still further aspect, the first polycarbonate component is present in an amount from about 25 wt % to about 45 wt %. In a yet further aspect, the first polycarbonate component is present in an amount from about 25 wt % to about 40 wt %. In an even further aspect, the first polycarbonate component is present in an amount from about 25 wt % to about 35 wt %. In a still further aspect, the first polycarbonate component is present in an amount from about 25 wt % to about 30 wt %.

In a further aspect, the second polycarbonate component has a weight average molecular weight of from about 15,000 g/mol to about 100,000 g/mol on an absolute polycarbonate molecular weight scale. In a still further aspect, the second polycarbonate component has a weight average molecular weight of from about 15,000 g/mol to about 50,000 g/mol on an absolute polycarbonate molecular weight scale. In a yet further aspect, the second polycarbonate component has a weight average molecular weight of from about 15,000 g/mol to about 45,000 g/mol on an absolute polycarbonate molecular weight scale. In an even further aspect, the second polycarbonate component has a weight average molecular weight of from about 15,000 g/mol to about 40,000 g/mol on an absolute polycarbonate molecular weight scale. In a still further aspect, the second polycarbonate component has a weight average molecular weight of from about 15,000 g/mol to about 35,000 g/mol on an absolute polycarbonate molecular weight scale. In a yet further aspect, the second polycarbonate component has a weight average molecular weight of from about 15,000 g/mol to about 30,000 g/mol on an absolute polycarbonate molecular weight scale. In an even further aspect, the second polycarbonate component has a weight average molecular weight of from about 15,000 g/mol to about 25,000 g/mol on an absolute polycarbonate molecular weight scale.

In a further aspect, the second polycarbonate component has a weight average molecular weight of from about 20,000 g/mol to about 100,000 g/mol on an absolute polycarbonate molecular weight scale. In a still further aspect, the second polycarbonate component has a weight average molecular weight of from about 20,000 g/mol to about 50,000 g/mol on an absolute polycarbonate molecular weight scale. In a yet further aspect, the second polycarbonate component has a weight average molecular weight of from about 20,000 g/mol to about 45,000 g/mol on an absolute polycarbonate molecular weight scale. In an even further aspect, the second polycarbonate component has a weight average molecular weight of from about 20,000 g/mol to about 40,000 g/mol on an absolute polycarbonate molecular weight scale. In a still further aspect, the second polycarbonate component has a weight average molecular weight of from about 20,000 g/mol to about 35,000 g/mol on an absolute polycarbonate molecular weight scale. In a yet further aspect, the second polycarbonate component has a weight average molecular weight of from about 20,000 g/mol to about 30,000 g/mol on an absolute polycarbonate molecular weight scale. In an even further aspect, the second polycarbonate component has a weight average molecular weight of from about 20,000 g/mol to about 25,000 g/mol on an absolute polycarbonate molecular weight scale.

In a further aspect, the second polycarbonate component is present in an amount from about 20 wt % to about 50 wt %. In a still further aspect, the second polycarbonate component is present in an amount from about 20 wt % to about 45 wt %. In a yet further aspect, the second polycarbonate component is present in an amount from about 20 wt % to about 40 wt %. In an even further aspect, the second polycarbonate component is present in an amount from about 20 wt % to about 35 wt %. In a still further aspect, the second polycarbonate component is present in an amount from about 20 wt % to about 30 wt %.

In a further aspect, the second polycarbonate component is present in an amount from about 22 wt % to about 50 wt %. In a still further aspect, the second polycarbonate component is present in an amount from about 22 wt % to about 45 wt %. In a yet further aspect, the second polycarbonate component is present in an amount from about 22 wt % to about 40 wt %. In an even further aspect, the second polycarbonate component is present in an amount from about 22 wt % to about 35 wt %. In a still further aspect, the second polycarbonate component is present in an amount from about 22 wt % to about 30 wt %.

In a further aspect, the second polycarbonate component is present in an amount from about 25 wt % to about 50 wt %. In a still further aspect, the second polycarbonate component is present in an amount from about 25 wt % to about 45 wt %. In a yet further aspect, the second polycarbonate component is present in an amount from about 25 wt % to about 40 wt %. In an even further aspect, the second polycarbonate component is present in an amount from about 25 wt % to about 35 wt %. In a still further aspect, the second polycarbonate component is present in an amount from about 25 wt % to about 30 wt %.

In a further aspect, the first polycarbonate component is a low flow polycarbonate and wherein the second polycarbonate component is high flow polycarbonate. In a still further aspect, the first polycarbonate component has a melt volume flow rate ("MVR") of about 5.0 to about 7.2 g/10 min when determined at 300° C. under a load of 1.2 kg in accordance with ASTM D1238. In a yet further aspect, the first polycarbonate component has a melt volume flow rate ("MVR") of about 5.1 to about 6.9 g/10 min when determined at 300° C. under a load of 1.2 kg in accordance with ASTM D1238. In an even further aspect, the second polycarbonate component has a melt volume flow rate ("MVR") of about 22.0 to about 30.0 g/10 min when determined at 300° C. under a load of 1.2 kg in accordance with ASTM D1238. In a still further aspect, the second polycarbonate component has a melt volume flow rate ("MVR") of about 23.5 to about 28.5 g/10 min when determined at 300° C. under a load of 1.2 kg in accordance with ASTM D1238.

Polycarbonate-Polysiloxane Copolymer

The disclosed thermoplastic compositions further comprise a polycarbonate-polysiloxane block copolymer component. As used herein, the term polycarbonate-polysiloxane copolymer is equivalent to polysiloxane-polycarbonate copolymer, polycarbonate-polysiloxane polymer, or polysiloxane-polycarbonate polymer. The polysiloxane-polycarbonate copolymer comprises polydiorganosiloxane blocks comprising structural units of the general formula (I) below:

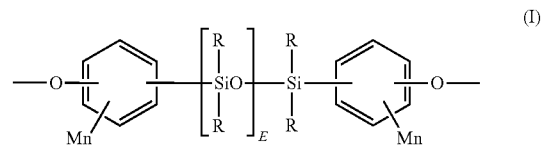

(I)

wherein the polydiorganosiloxane block length (E) is from about 20 to about 60; wherein each R group can be the same or different, and is selected from a $C_{1-13}$ monovalent organic group; wherein each M can be the same or different, and is selected from a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, and where each n is independently 0, 1, 2, 3, or 4. The polysiloxane-polycarbonate copolymer also comprises polycarbonate blocks comprising structural units of the general formula (II) below:

(II)

wherein at least 60 percent of the total number of $R^1$ groups comprise aromatic moieties and the balance thereof comprise aliphatic, alicyclic, or aromatic moieties.

According to exemplary non-limiting aspects of the disclosure, the polycarbonate-polysiloxane block copolymer comprises diorganopolysiloxane blocks of the general formula (III) below:

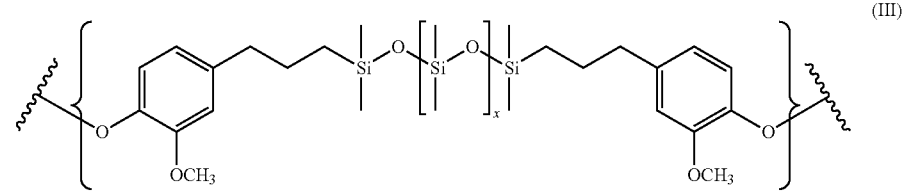

(III)

wherein x represents an integer from about 20 to about 60. The polycarbonate blocks according to these aspects can be derived from bisphenol-A monomers.

Diorganopolysiloxane blocks of formula (III) above can be derived from the corresponding dihydroxy compound of formula (IV):

(IV)

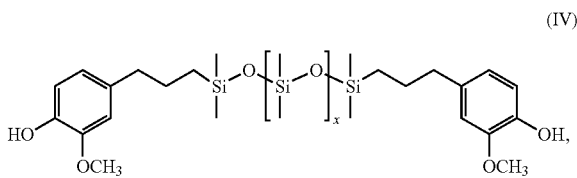

wherein x is as described above. Compounds of this type and others are further described in U.S. Pat. No. 4,746,701 to Kress, et al and U.S. Pat. No. 8,017,0697 to Carrillo. Compounds of this formula can be obtained by the reaction of the appropriate dihydroxyarylene compound with, for example, an alpha, omega-bisacetoxypolydiorangonosiloxane under phase transfer conditions.

Such dihydroxy polysiloxanes can be made by effecting a platinum catalyzed addition between a siloxane hydride of the formula (V):

(V)

wherein x is a previously defined, and an aliphatically unsaturated monohydric phenol such as eugenol to yield a compound of formula (IV).

The polycarbonate-polysiloxane copolymer may be manufactured by reaction of a diphenolic polysiloxane, such as that depicted by formula (IV), with a carbonate source and a dihydroxy aromatic compound such as bisphenol-A, optionally in the presence of a phase transfer catalyst as described above. Suitable conditions are similar to those useful in forming polycarbonates. For example, the copolymers can be prepared by phosgenation at temperatures from below 0° C. to about 100° C., including for example, at temperatures from about 25° C. to about 50° C. Since the reaction is exothermic, the rate of phosgene addition can be used to control the reaction temperature. The amount of phosgene required will generally depend upon the amount of the dihydric reactants. Alternatively, the polycarbonate-polysiloxane copolymers can be prepared by co-reacting, in a molten state, the dihydroxy monomers and a diaryl carbonate ester, such as diphenyl carbonate, in the presence of a transesterification catalyst as described above.

In the production of the polycarbonate-polysiloxane copolymer, the amount of dihydroxy diorganopolysiloxane can be selected so as to provide the desired amount of diorganopolysiloxane units in the copolymer. The particular amounts used will therefore be determined depending on desired physical properties of the composition, the value of x (for example, within the range of about 20 to about 60), and the type and relative amount of each component in the composition, including the type and amount of polycarbonate, type and amount of polycarbonate-polysiloxane copolymer, and type and amount of any other additives. Suitable amounts of dihydroxy diorganopolysiloxane can be determined by one of ordinary skill in the art without undue experimentation using the guidelines taught herein.

For example, according to aspects of the disclosure, the polysiloxane-polycarbonate block copolymer can be provided having any desired level of siloxane content. For example, the siloxane content can be in the range of from 4 mole % to 20 mole %. In additional aspects, the siloxane content of the polysiloxane-polycarbonate block copolymer can be in the range of from 4 mole % to 10 mole %. In still further aspects, the siloxane content of the polysiloxane-polycarbonate block copolymer can be in the range of from 4 mole % to 8 mole %. In a further aspect, the polysiloxane-polycarbonate copolymer comprises a diorganosiloxane content in the range of from 5 to 7 mole wt %. In an even further exemplary aspect, the siloxane content of the polysiloxane-polycarbonate block copolymer can be about 6 mole %. Still further, the diorganopolysiloxane blocks can be randomly distributed in the polysiloxane-polycarbonate block copolymer.

In various aspects, the poly(carbonate-siloxane) copolymer comprises first repeating units and second repeating units; wherein the first repeating units are bisphenol carbonate units of the formula:

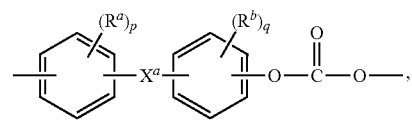

wherein $R^a$ and $R^b$ are each independently a C1-12 alkyl group, C1-12 alkenyl, C3-8 cycloalkyl, or C1-12 alkoxy; wherein p and q are each independently integers of 0 to 4; and wherein $X^a$ is a single bond, —O—, —S—, —S(O)—, —S(O)$_2$—, —C(O)—, a C1-11 alkylidene of formula —C($R^c$)($R^d$)—; wherein $R^c$ and $R^d$ are each independently hydrogen or C1-10 alkyl, or a group of the formula —C(=$R^e$)—; wherein $R^e$ is a divalent C1-10 hydrocarbon group; and wherein the second repeating units are siloxane units of the formula:

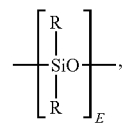

wherein R is each independently a C1-13 monovalent hydrocarbon group; and wherein E has an average value of 2 to 200.

In a further aspect, the siloxane units are a combination of one or more units of the formula:

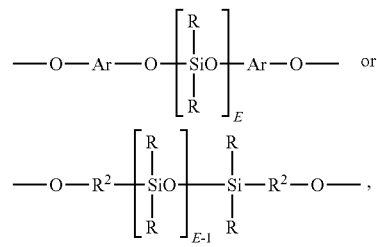

wherein each occurrence of R is independently a C1-C13 monovalent hydrocarbon group; wherein each occurrence of Ar is independently a C6-C30 aromatic group; wherein each occurrence of $R^2$ is independently a C2-C8 alkylene group; and wherein E has an average value of 2 to 200.

In a further aspect, the siloxane units are a combination of one or more units of the formula:

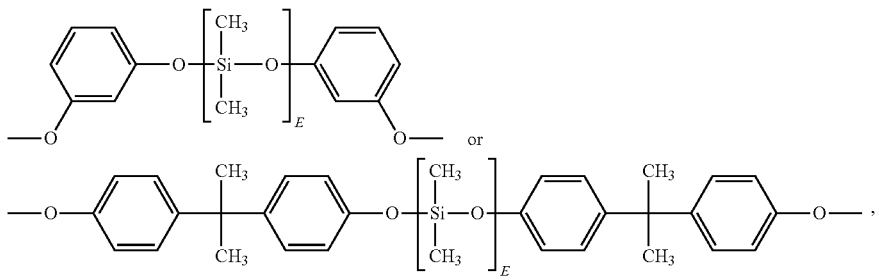

wherein E has an average value of 2 to 200.

In a further aspect, the siloxane units have the formula:

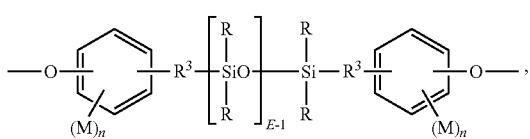

wherein each occurrence of R is independently a C1-C13 monovalent hydrocarbon group; wherein each occurrence of R³ is independently a divalent C1-C8 aliphatic group; wherein each occurrence of M is independently a halogen, cyano, nitro, C1-8 alkylthio, C1-8 alkyl, C1-8 alkoxy, C2-8 alkenyl, C2-8 alkenyloxy group, C3-8 cycloalkyl, C3-8 cycloalkoxy, C6-10 aryl, C6-10 aryloxy, C7-12 arylalkyl, C7-12 arylalkoxy, C7-12 alkylaryl, or C7-12 alkylaryloxy, or a combination comprising at least one of the foregoing; wherein each occurrence of n is independently 0, 1, 2, 3, or 4; and wherein E has an average value of 2 to 200.

In a further aspect, the siloxane units are a combination of one or more units of the formula:

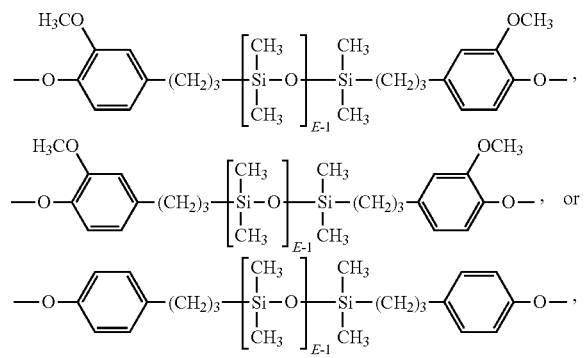

wherein E has an average value of 2 to 200.

In a further aspect, the siloxane units are a combination of one or more units of the formula:

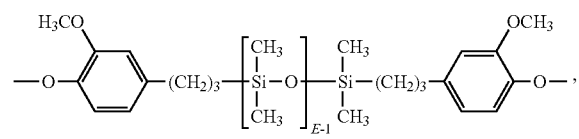

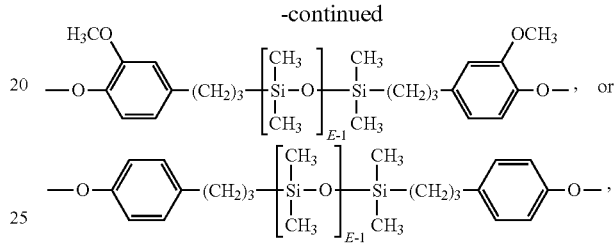

wherein E has an average value of 5 to 120.

The disclosed polysiloxane-polycarbonate block copolymers can also be end-capped as similarly described in connection with the manufacture of polycarbonates set forth herein. For example, according to aspects of the disclosure, a polysiloxane-polycarbonate block copolymer can be end capped with p-cumyl-phenol.

A non-limiting example of a polycarbonate-siloxane copolymer includes transparent EXL, available from SABIC Innovative Plastics. The transparent EXL from SABIC is a polycarbonate-polysiloxane (9030T) copolymer, having been tested commercially and found to have about 6 mole % siloxane, a Mw of about 23,000. Another non-limiting example of a polycarbonate-siloxane copolymer includes opaque EXL, available from SABIC Innovative Plastics. The opaque EXL from SABIC is a polycarbonate-polysiloxane (9030P) copolymer, having been tested commercially and found to have about 20 mole % siloxane, a Mw of about 29,900.

The polysiloxane polycarbonate copolymer component can be present in the thermoplastic composition in any desired amount. For example, in aspects of the disclosure, the polysiloxane polycarbonate copolymer is present in an amount of about 0 wt % to about 30 wt % of a polycarbonate-polysiloxane copolymer component relative to the total weight of the thermoplastic composition. In various further aspects, the polysiloxane polycarbonate copolymer is present in an amount of at least about 1 wt % relative to the total weight of the thermoplastic composition. For example, the polycarbonate-polysiloxane copolymer can be present in an amount in the range of from 1 wt % to 30 wt % relative to the total weight of the thermoplastic composition, including exemplary amounts of 0.1 wt %, 0.25 wt %, 0.5 wt %, 1.0 wt %, 1.5 wt %, 2 wt %, 2.5 wt %, 3 wt %, 3.5 wt %, 4 wt %, 4.5 wt %, 5 wt %, 5.5 wt %, 6 wt %, 6.5 wt %, 7 wt %, 7.5 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, and 30 wt %.

In still further aspects, the polysiloxane polycarbonate copolymer can be present within any range of amounts derived from any two of the above stated values. For example, the polysiloxane polycarbonate copolymer can be present in an amount in the range of from about 1 to about 5 wt %, or in an amount in the range of from about 1 wt % to about 10 wt %.

In one aspect, the polycarbonate-polysiloxane copolymer component is a polycarbonate-polydimethylsiloxane copolymer. In another aspect, the polycarbonate portion of the polycarbonate-polysiloxane copolymer comprises residues derived from BPA. In still another aspect, the polycarbonate portion of the polycarbonate-polysiloxane copolymer comprising residues derived from BPA is a homopolymer. In still another aspect, the polycarbonate-polysiloxane copolymer component comprises a polycarbonate-polysiloxane block copolymer.

In one aspect, the polycarbonate-polysiloxane block copolymer comprises a polycarbonate-polydimethylsiloxane block copolymer. In another aspect, the polycarbonate block comprises residues derived from BPA. In still other aspect, the polycarbonate block comprising residues derived from BPA is a homopolymer.

In one aspect, the polycarbonate-polysiloxane block copolymer comprises from about 3 wt % to about 10 wt % siloxane. In another aspect, the polycarbonate-polysiloxane block copolymer comprises from about 4 wt % to about 8 wt % siloxane. In still another aspect, the polycarbonate-polysiloxane block copolymer comprises about 5 wt % siloxane. In still another aspect, the polycarbonate-polysiloxane block copolymer comprises about 6 wt % siloxane. In still another aspect, the polycarbonate-polysiloxane block copolymer comprises about 7 wt % siloxane. In still another aspect, the polycarbonate-polysiloxane block copolymer comprises about 8 wt % siloxane.

In one aspect, the polysiloxane block has a weight average molecular weight from about 20,000 to about 26,000 Daltons. In another aspect, the polysiloxane block has a weight average molecular weight from about 21,000 to about 25,000 Daltons. In still another aspect, the polysiloxane block has a weight average molecular weight from about 22,000 to about 24,000 Daltons. In still another aspect, the polysiloxane block has a weight average molecular weight of about 22,000 Daltons. In still another aspect, the polysiloxane block has a weight average molecular weight of about 23,000 Daltons. In still another aspect, the polysiloxane block has a weight average molecular weight of about 24,000 Daltons. In still another aspect, the polysiloxane block has a weight average molecular weight of about 25,000 Daltons.

In one aspect, the polycarbonate-polysiloxane block copolymer comprises from about 15 wt % to about 25 wt % siloxane. In another aspect, the polycarbonate-polysiloxane block copolymer comprises from about 17 wt % to about 23 wt % siloxane. In still another aspect, the polycarbonate-polysiloxane block copolymer comprises from about 18 wt % to about 22 wt % siloxane. In still another aspect, the polycarbonate-polysiloxane block copolymer comprises from about 19 wt % to about 21 wt % siloxane. In still another aspect, the polycarbonate-polysiloxane block copolymer comprises about 18 wt % siloxane. In still another aspect, the polycarbonate-polysiloxane block copolymer comprises about 19 wt % siloxane. In still another aspect, the polycarbonate-polysiloxane block copolymer comprises about 20 wt % siloxane. In still another aspect, the polycarbonate-polysiloxane block copolymer comprises about 21 wt % siloxane. In still another aspect, the polycarbonate-polysiloxane block copolymer comprises about 22 wt % siloxane.

In one aspect, the polysiloxane block has a weight average molecular weight from about 25,000 to about 32,000 Daltons. In another aspect, the polysiloxane block has a weight average molecular weight from about 26,000 to about 31,000 Daltons. In still another aspect, the polysiloxane block has a weight average molecular weight from about 27,000 to about 30,000 Daltons. In still another aspect, the polysiloxane block has a weight average molecular weight from about 28,000 to about 30,000 Daltons. In still another aspect, the polysiloxane block has a weight average molecular weight of about 27,000 Daltons. In still another aspect, the polysiloxane block has a weight average molecular weight of about 28,000 Daltons. In still another aspect, the polysiloxane block has a weight average molecular weight of about 29,000 Daltons. In still another aspect, the polysiloxane block has a weight average molecular weight of about 30,000 Daltons. In still another aspect, the polysiloxane block has a weight average molecular weight of about 31,000 Daltons.

Splay-Reducing Component

In various aspects, the blended polycarbonate compositions of the present invention comprise a splay-reducing component. In a further aspect, the splay-reducing component is not fully miscible with the polycarbonate component. In a still further aspect, the splay-reducing component is not fully miscible with a polycarbonate polymer. In a yet further aspect, the splay-reducing component is not fully miscible with with a poly(carbonate-siloxane) copolymer. In an even further aspect, the splay-reducing component is not fully miscible with blends of a first polycarbonate polymer and a second polycarbonate polymer. In a still further aspect, the splay-reducing component is not fully miscible with blends of a first poly(carbonate-siloxane) copolymer and a second poly(carbonate-siloxane) copolymer. In a yet further aspect, the splay-reducing component is not fully miscible with blends of one or polycarbonate polymers and one or more poly(carbonate-siloxane) copolymers.

In a further aspect, the splay-reducing component comprises a polyester polymer, an (isophthalic acid-terephthalic acid-resorcinol)-bisphenol A copolyestercarbonate copolymer, or combinations thereof. In a still further aspect, the splay-reducing component is an (isophthalic acid-terephthalic acid-resorcinol)-bisphenol A copolyestercarbonate copolymer. In a yet further aspect, the splay-reducing component is a polyester. In an even further aspect, the polyester is a poly(alkylene terephthalate).

In a further aspect, the splay-reducing component is present in an amount from about 1 wt % to about 20 wt %, wherein the weight percent values are based on the total weight of the composition. In a still further aspect, the splay-reducing component is present in an amount from about 1 wt % to about 19 wt %, wherein the weight percent values are based on the total weight of the composition. In a yet further aspect, the splay-reducing component is present in an amount from about 1 wt % to about 18 wt %, wherein the weight percent values are based on the total weight of the composition. In an even further aspect, the splay-reducing component is present in an amount from about 1 wt % to about 17 wt %, wherein the weight percent values are based on the total weight of the composition. In a still further aspect, the splay-reducing component is present in an amount from about 1 wt % to about 16 wt %, wherein the weight percent values are based on the total weight of the composition. In a yet further aspect, the splay-reducing component is present in an amount from about 1 wt % to about 15 wt %, wherein the weight percent values are based on the total weight of the composition. In an even further aspect, the splay-reducing component is present in an amount from about 1 wt % to about 14 wt %, wherein the weight percent values are based on the total weight of the composition. In a still further aspect, the splay-reducing component is present in an amount from about 1 wt % to about 13 wt %, wherein the weight percent values are based on the total weight of the composition. In a yet further aspect, the splay-reducing component is present in an amount from about 1 wt % to about 12 wt %, wherein the weight percent values are based on the total weight of the composition. In an even further aspect, the splay-reducing component is present in an amount from about 1 wt % to about 11 wt %, wherein the weight percent values are based on the total weight of the composition. In a still further aspect, the splay-reducing component is present in an amount from about 1 wt % to about 10 wt %, wherein the weight percent values are based on the total weight of the composition. In a yet further aspect, the splay-reducing component is present in an amount from about 1 wt % to about 9 wt %, wherein the weight percent values are based on the total weight of the composition. In an even further aspect, the splay-reducing component is present in an amount from about 1 wt % to about 8 wt %, wherein the weight percent values are based on the total weight of the composition. In a still further aspect, the splay-reducing component is present in an amount from about 1 wt % to about 7 wt %, wherein the weight percent values are based on the total weight of the composition. In a yet further aspect, the splay-reducing component is present in an amount from about 1 wt % to about 6 wt %, wherein the weight percent values are based on the total weight of the composition. In a still further aspect, the splay-reducing component is present in an amount from about 1 wt % to about 5 wt %, wherein the weight percent values are based on the total weight of the composition.

In a further aspect, the splay-reducing component is present in an amount from about 5 wt % to about 20 wt %, wherein the weight percent values are based on the total weight of the composition. In a still further aspect, the splay-reducing component is present in an amount from about 5 wt % to about 19 wt %, wherein the weight percent values are based on the total weight of the composition. In a yet further aspect, the splay-reducing component is present in an amount from about 5 wt % to about 18 wt %, wherein the weight percent values are based on the total weight of the composition. In an even further aspect, the splay-reducing component is present in an amount from about 5 wt % to about 17 wt %, wherein the weight percent values are based on the total weight of the composition. In a still further aspect, the splay-reducing component is present in an amount from about 5 wt % to about 16 wt %, wherein the weight percent values are based on the total weight of the composition. In a yet further aspect, the splay-reducing component is present in an amount from about 5 wt % to about 15 wt %, wherein the weight percent values are based on the total weight of the composition. In an even further aspect, the splay-reducing component is present in an amount from about 5 wt % to about 14 wt %, wherein the weight percent values are based on the total weight of the composition. In a still further aspect, the splay-reducing component is present in an amount from about 5 wt % to about 13 wt %, wherein the weight percent values are based on the total weight of the composition. In a yet further aspect, the splay-reducing component is present in an amount from about 5 wt % to about 12 wt %, wherein the weight percent values are based on the total weight of the composition. In an even further aspect, the splay-reducing component is present in an amount from about 5 wt % to about 11 wt %, wherein the weight percent values are based on the total weight of the composition. In a still further aspect, the splay-reducing component is present in an amount from about 5 wt % to about 10 wt %, wherein the weight percent values are based on the total weight of the composition. In a yet further aspect, the splay-reducing component is present in an amount from about 5 wt % to about 9 wt %, wherein the weight percent values are based on the total weight of the composition. In an even further aspect, the splay-reducing component is present in an amount from about 5 wt % to about 8 wt %, wherein the weight percent values are based on the total weight of the composition. In a still further aspect, the splay-reducing component is present in an amount from about 5 wt % to about 7 wt %, wherein the weight percent values are based on the total weight of the composition.

In a further aspect, the splay-reducing component is present in an amount of about 5 wt %, wherein the weight percent value is based on the total weight of the composition. In a still further aspect, the splay-reducing component is present in an amount of about 6 wt %, wherein the weight percent value is based on the total weight of the composition. In a yet further aspect, the splay-reducing component is present in an amount of about 7 wt %, wherein the weight percent value is based on the total weight of the composition. In an even further aspect, the splay-reducing component is present in an amount of about 8 wt %, wherein the weight percent value is based on the total weight of the composition. In a still further aspect, the splay-reducing component is present in an amount of about 9 wt %, wherein the weight percent value is based on the total weight of the composition. In a yet further aspect, the splay-reducing component is present in an amount of about 10 wt %, wherein the weight percent value is based on the total weight of the composition. In an even further aspect, the splay-reducing component is present in an amount of about 11 wt %, wherein the weight percent value is based on the total weight of the composition. In a still further aspect, the splay-reducing component is present in an amount of about 12 wt %, wherein the weight percent value is based on the total weight of the composition. In a yet further aspect, the splay-reducing component is present in an amount of about 13 wt %, wherein the weight percent value is based on the total weight of the composition. In an even further aspect, the splay-reducing component is present in an amount of about 14 wt %, wherein the weight percent value is based on the total weight of the composition. In a still further aspect, the splay-reducing component is present in an amount of about 15 wt %, wherein the weight percent value is based on the total weight of the composition. In a yet further aspect, the splay-reducing component is present in an amount of about 16 wt %, wherein the weight percent value is based on the total weight of the composition. In an even further aspect, the splay-reducing component is present in an amount of about 17 wt %, wherein the weight percent value is based on the total weight of the composition. In a still further aspect, the splay-reducing component is present in an amount of about 18 wt %, wherein the weight percent value is based on the total weight of the composition. In an even further aspect, the splay-reducing component is present in an amount of about 19 wt %, wherein the weight percent value is based on the total weight of the composition. In a still further aspect, the splay-reducing component is present in an amount of about 20 wt %, wherein the weight percent value is based on the total weight of the composition.

Poly(Alkylene Esters)

In various aspects, the blended polycarbonate compositions of the present invention comprise a poly(alkylene ester). In a further aspect, a poly(alklyene ester) of the present invention has repeating units of the following general formula:

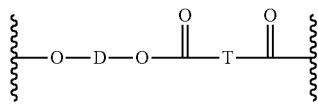

wherein T comprises groups derived from aromatic dicarboxylates, cycloaliphatic dicarboxylic acids, or derivatives thereof, and wherein D is a divalent radical derived from a dihydroxy compound such as a C2-10 alkylene radical. Examples of specifically useful T groups include 1,2-, 1,3-, and 1,4-phenylene; 1,4- and 1,5-naphthylenes; cis- or trans-1,4-cyclohexylene; and the like. Thus, in the foregoing formula, where T is 1,4-phenylene, the poly(alkylene ester) is a poly(alkylene terephthalate). In addition, for poly(alkylene arylate), specifically useful alkylene groups D include, for example, ethylene, 1,4-butylene, and bis-(alkylene-disubstituted cyclohexane) including cis- and/or trans-1,4-(cyclohexylene)dimethylene.

Examples of aromatic dicarboxylic acids that can be used to prepare the poly(alklyene esters) include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, or mixtures thereof. In various aspects, a dicarboxylic acid comprises a mixture of isophthalic acid and terephthalic acid wherein the weight ratio of isophthalic acid to terephthalic acid is 91:1 to 2:98. In a further aspect, D is a C2-6 alkylene radical and T is p-phenylene, m-phenylene, naphthalene, a divalent cycloaliphatic radical, or a mixture thereof.

In a further aspect, the blended polycarbonate compositions of the present invention comprise a poly(alkylene terephthalate), wherein T is 1,4-phenylene and D is a C2-10 alkylene radical. In a still further aspect, T is 1,4-phenylene and D is a C2-6 alkylene radical. In a yet further aspect, T is 1,4-phenylene and D is a C2-4 alkylene radical. In an even further aspect, In a still further aspect, T is 1,4-phenylene and D is an ethylene radical. Examples of poly(alkylene terephthalates) include poly(ethylene terephthalate) (PET), poly(1,4-butylene terephthalate) (PBT), and poly(propylene terephthalate) (PPT). Also useful are poly(alkylene naphthoates), such as poly(ethylene naphthanoate) (PEN), and poly(1,4-butylene naphthanoate) (PBN). Suitable poly(alkylene terephthalates) are commercially available. For example, suitable low viscosity (i.e. about 0.60 dl/g) 8918K (Invista), V004 (Invista), RT12 (Invista), RT4027 (Invista), Advanite 11010 (Advansa), SB500 (Yizheng), SC300-A6 (Shinkong), and SC300-B6 (Shinkong). Alternatively, for example, suitable high viscosity (i.e. about 0.80 dl/g) PET compositions include BC-112 (SABIC IP), HC-100 (SABIC IP), Eslon H2211 (Saehan), Vorcalor 9921W (Indorama Polymers), Ramapet N1(S) (Indorama Polymers), BG80 (Yizheng), BG801 (Yizheng), SC880-A6 (rec) (Shinkong), and SC880-B6 (rec).

The poly(alkylene esters) of the present invention can be prepared by any means known to those having ordinary skill in this art. For example, suitable poly(alkylene esters) can be obtained by interfacial polymerization or melt-process condensation as described above, by solution phase condensation, or by transesterification polymerization wherein, for example, a dialkyl ester such as dimethyl terephthalate can be transesterified with ethylene glycol using acid catalysis, to generate poly(ethylene terephthalate).

In a further aspect, the polycondensation of terephthalic acid and ethylene glycol by an ester exchange reaction or direct esterification reaction can be used to prepare a suitable PET for use in the disclosed blended polycarbonate compositions. In a still further aspect, PET can be prepared by the esterification of ethylene glycol and terephthalic acid or by the ester interchange of dimethyl terephthalate with ethylene glycol, followed by polycondensation in the presence of a catalyst such as antimony trioxide, at a temperature of about 285° C. and at a pressure of about 1 millimeter of mercury. The PET reaction product can then be extruded at a temperature of about 285° C. and a pressure of one atmosphere into water and allowed to solidify therein. The solid PET can then be pelletized by means known to those skilled in the art. For example, the PET can be pelletized using an underwater pelletizer. It is known that the intrinsic viscosity of PET can be increased by solid state polymerization in the presence of an inert gas such as nitrogen (see, e.g., U.S. Pat. No. 4,064,112).

It should be noted that the terms "polyethylene terephthalate" and "PET" as used herein are meant to include PET no matter how prepared. Furthermore, these terms are meant to include polyethylene terephthalate polymers which are reacted with minor, e.g., less than about 20 percent by weight of the polymer, amounts of modifying agents. Such modifying agents include various diols such as 1,4 butane diol, cyclohexane dimethanol and 1,3 propane diol. Other modifying agents include various diacids such as isophthalic acid, adipic acid, 2,6 naphthalene dicarboxylic acid and p-hydroxy benzoic acid. Minor amounts of chain branching agents and/or chain terminating agents can also be used. Such chain branching agents include, for example, polyfunctional acids and/or polyfunctional alcohols such as trimethylol propane and pentaerythritol. Chain terminating agents include monofunctional alcohols and/or monofunctional carboxylic acids such as stearic acid and benzoic acid. Mixtures of the chain branching and chain terminating agents can also be used. PET which contains such chain branching agents and chain terminating agents is described in U.S. Pat. No. 4,161,579.

It is possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition. The polyesters described herein are generally completely miscible with the polycarbonates when blended.

The PET utilized in the blended polycarbonate compositions of this invention is typically comprised of repeat units which are derived from terephthalic acid or a diester thereof and ethylene glycol or a diester thereof. For instance, the PET can be prepared by polymerizing terephthalic acid with ethylene glycol or by polymerizing dimethyl terephthalate with ethylene glycol. Accordingly, the PET can be PET homopolymer which is comprised of repeat units which are derived only from terephthalic acid or a diester thereof and ethylene glycol or a diester thereof. The PET utilized in the disclosed compositions can optionally be a modified PET. Such modified PET can contain small amounts of repeat units which are derived from diacids other than terephthalic acid and/or glycol in addition to ethylene glycol. For instance, small amounts of isophthalic acid or a naphthalene dicarboxylic acid can be used in the diacid component utilized in preparing the PET. PET which has been modified with a small amount of diol containing from 3 to about 8 carbon atoms is also representative of a modified PET which can be utilized. For instance, a small amount of 1,4-butane diol can be utilized in the glycol component used in preparing the modified PET. Normally, no more than about 5 weight percent of the repeat units in such modified PET will be comprised of diacids or diols other than terephthalic acid and ethylene glycol. It is, of course, contemplated that diesters of such dicarboxylic acids and diols can also be used. In most cases, such modified PET will contain less than about 3% diacids other than terephthalic acid and less than 3% diols other than ethylene glycol. More typically, such modified polyesters will contain less than about 1% dicarboxylic acids other than terephthalic acid and/or less than 1% glycols other than ethylene glycol.

In a further aspect, the poly(alkylene esters) of the present invention are prepared in such a manner that they have a high intrinsic viscosity, which can also be indicated by "IV" or η. To this end, resins having high intrinsic viscosities can also be obtained by providing a resin having a relatively low intrinsic viscosity and polymerizing it further according to any conventional solid-phase polymerization technique. For example, the poly(alkylene esters) used herein have an intrinsic viscosity of from about 0.6 to about 2.0 dl/g as measured in a 60:40 phenol/tetrachloroethane mixture or similar solvent at 23°-30° C. Alternatively, the intrinsic viscosity can be calculated from the solution viscosity of a resin as measured at 25° C. in a 50/50 (by weight) solvent mixture of phenol and tetrachloroethane. The poly(alkylene esters) can have a weight average molecular weight of 20,000 to 200,000, specifically 50,000 to 150,000 as measured by gel permeation chromatography (GPC).

In various aspects, the poly(alkylene esters) of the present invention have an IV equal to or greater than about 0.60 as measured in phenol/tetrachloroethane (60:40 by weight) at about 25° C. In a further aspect, the poly(alkylene esters) of the present invention have an IV equal to or greater than about 0.65 as measured in phenol/tetrachloroethane (60:40 by weight) at about 25° C. In a still further aspect, the poly(alkylene esters) of the present invention have an IV equal to or greater than about 0.70 as measured in phenol/tetrachloroethane (60:40 by weight) at about 25° C. In a yet further aspect, the poly(alkylene esters) of the present invention have an IV equal to or greater than about 0.75 as measured in phenol/tetrachloroethane (60:40 by weight) at about 25° C. In an even further aspect, the poly(alkylene esters) of the present invention have an IV equal to or greater than about 0.80 as measured in phenol/tetrachloroethane (60:40 by weight) at about 25° C. In a still further aspect, the poly(alkylene esters) of the present invention have an IV equal to or greater than about 0.85 as measured in phenol/tetrachloroethane (60:40 by weight) at about 25° C. In a yet further aspect, the poly(alkylene esters) of the present invention have an IV equal to or greater than about 0.90 as measured in phenol/tetrachloroethane (60:40 by weight) at about 25° C. In an even further aspect, the poly(alkylene esters) of the present invention have an IV equal to or greater than about 0.95 as measured in phenol/tetrachloroethane (60:40 by weight) at about 25° C.

In various aspects, the poly(alkylene terephthalates) of the present invention have an IV equal to or greater than about 0.60 as measured in phenol/tetrachloroethane (60:40 by weight) at about 25° C. In a further aspect, the poly(alkylene terephthalates) of the present invention have an IV equal to or greater than about 0.65 as measured in phenol/tetrachloroethane (60:40 by weight) at about 25° C. In a still further aspect, the poly(alkylene terephthalates) of the present invention have an IV equal to or greater than about 0.70 as measured in phenol/tetrachloroethane (60:40 by weight) at about 25° C. In a yet further aspect, the poly(alkylene terephthalates) of the present invention have an IV equal to or greater than about 0.75 as measured in phenol/tetrachloroethane (60:40 by weight) at about 25° C. In an even further aspect, the poly(alkylene terephthalates) of the present invention have an IV equal to or greater than about 0.80 as measured in phenol/tetrachloroethane (60:40 by weight) at about 25° C. In a still further aspect, the poly(alkylene terephthalates) of the present invention have an IV equal to or greater than about 0.85 as measured in phenol/tetrachloroethane (60:40 by weight) at about 25° C. In a yet further aspect, the poly(alkylene terephthalates) of the present invention have an IV equal to or greater than about 0.90 as measured in phenol/tetrachloroethane (60:40 by weight) at about 25° C. In an even further aspect, the poly(alkylene terephthalates) of the present invention have an IV equal to or greater than about 0.95 as measured in phenol/tetrachloroethane (60:40 by weight) at about 25° C.

In a further aspect, the poly(alkylene ester) component is present in an amount from about 2 wt % to about 9 wt %. In a still further aspect, the poly(alkylene ester) component is present in an amount from about 2 wt % to about 8 wt %. In a yet further aspect, the poly(alkylene ester) component is present in an amount from about 2 wt % to about 7 wt %. In an even further aspect, the poly(alkylene ester) component is present in an amount from about 2 wt % to about 6 wt %. In a still further aspect, the poly(alkylene ester) component is present in an amount from about 2 wt % to about 5 wt %.

In a further aspect, the poly(alkylene ester) component is present in an amount from about 3 wt % to about 9 wt %. In a still further aspect, the poly(alkylene ester) component is present in an amount from about 3 wt % to about 8 wt %. In a yet further aspect, the poly(alkylene ester) component is present in an amount from about 3 wt % to about 7 wt %. In an even further aspect, the poly(alkylene ester) component is present in an amount from about 3 wt % to about 6 wt %. In a still further aspect, the poly(alkylene ester) component is present in an amount from about 3 wt % to about 5 wt %.

In a further aspect, the poly(alkylene ester) component is present in an amount from about 4 wt % to about 9 wt %. In a still further aspect, the poly(alkylene ester) component is present in an amount from about 4 wt % to about 8 wt %. In a yet further aspect, the poly(alkylene ester) component is present in an amount from about 4 wt % to about 7 wt %. In an even further aspect, the poly(alkylene ester) component is present in an amount from about 4 wt % to about 6 wt %. In a still further aspect, the poly(alkylene ester) component is present in an amount from about 4 wt % to about 5 wt %.

In a further aspect, the poly(alkylene ester) component is has a high intrinsic viscosity. In a still further aspect, the poly(alkylene ester) component has an intrinsic viscosity greater than or equal to about 0.50 when determined in accordance with ASTM D4603. In a yet further aspect, the poly(alkylene ester) component has an intrinsic viscosity greater than or equal to about 0.55 when determined in accordance with ASTM D4603. In an even further aspect, the poly(alkylene ester) component has an intrinsic viscosity greater than or equal to about 0.60 when determined in accordance with ASTM D4603. In a still further aspect, the poly(alkylene ester) component has an intrinsic viscosity greater than or equal to about 0.65 when determined in accordance with ASTM D4603. In a yet further aspect, the poly(alkylene ester) component has an intrinsic viscosity greater than or equal to about 0.70 when determined in accordance with ASTM D4603. In an even further aspect, the poly(alkylene ester) component has an intrinsic viscosity greater than or equal to about 0.75 when determined in accordance with ASTM D4603. In a still further aspect, the poly(alkylene ester) component has an intrinsic viscosity greater than or equal to about 0.80 when determined in accordance with ASTM D4603. In a yet further aspect, the poly(alkylene ester) component has an intrinsic viscosity greater than or equal to about 0.82 when determined in accordance with ASTM D4603. In an even further aspect, the poly(alkylene ester) component has an intrinsic viscosity greater than or equal to about 0.85 when determined in accordance with ASTM D4603. In a still further aspect, the poly(alkylene ester) component has an intrinsic viscosity greater than or equal to about 0.87 when determined in accordance with ASTM D4603. In a yet further aspect, the poly(alkylene ester) component has an intrinsic viscosity greater than or equal to about 0.90 when determined in accordance with ASTM D4603. In an even further aspect, the poly(alkylene ester) component has an intrinsic viscosity greater than or equal to about 0.92 when determined in accordance with ASTM D4603.

In a further aspect, the poly(alkylene ester) component comprises one or more of poly(ethylene terephthalate) (PET), poly(1,4-butylene terephthalate) (PBT), poly(propylene terephthalate) (PPT), poly(ethylene naphthanoate) (PEN), and poly(1,4-butylene naphthanoate) (PBN). In a still further aspect, the poly(alkylene ester) component comprises one or more of poly(ethylene terephthalate) (PET), poly(1,4-butylene terephthalate) (PBT), and poly(propylene terephthalate) (PPT). In a yet further aspect, the poly(alkylene ester) component comprises at least one of poly(ethylene terephthalate) (PET) or poly(1,4-butylene terephthalate) (PBT). In an even further aspect, the poly(alkylene ester) component comprises poly(ethylene terephthalate) (PET). In a still further aspect, the poly(alkylene ester) component comprises poly(1,4-butylene terephthalate) (PBT).

In a further aspect, the poly(alkylene ester) component comprises a poly(alkylene terephthalate) component.

In a further aspect, the poly(alkylene terephthalate) component comprises one or more of poly(ethylene terephthalate) (PET), poly(1,4-butylene terephthalate) (PBT), and poly(propylene terephthalate) (PPT). In a still further aspect, the poly(alkylene terephthalate) component further comprises poly(ethylene naphthanoate) (PEN) or poly(1,4-butylene naphthanoate) (PBN). In a yet further aspect, the poly(alkylene terephthalate) component comprises at least one of poly(ethylene terephthalate) (PET) or poly(1,4-butylene terephthalate) (PBT). In an even further aspect, the poly(alkylene terephthalate) component comprises poly(ethylene terephthalate) (PET). In a still further aspect, the poly(alkylene terephthalate) component comprises poly(1,4-butylene terephthalate) (PBT).

In a further aspect, the poly(alkylene terephthalate) component comprises one or more of PET, PBT, PPT, PEN, PBN, PETG, or PCTG. In a still further aspect, the poly(alkylene terephthalate) component comprises one or more of PET, PETG, or PBT. In a further aspect, the poly(alkylene terephthalate) component comprises PET. In an even further aspect, the poly(alkylene terephthalate) component comprises PBT. In a still further aspect, the poly(alkylene terephthalate) component comprises PETG. In a yet further aspect, the poly(alkylene terephthalate) component comprises PCTG. In an even further aspect, the poly(alkylene terephthalate) comprises PET or PBT, or combinations thereof.

In various further aspects, the poly(alkylene terephthalate) component comprises one or more of PET, PBT, PPT, PEN, PBN, or PETG, or combinations thereof. In a further aspect, the poly(alkylene terephthalate) component comprises one or more of PET, PETG, or PBT, or combinations ther. In a further aspect, the poly(alkylene terephthalate) component comprises at least one PET. In an even further aspect, the poly(alkylene terephthalate) component comprises at least one PBT. In a still further aspect, the poly(alkylene terephthalate) component comprises at least one PETG. In an even further aspect, the poly(alkylene terephthalate) comprises at least one PET or PBT, or combinations thereof.

In a further aspect, the poly(alkylene terephthalate) component is present in an amount from about 2 wt % to about 9 wt %. In a still further aspect, the poly(alkylene terephthalate) component is present in an amount from about 2 wt % to about 8 wt %. In a yet further aspect, the poly(alkylene terephthalate) component is present in an amount from about 2 wt % to about 7 wt %. In an even further aspect, the poly(alkylene terephthalate) component is present in an amount from about 2 wt % to about 6 wt %. In a still further aspect, the poly(alkylene terephthalate) component is present in an amount from about 2 wt % to about 5 wt %.

In a further aspect, the poly(alkylene terephthalate) component is present in an amount from about 3 wt % to about 9 wt %. In a still further aspect, the poly(alkylene terephthalate) component is present in an amount from about 3 wt % to about 8 wt %. In a yet further aspect, the poly(alkylene terephthalate) component is present in an amount from about 3 wt % to about 7 wt %. In an even further aspect, the poly(alkylene terephthalate) component is present in an amount from about 3 wt % to about 6 wt %. In a still further aspect, the poly(alkylene terephthalate) component is present in an amount from about 3 wt % to about 5 wt %.

In a further aspect, the poly(alkylene terephthalate) component is present in an amount from about 4 wt % to about 9 wt %. In a still further aspect, the poly(alkylene terephthalate) component is present in an amount from about 4 wt % to about 8 wt %. In a yet further aspect, the poly(alkylene terephthalate) component is present in an amount from about 4 wt % to about 7 wt %. In an even further aspect, the poly(alkylene terephthalate) component is present in an amount from about 4 wt % to about 6 wt %. In a still further aspect, the poly(alkylene terephthalate) component is present in an amount from about 4 wt % to about 5 wt %.

In a further aspect, the poly(alkylene terephthalate) component is has a high intrinsic viscosity. In a still further aspect, the poly(alkylene terephthalate) component has an intrinsic viscosity greater than or equal to about 0.50 when determined in accordance with ASTM D4603. In a yet further aspect, the poly(alkylene terephthalate) component has an intrinsic viscosity greater than or equal to about 0.55 when determined in accordance with ASTM D4603. In an even further aspect, the poly(alkylene terephthalate) component has an intrinsic viscosity greater than or equal to about 0.60 when determined in accordance with ASTM D4603. In a still further aspect, the poly(alkylene terephthalate) component has an intrinsic viscosity greater than or equal to about 0.65 when determined in accordance with ASTM D4603. In a yet further aspect, the poly(alkylene terephthalate) component has an intrinsic viscosity greater than or equal to about 0.70 when determined in accordance with ASTM D4603. In an even further aspect, the poly(alkylene terephthalate) component has an intrinsic viscosity greater than or equal to about 0.75 when determined in accordance with ASTM D4603. In a still further aspect, the poly(alkylene terephthalate) component has an intrinsic viscosity greater than or equal to about 0.80 when determined in accordance with ASTM D4603. In a yet further aspect, the poly(alkylene terephthalate) component has an intrinsic viscosity greater than or equal to about 0.82 when determined in accordance with ASTM D4603. In an even further aspect, the poly(alkylene terephthalate) component has an intrinsic viscosity greater than or equal to about 0.85 when determined in accordance with ASTM D4603. In a still further aspect, the poly(alkylene terephthalate) component has an intrinsic viscosity greater than or equal to about 0.87 when determined in accordance with ASTM D4603. In a yet further aspect, the poly(alkylene terephthalate) component has an intrinsic viscosity greater than or equal to about 0.90 when determined in accordance with ASTM D4603. In an even further aspect, the poly(alkylene terephthalate) component has an intrinsic viscosity greater than or equal to about 0.92 when determined in accordance with ASTM D4603.

In a further aspect, the polyethylene terephthalate component is present in an amount from about 2 wt % to about 9 wt %. In a still further aspect, the polyethylene terephthalate component is present in an amount from about 2 wt % to about 8 wt %. In a yet further aspect, the polyethylene terephthalate component is present in an amount from about 2 wt % to about 7 wt %. In an even further aspect, the polyethylene terephthalate component is present in an amount from about 2 wt % to about 6 wt %. In a still further aspect, the polyethylene terephthalate component is present in an amount from about 2 wt % to about 5 wt %.

In a further aspect, the polyethylene terephthalate component is present in an amount from about 3 wt % to about 9 wt %. In a still further aspect, the polyethylene terephthalate component is present in an amount from about 3 wt % to about 8 wt %. In a yet further aspect, the polyethylene terephthalate component is present in an amount from about 3 wt % to about 7 wt %. In an even further aspect, the polyethylene terephthalate component is present in an amount from about 3 wt % to about 6 wt %. In a still further aspect, the polyethylene terephthalate component is present in an amount from about 3 wt % to about 5 wt %.

In a further aspect, the polyethylene terephthalate component is present in an amount from about 4 wt % to about 9 wt %. In a still further aspect, the polyethylene terephthalate component is present in an amount from about 4 wt % to about 8 wt %. In a yet further aspect, the polyethylene terephthalate component is present in an amount from about 4 wt % to about 7 wt %. In an even further aspect, the polyethylene terephthalate component is present in an amount from about 4 wt % to about 6 wt %. In a still further aspect, the polyethylene terephthalate component is present in an amount from about 4 wt % to about 5 wt %.

In a further aspect, the polyethylene terephthalate component is has a high intrinsic viscosity. In a still further aspect, the polyethylene terephthalate component has an intrinsic viscosity greater than or equal to about 0.50 when determined in accordance with ASTM D4603. In a yet further aspect, the polyethylene terephthalate component has an intrinsic viscosity greater than or equal to about 0.55 when determined in accordance with ASTM D4603. In an even further aspect, the polyethylene terephthalate component has an intrinsic viscosity greater than or equal to about 0.60 when determined in accordance with ASTM D4603. In a still further aspect, the polyethylene terephthalate component has an intrinsic viscosity greater than or equal to about 0.65 when determined in accordance with ASTM D4603. In a yet further aspect, the polyethylene terephthalate component has an intrinsic viscosity greater than or equal to about 0.70 when determined in accordance with ASTM D4603. In an even further aspect, the polyethylene terephthalate component has an intrinsic viscosity greater than or equal to about 0.75 when determined in accordance with ASTM D4603. In a still further aspect, the polyethylene terephthalate component has an intrinsic viscosity greater than or equal to about 0.80 when determined in accordance with ASTM D4603. In a yet further aspect, the polyethylene terephthalate component has an intrinsic viscosity greater than or equal to about 0.82 when determined in accordance with ASTM D4603. In an even further aspect, the polyethylene terephthalate component has an intrinsic viscosity greater than or equal to about 0.85 when determined in accordance with ASTM D4603. In a still further aspect, the polyethylene terephthalate component has an intrinsic viscosity greater than or equal to about 0.87 when determined in accordance with ASTM D4603. In a yet further aspect, the polyethylene terephthalate component has an intrinsic viscosity greater than or equal to about 0.90 when determined in accordance with ASTM D4603. In an even further aspect, the polyethylene terephthalate component has an intrinsic viscosity greater than or equal to about 0.92 when determined in accordance with ASTM D4603.

In a further aspect, the polyethylene terephthalate component has a weight average molecular weight from about 50,000 g/mol to about 120,000 g/mol when determined by gel permeation chromatography relative to traceable polystyrene standards. In reference to the weight average molecular weight ($M_w$) of the impact modifier component, including the bulk polymerized ABS, of the present invention, it is understood that the $M_w$ is the relative $M_w$ determined by gel permeation chromatography relative to traceable polystyrene standards.

ITR-PC Copolymers

In various aspects, the blended polycarbonate compositions of the present invention comprise an (isophthalic acid-terephthalic acid-resorcinol)-bisphenol A copolyestercarbonate copolymer (ITR-PC), which is a copolymer comprising repeating carbonate units and repeating arylate ester units. As described in more detail below, the copolymers can additionally contain siloxane units.

The repeating structural carbonate units of are of formula (1):

in which at least 75%, at least 90%, at least 95%, of the total number of $R^1$ groups contain aromatic moieties and the balance thereof are aliphatic, alicyclic, or aromatic groups. In an embodiment each $R^1$ is an aromatic group, for example a C6-C30 aromatic group that contains at least one aromatic moiety, to provide optimal flammability performance of the poly(carbonate-arylate ester)s. $R^1$ can be derived from a dihydroxy compound of the formula HO—$R^1$—OH, including, for example, a group of formula (3):

$$HO\text{-}A^1\text{-}Y^1\text{-}A^2\text{-}OH \qquad (3),$$

wherein each of $A^1$ and $A^2$ is a monocyclic divalent aromatic group and $Y^1$ is a single bond or a bridging group having one or more atoms that separate $A^1$ from $A^2$. For example, one atom separates $A^1$ from $A^2$. Specifically, each $R^1$ can be derived from an aromatic dihydroxy compound, in particular a bisphenol of formula (4):

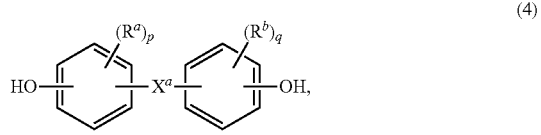

wherein Ra and Rb are each independently a C1-12 alkyl; and p and q are each independently integers of 0 to 4. It will be understood that Ra is hydrogen when p is 0, and likewise Rb is hydrogen when q is 0. In an embodiment, no halogen is present.

Also in formula (4), $X^a$ is a bridging group connecting the two hydroxy-substituted aromatic groups, where the bridging group and the hydroxy substituent of each C6 arylene group are disposed ortho, meta, or para (specifically para) to each other on the C6 arylene group. The bridging group $X^a$ can be a single bond, —O—, —S—, —S(O)—, —S(O)$_2$—, —C(O)—, or a $C_{1-18}$ organic group. The C1-C18 organic bridging group can be cyclic or acyclic, aromatic or non-aromatic, and can further comprise heteroatoms such as halogens, oxygen, nitrogen, sulfur, silicon, or phosphorus. The C1-C18 organic group can be disposed such that the $C_6$ arylene groups connected thereto are each connected to a common alkylidene carbon or to different carbons of the C1-C18 organic bridging group. p and q can each be 1, and $R^a$ and $R^b$ can each be a C1-C3 alkyl group, specifically methyl, disposed meta to the hydroxy group on each arylene group.

In various aspects, $X^a$ can be a substituted or unsubstituted C3-C18 cycloalkylidene, a C1-C25 alkylidene of formula —C($R^c$)($R^d$)— wherein $R^c$ and $R^d$ are each independently hydrogen, C1-C12 alkyl, C1-C12 cycloalkyl, C7-C12 arylalkyl, C1-C12 heteroalkyl, or cyclic C7-C12 heteroarylalkyl, or a group of the formula —C(=$R^e$)— wherein $R^e$ is a divalent C1-C12 hydrocarbon group. Exemplary groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene. A specific example wherein $X^a$ is a substituted cycloalkylidene is the cyclohexylidene-bridged, alkyl-substituted bisphenol of formula (34):

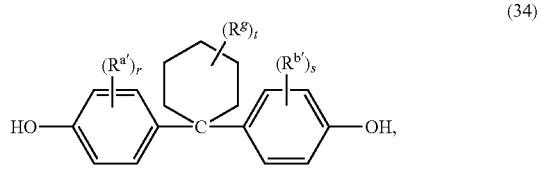

wherein $R^{a'}$ and $R^{b'}$ are each independently C1-C12 alkyl, $R^g$ is C1-C12 alkyl or halogen, r and s are each independently 1 to 4, and t is 0 to 10. Specifically, at least one of each of $R^{a'}$ and $R^{b'}$ are disposed meta to the cyclohexylidene bridging group. The substituents $R^{a'}$, and $R^g$ can, when comprising an appropriate number of carbon atoms, be straight chain, cyclic, bicyclic, branched, saturated, or unsaturated. $R^{a'}$ and $R^{b'}$ can each independently be C1-C4 alkyl, $R^g$ is C1-C4 alkyl, r and s are each 1, and t is 0 to 5. Likewise, $R^{a'}$, $R^{b'}$ and $R^g$ can each be methyl, where r and s can each be 1, and t is 0 or 3. The cyclohexylidene-bridged bisphenol can be the reaction product of two moles of o-cresol with one mole of cyclohexanone. In another example, the cyclohexylidene-bridged bisphenol is the reaction product of two moles of a cresol with one mole of a hydrogenated isophorone (e.g., 1,1,3-trimethyl-3-cyclohexane-5-one). Such cyclohexane-containing bisphenols, for example the reaction product of two moles of a phenol with one mole of a hydrogenated isophorone, are useful for making polycarbonate polymers with high glass transition temperatures and high heat distortion temperatures.

In a further aspect, $X^a$ can also be a $C_{1-18}$ alkylene group, a $C_{3-18}$ cycloalkylene group, a fused $C_{6-18}$ cycloalkylene group, or a group of the formula —$B^1$-Q-$B^2$— wherein $B^1$ and $B^2$ are the same or different $C_{1-6}$ alkylene group and Q is a $C_{3-12}$ cycloalkylidene group or a $C_{6-16}$ arylene group.

In a further aspect, $X^a$ can also be a substituted $C_{3-18}$ cycloalkylidene of formula (35):

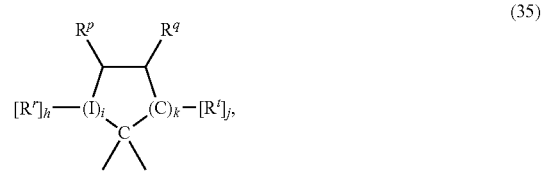

wherein $R^r$, $R^p$, $R^q$, and $R^t$ are each independently hydrogen, halogen, oxygen, or $C_{1-12}$ organic groups; I is a direct bond, a carbon, or a divalent oxygen, sulfur, or —N(Z)— where Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (35) will have an unsaturated carbon-carbon linkage where the ring is fused. When k is one and i is 0, the ring as shown in formula (35) contains 4 carbon atoms, when k is 2, the ring as shown in formula (35) contains 5 carbon atoms, and when k is 3, the ring contains 6 carbon atoms. The two adjacent groups (e.g., $R^q$ and $R^t$ taken together) can form an aromatic group, and likewise, $R^q$ and $R^t$ taken together can form one aromatic group and $R^r$ and $R^p$ taken together can form a second aromatic group. When $R^q$ and $R^t$ taken together form an aromatic group, $R^p$ can be a double-bonded oxygen atom, i.e., a ketone.

In various further aspects, Other useful aromatic dihydroxy compounds of the formula HO—$R^1$—OH include monoaryl dihydroxy compounds of formula (36):

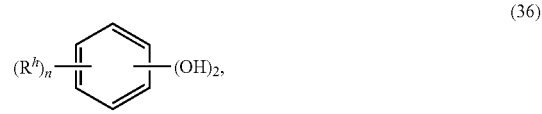

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen is usually bromine. In an embodiment, no halogen is present.

Some illustrative examples of specific aromatic dihydroxy compounds include 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or combinations comprising at least one of the foregoing dihydroxy compounds.

Specific examples of bisphenol compounds of formula (33) include 1,1-bis(4-hydroxyphenyl) methane, 1,1-bis(4-hydroxyphenyl) ethane, 2,2-bis(4-hydroxyphenyl) propane (hereinafter "bisphenol-A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-2-methylphenyl) propane, 1,1-bis(4-hydroxy-t-butylphenyl) propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC).

Combinations comprising at least one of the foregoing dihydroxy compounds can also be used.

In a specific embodiment, the polycarbonate units are of the formula (31a):

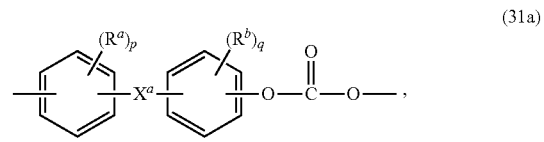

(31a)

wherein $R^a$ and $R^b$ are each independently are each independently C1-12 alkyl, p and q are each independently integers of 0 to 4, and Xa is a single bond, —O—, —S—, —S(O)—, —S(O)2-, —C(O)—, or a C1-18 organic group. Alternatively, Ra and Rb are each independently a C1-C3 alkyl, p and q are each independently 0 or 1, and Xa is alkylidene of formula —C($R^c$)($R^d$)— wherein $R^c$ and $R^d$ are each C1-C6 alkyl. Specifically, the carbonate units are derived from bisphenol-A, in which each of A1 and A2 is p-phenylene and Y1 is isopropylidene in formula (1a). Such units are referred to herein as "bisphenol A carbonate units."

In addition to carbonate units (1), specifically carbonate units (31a), more specifically bisphenol-A carbonate units, the poly(carbonate-arylate ester) copolymers contain repeating arylate ester units of formula (37):

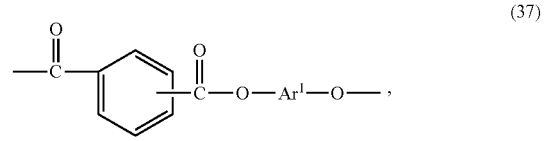

(37)

wherein $Ar^1$ is a C6-C32 hydrocarbyl group containing at least one aromatic group, e.g., a phenyl, naphthalene, anthracene, or the like. In an embodiment, $Ar^1$ is derived from a bisphenol (4), a monoaryl dihydroxy compound (36), or a combination comprising different bisphenol or monoaryl dihydroxy compounds. Thus, arylate ester units (37) can be derived by reaction of isophthalic acid, terephthalic acid, or a combination comprising at least one of the foregoing (referred to herein as a "phthalic acid"), with an aromatic bisphenol (4), a monoaryl dihydroxy compound (36), or a combination comprising at least one of the foregoing. The molar ratio of isophthalate to terephthalate can be 1:99 to 99:1, or 80:20 to 20:80, or 60:40 to 40:60.

The poly(carbonate-arylate ester) copolymers comprising carbonate units (1), specifically bisphenol-A carbonate units, and arylate ester units (37) can be alternating or block copolymers of formula (38):

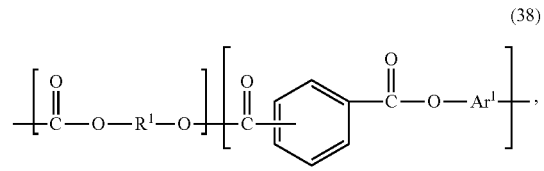

(38)

wherein $R^1$ and $Ar^1$ are as defined in formulas (1) and (7), respectively.

In general, the copolymers are block copolymers containing carbonate blocks and ester blocks. The weight ratio of total ester units to total carbonate units in the copolymers can vary broadly, for example from 99:1 to 1:99, or from 95:5 to 5:95, specifically from 90:10 to 10:90, or more specifically from 90:10 to 50:50, depending on the desired properties of the thermoplastic composition. The molar ratio of isophthalate to terephthalate in the ester units of the copolymers can also vary broadly, for example from 0:100 to 100:0, or from 92:8 to 8:92, more specifically from 98:2 to 45:55, depending on the desired properties of the thermoplastic composition. For example, the weight ratio of total ester units to total carbonate can be 99:1 to 40:60, or 90:10 to 50:40, wherein the molar ratio of isophthalate to terephthalate is from 99:1 to 40:50, more specifically 98:2 to 45:55, depending on the desired properties of the thermoplastic composition.

Additional carbonate units derived from the dihydroxy compound used to form the arylate ester units (37) can also be present in the copolymers, for example in amounts of less than 20 mole %, less than 10 mole %, less than 5 mole %, or less than 1 mole % based on the total moles of units in the copolymer. It is also possible to have additional arylate ester units present derived from reaction of the phthalic acid with the dihydroxy compound used to form the carbonate units, for example in amounts of less than 20 mole %, less than 10 mole %, less than 5 mole %, or less than 1 mole % based on the total moles of units in the copolymer. In an embodiment, the combination of such additional carbonate units and such additional arylate ester units are present in an amount of less than 20 mole %, less than 10 mole %, less than 5 mole %, or less than 1 mole % based on the total moles of units in the copolymer.

In a further aspect, a specific poly(carbonate-arylate ester) is a poly(carbonate-monoaryl arylate ester) comprising carbonate units (1), specifically bisphenol carbonate units, even more specifically bisphenol-A carbonate units, and repeating monoaryl arylate-ester units of formula (37b):

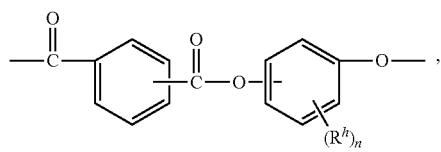

(37b)

wherein each $R^h$ is independently a halogen atom, a C1-C10 hydrocarbyl such as a C1-C10 alkyl group, a halogen-substituted C1-C10 alkyl group, a C6-C10 aryl group, or a halogen-substituted C6-C10 aryl group, and n is 0 to 4. Specifically, each $R^h$ is independently a C1-C4 alkyl, and n is 0 to 3, 0 to 1, or 0. These poly(carbonate-monoaryl arylate) copolymers are of formula (38b):

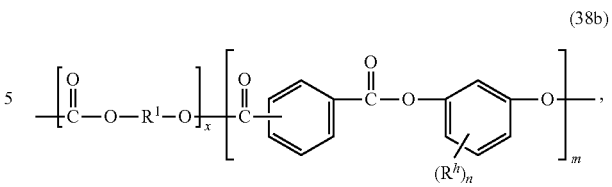

(38b)

wherein $R^1$ is as defined in formula (1) and $R^h$, and n are as defined in formula (37b), and the mole ratio of x:m is 99:1 to 1:99, specifically 80:20 to 20:80, or 60:40 to 40:60. A specific example of monoaryl ester unit (37b) is derived from the reaction of a phthalic diacid (or a derivative thereof) with resorcinol (or a reactive derivative thereof) to provide isophthalate-terephthalate-resorcinol ("ITR" ester units) of formula (37c):

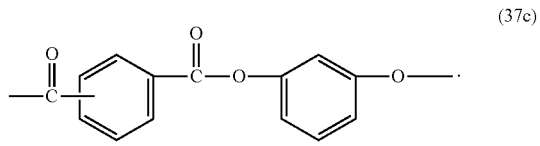

(37c)

In an embodiment, the ITR ester units are present in the poly(carbonate-arylate ester) copolymer in an amount greater than or equal to 95 mol %, specifically greater than or equal to 99 mol %, and still more specifically greater than or equal to 99.5 mol % based on the total moles of ester units in the copolymer. Such (isophthalate-terephthalate-resorcinol)-carbonate copolymers ("ITR-PC") can possess many desired features, including toughness, transparency, and weatherability. ITR-PC copolymers can also have desirable thermal flow properties. In addition, ITR-PC copolymers can be readily manufactured on a commercial scale using interfacial polymerization techniques, which allow synthetic flexibility and composition specificity in the synthesis of the ITR-PC copolymers.

As described above, the ITR-PC polymers can further optionally comprise small amounts of other carbonate units, for example 1 to 20 mole % of other carbonate units, based on the total moles of units in the copolymers. In an embodiment, the other carbonate unit arises from carbonylation of the monoaryl dihydroxy compound (36). Other arylate ester units can optionally be present, for example 1 to 20 mole % of bisphenol arylate ester units (37b), based on the total moles of units in the copolymers. The bisphenol arylate units can arise from the presence of a bisphenol used to form the carbonate units. In an embodiment, wherein the total amount of the combination is other carbonate units and other arylate ester units is 1 to 20 mole %, based on the total moles of units in the copolymers.

A specific example of a poly(carbonate)-co-poly(monoaryl arylate ester) is a poly(bisphenol-A carbonate)-co-poly (isophthalate-terephthalate-resorcinol ester) of formula (38c):

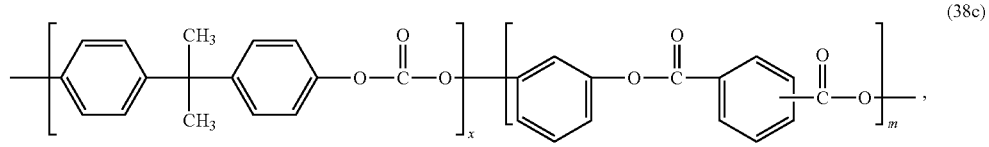

(38c)

wherein m is 4 to 100, 4 to 90, 5 to 70, more specifically 5 to 50, or still more specifically 10 to 30, and the mole ratio of x:m is 99:1 to 1:99, specifically 90:10 to 10:90. The ITR ester units are present in the poly(carbonate-arylate ester) copolymer in an amount greater than or equal to 95 mol %, specifically greater than or equal to 99 mol %, and still more specifically greater than or equal to 99.5 mol % based on the total moles of ester units. Other carbonate units, other ester units, or a combination comprising at least one of the foregoing can be present, in a total amount of 1 to 20 mole % based on the total moles of units in the copolymers, for example resorcinol carbonate units of the formula:

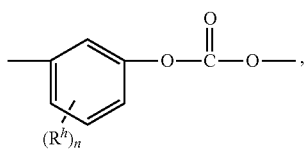

and bisphenol-A phthalate ester units of the formula:

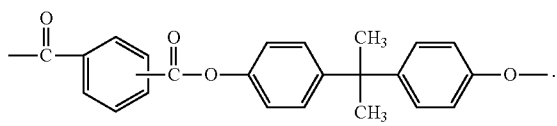

In a further aspect, poly(bisphenol-A carbonate)-co-poly (isophthalate-terephthalate-resorcinol ester) (38c) comprises 1 to 20 mol % of bisphenol-A carbonate units, 60-98 mol % of isophthalic acid-terephthalic acid-resorcinol ester units, and optionally 1 to 20 mol % of resorcinol carbonate units, isophthalic acid-terephthalic acid-bisphenol-A phthalate ester units, or a combination comprising at least one of the foregoing.

The poly(carbonate-arylate ester) copolymers can be prepared by methods known in the art. For example, the copolymers are units can be prepared from polycarbonate blocks and polyester blocks. Polycarbonate blocks and polyester blocks can be obtained by interfacial polymerization or melt polymerization.

Polycarbonate blocks can be manufactured by processes such as interfacial polymerization and melt polymerization. Although the reaction conditions for interfacial polymerization can vary, an exemplary process generally involves dissolving or dispersing the dihydroxy reactant in aqueous caustic soda or potash, adding the resulting mixture to a water-immiscible solvent medium, and contacting the reactants with a carbonate precursor in the presence of a catalyst such as triethylamine and/or a phase transfer catalyst, under controlled pH conditions, e.g., 8 to 12. The most commonly used water immiscible solvents include methylene chloride, 1,2-dichloroethane, chlorobenzene, toluene, and the like. Exemplary carbonate precursors include a carbonyl halide such as carbonyl bromide or carbonyl chloride or a haloformate such as a bishaloformates of a dihydric phenol (e.g., the bischloroformates of bisphenol-A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In an exemplary embodiment, an interfacial polymerization reaction to form carbonate linkages uses phosgene as a carbonate precursor, and is referred to as a phosgenation reaction.

Among the phase transfer catalysts that can be used are catalysts of the formula $(R^3)_4Q^+X$, wherein each $R^3$ is the same or different, and is a C1-C10 alkyl group; Q is a nitrogen or phosphorus atom; and X is a halogen atom or a C1-C8 alkoxy group or $C_{6-18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl$^-$, Br$^-$, a C1-C8 alkoxy group or a C6-C18 aryloxy group. An effective amount of a phase transfer catalyst can be 0.1 to 10 wt. % based on the weight of bisphenol in the phosgenation mixture. In another embodiment an effective amount of phase transfer catalyst can be 0.5 to 2 wt. % based on the weight of bisphenol in the phosgenation mixture.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl) phenol), 4-chloroformyl phthalic anhydride, trimesic acid, and benzophenone tetracarboxylic acid. The branching agents can be added at a level of 0.05 to 2.0 wt. %. Combinations comprising linear and branched polycarbonate blocks can be used.

For the polyester blocks, rather than using the dicarboxylic acid or diol per se, the reactive derivatives of the acid or diol, such as the corresponding acid halides, in particular the acid dichlorides and the acid dibromides can be used. Thus, for example instead of using isophthalic acid, terephthalic acid, or a combination comprising at least one of the foregoing acids, isophthaloyl dichloride, terephthaloyl dichloride, or a combination comprising at least one of the foregoing dichlorides can be used. The polyesters can also be obtained by melt-process condensation as described above, by solution phase condensation, or by transesterification polymerization wherein, for example, a dialkyl ester such as dimethyl terephthalate can be transesterified with the dihydroxy reactant using acid catalysis, to generate the polyester blocks. Branched polyester blocks, in which a branching agent, for example, a glycol having three or more hydroxyl groups or a trifunctional or multifunctional carboxylic acid has been incorporated, can be used. Furthermore, it can be desirable to have various concentrations of acid and hydroxyl end groups on the polyester blocks, depending on the ultimate end use of the composition.

The poly(carbonate-arylate ester)s can have a weight average molecular weight (Mw) of 2,000 to 100,000 g/mol, specifically 3,000 to 75,000 g/mol, more specifically 4,000 to 50,000 g/mol, more specifically 5,000 to 35,000 g/mol, and still more specifically 17,000 to 30,000 g/mol. Molecular weight determinations are performed using GPC using a cross linked styrene-divinyl benzene column, at a sample concentration of 1 milligram per milliliter, and as calibrated with polycarbonate standards. Samples are eluted at a flow rate of 1.0 ml/min with methylene chloride as the eluent.

In a further aspect, the poly(carbonate-arylate ester) copolymers further comprise siloxane units (also known as "diorganosiloxane units"). In a specific embodiment these copolymers comprises carbonate units (1) derived from a bisphenol (3), specifically bisphenol-A; monoaryl arylate ester units (37b), and siloxane units. Still more specifically, the poly(carbonate-arylate ester) copolymers comprises bisphenol-A carbonate units, ITR ester units (37c), and siloxane units (39). For convenience, these polymers, poly(bisphenol-A carbonate)-co-poly(isophthalate-terephthalate-resorcinol ester)-co-poly(siloxane), are referred to herein as "ITR-PC-siloxane" copolymers.

The polysiloxane units are of formula (39):

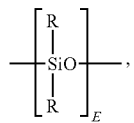
(39)

wherein each R is independently a C1-C13 monovalent hydrocarbyl group. For example, each R can independently be a C1-C13 alkyl group, C1-C13 alkoxy group, C2-C13 alkenyl group, C2-C13 alkenyloxy group, C3-C6 cycloalkyl group, C3-C6 cycloalkoxy group, C6-C14 aryl group, C6-C10 aryloxy group, C7-C13 arylalkyl group, C7-C13 arylalkoxy group, C7-C13 alkylaryl group, or C7-C13 alkylaryloxy group. The foregoing groups can be fully or partially halogenated with fluorine, chlorine, bromine, or iodine, or a combination comprising at least one of the foregoing. In an embodiment no halogens are present. Combinations of the foregoing R groups can be used in the same copolymer. In an embodiment, the polysiloxane comprises R groups that have minimal hydrocarbon content. In a specific embodiment, an R group with a minimal hydrocarbon content is a methyl group.

The average value of E in formula (39) can vary widely depending on the type and relative amount of each component in the thermoplastic composition, whether the polymer is linear, branched or a graft copolymer, the desired properties of the composition, and like considerations. In an embodiment, E has an average value of 2 to 500, 2 to 200, or 2 to 90, 2 to 50, or 2 to 30. In an embodiment E has an average value of 16 to 50, more specifically 20 to 45, and even more specifically 25 to 45. In another embodiment, E has an average value of 4 to 50, 4 to 15, specifically 5 to 15, more specifically 6 to 15, and still more specifically 7 to 10.

In a further aspect, the polysiloxane units are structural units of formula (39a):

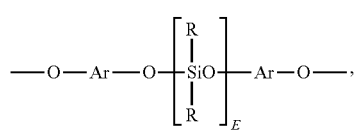
(39a)

wherein E is as defined above; each R can independently be the same or different, and is as defined above; and each Ar can independently be the same or different, and is a substituted or unsubstituted C6-30 compound containing an aromatic group, wherein the bonds are directly connected to the aromatic moiety. The Ar groups in formula (9a) can be derived from a C6-30 dihydroxy aromatic compound, for example a bisphenol compound as described above or a monoaryl dihydroxy compound (6) above. Combinations comprising at least one of the foregoing dihydroxy aromatic compounds can also be used. Exemplary dihydroxy aromatic compounds are resorcinol (i.e., 1,3-dihydroxybenzene), 4-methyl-1,3-dihydroxybenzene, 5-methyl-1,3-dihydroxybenzene, 4,6-dimethyl-1,3-dihydroxybenzene, 1,4-dihydroxybenzene, 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl)cyclohexane, bis(4-hydroxyphenyl sulfide), and 1,1-bis(4-hydroxy-t-butylphenyl) propane. Combinations comprising at least one of the foregoing dihydroxy compounds can also be used. In an embodiment, the dihydroxy aromatic compound is unsubstituted, or is does not contain non-aromatic hydrocarbyl substituents such as alkyl, alkoxy, or alkylene substituents.

In a further aspect, where Ar is derived from resorcinol, the polysiloxane units are of the formula (39a1):

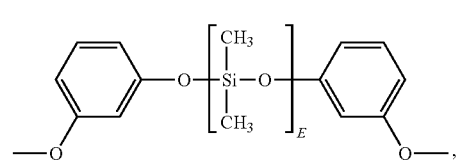
(39a1)

or, where Ar is derived from bisphenol-A, the polysiloxane has the formula (39a-2):

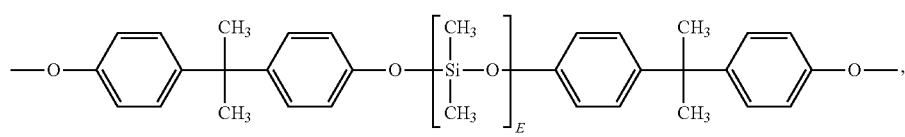
(39a2)

or a combination comprising at least one of the foregoing can be used, wherein E has an average value as described above, specifically an average value of 2 to 200, 2 to 90, 2 to 50, or 2 to 30, 5 to 15, or 7 to 10.

In a further aspect, polydiorganosiloxane units are units of formula (39b):

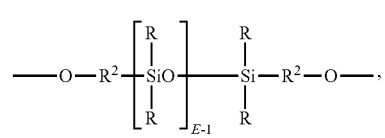
(39b)

wherein R and E are as described for formula (9), and each R2 is independently a divalent C1-30 alkylene or C7-30 arylene-alkylene. In a specific embodiment, where R2 is C7-30 arylene-alkylene, the polydiorganosiloxane units are of formula (39b1):

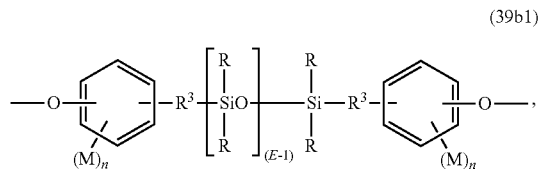

(39b1)

wherein R and E are as defined for formula (9), and each R3 is independently a divalent C2-8 aliphatic group. Each M in formula (25) can be the same or different, and can be a halogen, cyano, nitro, C1-C8 alkylthio, C1-C8 alkyl, C1-C8 alkoxy, C2-C8 alkenyl, C2-C8 alkenyloxy group, C3-C8 cycloalkyl, C3-C8 cycloalkoxy, C6-C10 aryl, C6-C10 aryloxy, C7-C12 arylalkyl, C7-C12 arylalkoxy, C7-C12 alkylaryl, or C7-C12 alkylaryloxy, wherein each n is independently 0, 1, 2, 3, or 4. In an embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; R3 is a dimethylene, trimethylene or tetramethylene group; and R is a C1-8 alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is 0 or 1, R3 is a divalent C1-3 aliphatic group, and R is methyl. The foregoing poly(carbonate-siloxane) copolymers can be manufactured by the methods described in U.S. Pat. No. 6,072,011 to Hoover, for example.

In a further aspect, the polysiloxane units are eugenol-capped polysiloxane of formula (39b2):

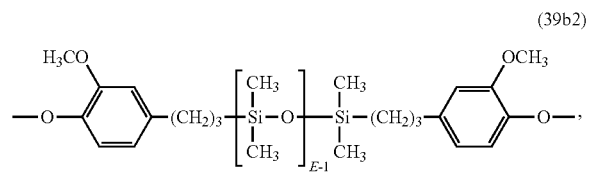

(39b2)

where E has an average value as described above, specifically 2 to 200, 2 to 90, 2 to 50, or 2 to 30, 5 to 15, or 7 to 10. In another specific embodiment, the polysiloxane units are of formula (39b3) or (39b4):

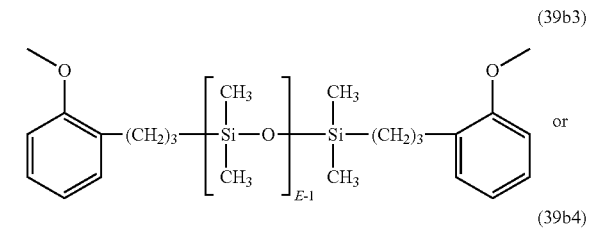

(39b3)

or

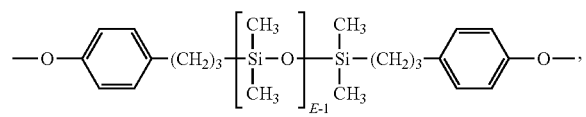

(39b4)

where E has an average value as defined above, specifically an average value of 2 to 200, 2 to 90, 2 to 50, or 2 to 30, 5 to 15, or 7 to 10.

The relative amount polysiloxane units (39) in the ITR-PC-siloxane copolymers depends on the desired properties of the thermoplastic composition, such as impact, smoke density, heat release, and melt viscosity. In particular the poly(carbonate-arylate ester) is selected to have an average value of E that provides good impact and/or transparency properties, as well as to provide the desired weight percent of siloxane units in the thermoplastic composition. For example, the poly(carbonate-arylate ester)s can comprise siloxane units in an amount of 0.3 to 30 weight percent (wt. %), specifically 0.5 to 25 wt. %, or 0.5 to 15 wt. %, based on the total weight of the polymers in the thermoplastic composition, with the proviso that the siloxane units are provided by polysiloxane units covalently bonded in the polymer backbone of the poly(carbonate-arylate ester).

In a further aspect, the PC-ITR-siloxane copolymers comprise 1 to 40 mol %, or 1 to 20 mol % of bisphenol-A carbonate units, 50 to 95 mol % of ITR ester units (37c), and an amount of polysiloxane units (39b), specifically (9b-1), even more specifically (39b2), (39b3), (39b4) or a combination comprising at least one of the foregoing, specifically (39b2), in an amount effective to provide 0.1 to 10 wt. % of siloxane units, each based on the total copolymer. For example, the PC-ITR-siloxane copolymers can comprise 1 to 20 mol % of bisphenol-A carbonate units, 60 to 90 mole % of ITR ester units, and an amount of polysiloxane units (39b2), (39b3), (39b4) or a combination comprising at least one of the foregoing (specifically of formula 39b2) effective to provide 0.1 to 10 wt. % of siloxane units, each based on the total copolymer.

Other carbonate units, other ester units, or a combination comprising at least one of the foregoing can be present in the PC-ITR-siloxane copolymers, in a total amount of 1 to 20 mole % based on the total moles of units in the copolymers, for example resorcinol carbonate units, and bisphenol-A phthalate ester units of the formula. In a further aspect, the ITR-PC-siloxane comprises 1 to 20 mol % of bisphenol-A carbonate units, 60-98 mol % of isophthalic acid-terephthalic acid-resorcinol ester units, and optionally 1 to 20 mol % of resorcinol carbonate units (10), isophthalic acid-terephthalic acid-bisphenol-A ester units (11), or a combination comprising at least one of the foregoing, together with the siloxane units.

Methods for the manufacture of the ITR-PC-siloxane copolymers are known. The ITR-PC-siloxane copolymers can have an intrinsic viscosity, as determined in chloroform at 25° C., of 0.3 to 1.5 deciliters per gram (dl/g), specifically 0.45 to 1.0 dl/g. The PC-siloxane copolymers can have a weight average molecular weight ($M_w$) of 10,000 to 100,000 g/mol, measured according to gel permeation chromatography (GPC) using a cross linked styrene-divinyl benzene column, at a sample concentration of 1 milligram per milliliter, and as calibrated with polycarbonate standards.

In a further aspect, the poly(alkylene ester) component is present in an amount from about 1 wt % to about 10 wt %. In a still further aspect, the poly(alkylene ester) component is present in an amount from about 2 wt % to about 9 wt %. In a still further aspect, the poly(alkylene ester) component is present in an amount from about 2 wt % to about 8 wt %. In a yet further aspect, the poly(alkylene ester) component is present in an amount from about 2 wt % to about 7 wt %. In an even further aspect, the poly(alkylene ester) component is present in an amount from about 2 wt % to about 6 wt %. In a still further aspect, the poly(alkylene ester) component is present in an amount from about 2 wt % to about 5 wt %.

In a further aspect, the poly(alkylene ester) component is present in an amount from about 3 wt % to about 9 wt %. In a still further aspect, the poly(alkylene ester) component is present in an amount from about 3 wt % to about 8 wt %. In a yet further aspect, the poly(alkylene ester) component is present in an amount from about 3 wt % to about 7 wt %. In an even further aspect, the poly(alkylene ester) component is present in an amount from about 3 wt % to about 6 wt %. In a still further aspect, the poly(alkylene ester) component is present in an amount from about 3 wt % to about 5 wt %.

In a further aspect, the poly(alkylene ester) component is present in an amount from about 4 wt % to about 9 wt %. In a still further aspect, the poly(alkylene ester) component is present in an amount from about 4 wt % to about 8 wt %. In a yet further aspect, the poly(alkylene ester) component is present in an amount from about 4 wt % to about 7 wt %. In an even further aspect, the poly(alkylene ester) component is present in an amount from about 4 wt % to about 6 wt %. In a still further aspect, the poly(alkylene ester) component is present in an amount from about 4 wt % to about 5 wt %.

Impact Modifier

In one aspect, the disclosed blended polycarbonate compositions with decreased splay of the present invention comprise an impact modifying agents, or impact modifiers. In a further aspect, the disclosed blended polycarbonate compositions comprise one or more impact modifiers. In a still further aspect, the disclosed blended polycarbonate compositions comprise at least one impact modifier. In a yet further aspect, the disclosed blended polycarbonate compositions comprise two impact modifiers, that is, a first impact modifier component and a second impact modifier component.

In a further aspect, the impact modifier of the present invention is selected from an acrylonitrile-butadiene-styrene polymer (ABS), an acrylonitrile-styrene-butyl acrylate (ASA) polymer, a methyl methacrylate-acrylonitrile-butadiene-styrene (MABS) polymer, a methyl methacrylate-butadiene-styrene (MBS) polymer, an acrylonitrile-ethylene-propylene-diene-styrene (AES) polymer, and a silicon-graft copolymer. In a still further aspect, the impact modifier is an acrylonitrile-butadiene-styrene polymer ("ABS polymer"). In a still further aspect, a suitable impact modifier is a bulk polymerized ABS polymer ("BABS polymer" or "Bulk ABS polymer"). In a still further aspect, a suitable impact modifier is a silicon graft copolymer.

Acrylonitrile-butadiene-styrene ("ABS") graft copolymers contain two or more polymeric parts of different compositions, which are bonded chemically. The graft copolymer is specifically prepared by first polymerizing a conjugated diene, such as butadiene or another conjugated diene, with a monomer copolymerizable therewith, such as styrene, to provide a polymeric backbone. After formation of the polymeric backbone, at least one grafting monomer, and specifically two, are polymerized in the presence of the polymer backbone to obtain the graft copolymer. These resins are prepared by methods well known in the art.

For example, ABS can be made by one or more of emulsion or solution polymerization processes, bulk/mass, suspension and/or emulsion-suspension process routes. In addition, ABS materials can be produced by other process techniques such as batch, semi batch and continuous polymerization for reasons of either manufacturing economics or product performance or both. In order to reduce point defects or inclusions in the inner layer of the final multi-layer article, the ABS is produced by bulk polymerized.

Emulsion polymerization of vinyl monomers gives rise to a family of addition polymers. In many instances the vinyl emulsion polymers are copolymers containing both rubbery and rigid polymer units. Mixtures of emulsion resins, especially mixtures of rubber and rigid vinyl emulsion derived polymers are useful in blends.

Such rubber modified thermoplastic resins made by an emulsion polymerization process can comprise a discontinuous rubber phase dispersed in a continuous rigid thermoplastic phase, wherein at least a portion of the rigid thermoplastic phase is chemically grafted to the rubber phase. Such a rubbery emulsion polymerized resin can be further blended with a vinyl polymer made by an emulsion or bulk polymerized process. However, at least a portion of the vinyl polymer, rubber or rigid thermoplastic phase, blended with polycarbonate, will be made by emulsion polymerization.

Suitable rubbers for use in making a vinyl emulsion polymer blend are rubbery polymers having a glass transition temperature (Tg) of less than or equal to 25° C., more preferably less than or equal to 0° C., and even more preferably less than or equal to −30° C. As referred to herein, the Tg of a polymer is the Tg value of polymer as measured by differential scanning calorimetry (heating rate 20° C./minute, with the Tg value being determined at the inflection point). In another embodiment, the rubber comprises a linear polymer having structural units derived from one or more conjugated diene monomers. Suitable conjugated diene monomers include, e.g., 1,3-butadiene, isoprene, 1,3-heptadiene, methyl-1,3-pentadiene, 2,3-dimethylbutadiene, 2-ethyl-1,3-pentadiene, 1,3-hexadiene, 2,4-hexadiene, dichlorobutadiene, bromobutadiene and dibromobutadiene as well as mixtures of conjugated diene monomers. In a preferred embodiment, the conjugated diene monomer is 1,3-butadiene.

The emulsion polymer may, optionally, include structural units derived from one or more copolymerizable monoethylenically unsaturated monomers selected from ($C_2$-$C_{12}$) olefin monomers, vinyl aromatic monomers and monoethylenically unsaturated nitrile monomers and ($C_2$-$C_{12}$) alkyl (meth)acrylate monomers. As used herein, the term "($C_2$-$C_{12}$) olefin monomers" means a compound having from 2 to 12 carbon atoms per molecule and having a single site of ethylenic unsaturation per molecule. Suitable ($C_2$-$C_{12}$) olefin monomers include, e.g., ethylene, propene, 1-butene, 1-pentene, heptene, 2-ethyl-hexylene, 2-ethyl-heptene, 1-octene, and 1-nonene. As used herein, the term "($C_1$-$C_{12}$) alkyl" means a straight or branched alkyl substituent group having from 1 to 12 carbon atoms per group and includes, e.g., methyl, ethyl, n-butyl, sec-butyl, t-butyl, n-propyl, isopropyl, pentyl, hexyl, heptyl, octyl, nonyl, decyl, undecyl and dodecyl, and the terminology "(meth)acrylate monomers" refers collectively to acrylate monomers and methacrylate monomers.

The rubber phase and the rigid thermoplastic phase of the emulsion modified vinyl polymer may, optionally, include structural units derived from one or more other copolymerizable monoethylenically unsaturated monomers such as, e.g., monoethylenically unsaturated carboxylic acids such as, e.g., acrylic acid, methacrylic acid, itaconic acid, hydroxy ($C_1$-$C_{12}$) alkyl(meth)acrylate monomers such as, e.g., hydroxyethyl methacrylate; (C5-C12) cycloalkyl(meth) acrylate monomers such as e.g., cyclohexyl methacrylate; (meth)acrylamide monomers such as e.g., acrylamide and methacrylamide; maleimide monomers such as, e.g., N-alkyl maleimides, N-aryl maleimides, maleic anhydride, vinyl esters such as, e.g., vinyl acetate and vinyl propionate. As used herein, the term "$(C_5-C_{12})$ cycloalkyl" means a cyclic alkyl substituent group having from 5 to 12 carbon atoms per group and the term "(meth)acrylamide" refers collectively to acrylamides and methacrylamides.

In some cases the rubber phase of the emulsion polymer is derived from polymerization of a butadiene, $C_4-C_{12}$ acrylates or combination thereof with a rigid phase derived from polymerization of styrene, $C_1-C_3$ acrylates, methacrylates, acrylonitrile or combinations thereof where at least a portion of the rigid phase is grafted to the rubber phase. In other instances more than half of the rigid phase will be grafted to the rubber phase.

Suitable vinyl aromatic monomers include, e.g., styrene and substituted styrenes having one or more alkyl, alkoxyl, hydroxyl or halo substituent group attached to the aromatic ring, including, e.g., -methyl styrene, p-methyl styrene, vinyl toluene, vinyl xylene, trimethyl styrene, butyl styrene, chlorostyrene, dichlorostyrene, bromostyrene, p-hydroxystyrene, methoxystyrene and vinyl-substituted condensed aromatic ring structures, such as, e.g., vinyl naphthalene, vinyl anthracene, as well as mixtures of vinyl aromatic monomers. As used herein, the term "monoethylenically unsaturated nitrile monomer" means an acyclic compound that includes a single nitrile group and a single site of ethylenic unsaturation per molecule and includes, e.g., acrylonitrile, methacrylonitrile, a-chloro acrylonitrile.

In an alternative embodiment, the rubber is a copolymer, preferably a block copolymer, comprising structural units derived from one or more conjugated diene monomers and up to 90 percent by weight ("wt %") structural units derived from one or more monomers selected from vinyl aromatic monomers and monoethylenically unsaturated nitrile monomers, such as, a styrene-butadiene copolymer, an acrylonitrile-butadiene copolymer or a styrene-butadiene-acrylonitrile copolymer. In another embodiment, the rubber is a styrene-butadiene block copolymer that contains from 50 to 95 wt % structural units derived from butadiene and from 5 to 50 wt % structural units derived from styrene.

The emulsion derived polymers can be further blended with non-emulsion polymerized vinyl polymers, such as those made with bulk or mass polymerization techniques. A process to prepare mixtures containing polycarbonate, an emulsion derived vinyl polymer, along with a bulk polymerized vinyl polymers, is also contemplated.

The rubber phase can be made by aqueous emulsion polymerization in the presence of a radical initiator, a surfactant and, optionally, a chain transfer agent and coagulated to form particles of rubber phase material. Suitable initiators include conventional free radical initiator such as, e.g., an organic peroxide compound, such as e.g., benzoyl peroxide, a persulfate compound, such as, e.g., potassium persulfate, an azonitrile compound such as, e.g., 2,2'-azobis-2,3,3-trimethylbutyronitrile, or a redox initiator system, such as, e.g., a combination of cumene hydroperoxide, ferrous sulfate, tetrasodium pyrophosphate and a reducing sugar or sodium formaldehyde sulfoxylate. Suitable chain transfer agents include, for example, a $(C_9-C_{13})$ alkyl mercaptan compound such as nonyl mercaptan, t-dodecyl mercaptan. Suitable emulsion aids include, linear or branched carboxylic acid salts, with about 10 to 30 carbon atoms. Suitable salts include ammonium carboxylates and alkaline carboxylates; such as ammonium stearate, methyl ammonium behenate, triethyl ammonium stearate, sodium stearate, sodium isostearate, potassium stearate, sodium salts of tallow fatty acids, sodium oleate, sodium palmitate, potassium linoleate, sodium laurate, potassium abieate (rosin acid salt), sodium abietate and combinations thereof. Often mixtures of fatty acid salts derived from natural sources such as seed oils or animal fat (such as tallow fatty acids) are used as emulsifiers.

In one aspect, the emulsion polymerized particles of rubber phase material have a weight average particle size of 50 to 800 nanometers ("nm"), more preferably, of from 100 to 500 nm, as measured by light transmission. The size of emulsion polymerized rubber particles can optionally be increased by mechanical, colloidal or chemical agglomeration of the emulsion polymerized particles, according to known techniques.

The rigid thermoplastic phase comprises one or more vinyl derived thermoplastic polymers and exhibits a Tg of greater than 25° C., preferably greater than or equal to 90° C. and even more preferably greater than or equal to 100° C.

In various aspects, the rigid thermoplastic phase comprises a vinyl aromatic polymer having first structural units derived from one or more vinyl aromatic monomers, preferably styrene, and having second structural units derived from one or more monoethylenically unsaturated nitrile monomers, preferably acrylonitrile. In other cases, the rigid phase comprises from 55 to 99 wt %, still more preferably 60 to 90 wt %, structural units derived from styrene and from 1 to 45 wt %, still more preferably 10 to 40 wt %, structural units derived from acrylonitrile.

The amount of grafting that takes place between the rigid thermoplastic phase and the rubber phase can vary with the relative amount and composition of the rubber phase. In one embodiment, from 10 to 90 wt %, often from 25 to 60 wt %, of the rigid thermoplastic phase is chemically grafted to the rubber phase and from 10 to 90 wt %, preferably from 40 to 75 wt % of the rigid thermoplastic phase remains "free", i.e., non-grafted.

The rigid thermoplastic phase of the rubber modified thermoplastic resin can be formed solely by emulsion polymerization carried out in the presence of the rubber phase or by addition of one or more separately polymerized rigid thermoplastic polymers to a rigid thermoplastic polymer that has been polymerized in the presence of the rubber phase. In one embodiment, the weight average molecular weight of the one or more separately polymerized rigid thermoplastic polymers is from about 50,000 to about 100,000 g/mol.

In other cases, the rubber modified thermoplastic resin comprises a rubber phase having a polymer with structural units derived from one or more conjugated diene monomers, and, optionally, further comprising structural units derived from one or more monomers selected from vinyl aromatic monomers and monoethylenically unsaturated nitrile monomers, and the rigid thermoplastic phase comprises a polymer having structural units derived from one or more monomers selected from vinyl aromatic monomers and monoethylenically unsaturated nitrile monomers. In one embodiment, the rubber phase of the rubber modified thermoplastic resin comprises a polybutadiene or poly(styrene-butadiene) rubber and the rigid thermoplastic phase comprises a styrene-acrylonitrile copolymer. Vinyl polymers free of alkyl carbon-halogen linkages, specifically bromine and chlorine carbon bond linkages can provide melt stability.

In some instances it is desirable to isolate the emulsion vinyl polymer or copolymer by coagulation in acid. In such instances the emulsion polymer can be contaminated by residual acid, or species derived from the action of such acid, for example carboxylic acids derived from fatty acid soaps used to form the emulsion. The acid used for coagulation can be a mineral acid; such as sulfuric acid, hydrochloric acid, nitric acid, phosphoric acid or mixtures thereof. In some cases the acid used for coagulation has a pH less than about 5.

In one aspect, the impact modifier is a silicone graft copolymer. The silicone graft copolymer can be a silicon core-shell graft copolymer prepared by grafting ethylenically unsaturated monomers onto a rubbery silicone core, thus forming a rigid shell. Methods for preparing the silicone core-shell graft copolymers are known in the art. For example, silicone core-shell graft copolymers can be prepared by methods disclosed in U.S. Pat. No. 7,615,594, or in Abele et al., "Silicone Based Flame Retardant for Polycarbonate," *ANTEC*, 2009, pp. 1351-1354.

The ethylenically unsaturated monomers used to form the shell are generally a combination of a monofunctional monomer and a copolymerizable polyfunctional monomer. Examples of monofunctional monomers include styrene, α-methylstyrene, halogen or $C_{1-3}$ alkyl substituted styrene, acrylonitrile, methacrylonitrile, maleic acid, maleic anhydride, $C_1$-$C_4$alkyl and phenyl N-substituted maleimide, $C_1$-$C_8$alkyl methacrylates, $C_1$-$C_8$alkyl acrylates, and the like. Example of copolymerizable polyfunctional monomers include allyl methacrylate, triallyl cyanurate, triallyl isocyanurate, diallyl phthalate, ethylene glycol dimethacrylate, 1,3-butylene glycol dimethacrylate, divinyl benzene, and the like. Preferred monomers are the $C_1$-$C_8$alkyl methacrylates, $C_1$-$C_8$alkyl acrylates, for example, $C_1$-$C_6$ alkyl methacrylates.

The rubbery silicone core can be prepared by polymerization of a cyclosiloxane in the presence of a curing agent to produce particles. The particles can have an average diameter of 0.1 to 1 micrometer. Examples of cyclosiloxanes include hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrosiloxane, octaphenylcyclotetrasiloxane, and the like. Examples of curing agents include reactive silanes, for example trimethoxymethylsilane, tetramethoxysilane, tetraethoxysilane, and the like. The silicone core can comprise 20 to 100 wt % of silicone, or 30 to 95 wt % of silicone, with the remainder of the core being rubber groups.

The rubber content of the silicone-based core-shell graft copolymer can be in the range of 30 to 90% by weight. In some embodiments, the silicone core-shell graft copolymer comprises more than 70 wt %, or 60 to 80 wt %, or 60 to 70 wt %, or 65 to 75 wt % of the silicone core component, wherein the graft shell component is derived from primarily $C_1$-$C_6$alkyl methacrylates. A commercially available silicone core-shell graft copolymer is sold under the tradename KANE ACE™ MR-01 by Kaneka Corporation (Japan).

Exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), methacrylate-butadiene (MB), styrene-acrylonitrile (SAN), and silicone graft copolymers.

In a further aspect, the impact modifier component comprises one more of an acrylonitrile butadiene styrene ("ABS") copolymer, a methacrylate butadiene styrene ("MBS") copolymer, a bulk polymerized ABS ("BABS") copolymer, and a silicone graft copolymer. In a still further aspect, the impact modifier component comprises an acrylonitrile butadiene styrene ("ABS") copolymer. In a yet further aspect, the impact modifier component comprises a methacrylate butadiene styrene ("MBS") copolymer. In an even further aspect, the impact modifier component comprises a bulk polymerized ABS ("BABS") copolymer. In a still further aspect, a suitable impact modifier is a silicone graft copolymer.

In a further aspect, the impact modifier component is present in an amount from about 10 wt % to about 25 wt %. In a still further aspect, the impact modifier component is present in an amount from about 12 wt % to about 25 wt %. In a yet further aspect, the impact modifier component is present in an amount from about 13 wt % to about 25 wt %. In an even further aspect, the impact modifier component is present in an amount from about 14 wt % to about 25 wt %. In a still further aspect, the impact modifier component is present in an amount from about 15 wt % to about 25 wt %. In a yet further aspect, the impact modifier component is present in an amount from about 16 wt % to about 25 wt %. In an even further aspect, the impact modifier component is present in an amount from about 17 wt % to about 25 wt %.

In a further aspect, the impact modifier component is present in an amount from about 10 wt % to about 22 wt %. In a still further aspect, the impact modifier component is present in an amount from about 12 wt % to about 22 wt %. In a yet further aspect, the impact modifier component is present in an amount from about 13 wt % to about 22 wt %. In an even further aspect, the impact modifier component is present in an amount from about 14 wt % to about 22 wt %. In a still further aspect, the impact modifier component is present in an amount from about 15 wt % to about 22 wt %. In a yet further aspect, the impact modifier component is present in an amount from about 16 wt % to about 22 wt %. In an even further aspect, the impact modifier component is present in an amount from about 17 wt % to about 22 wt %.

In a further aspect, the impact modifier component is present in an amount from about 10 wt % to about 20 wt %. In a still further aspect, the impact modifier component is present in an amount from about 12 wt % to about 20 wt %. In a yet further aspect, the impact modifier component is present in an amount from about 13 wt % to about 20 wt %. In an even further aspect, the impact modifier component is present in an amount from about 14 wt % to about 20 wt %. In a still further aspect, the impact modifier component is present in an amount from about 15 wt % to about 20 wt %. In a yet further aspect, the impact modifier component is present in an amount from about 16 wt % to about 20 wt %. In an even further aspect, the impact modifier component is present in an amount from about 17 wt % to about 20 wt %.

In a further aspect, the impact modifier component is present in an amount from about 10 wt % to about 18 wt %. In a still further aspect, the impact modifier component is present in an amount from about 12 wt % to about 18 wt %. In a yet further aspect, the impact modifier component is present in an amount from about 13 wt % to about 18 wt %. In an even further aspect, the impact modifier component is present in an amount from about 14 wt % to about 18 wt %. In a still further aspect, the impact modifier component is present in an amount from about 15 wt % to about 18 wt %. In a yet further aspect, the impact modifier component is present in an amount from about 16 wt % to about 18 wt %. In an even further aspect, the impact modifier component is present in an amount from about 17 wt % to about 18 wt %.

In a further aspect, the impact modifier component is present in an amount from about 10 wt % to about 17 wt %. In a still further aspect, the impact modifier component is present in an amount from about 12 wt % to about 17 wt %. In a yet further aspect, the impact modifier component is present in an amount from about 13 wt % to about 17 wt %. In an even further aspect, the impact modifier component is present in an amount from about 14 wt % to about 17 wt %. In a still further aspect, the impact modifier component is present in an amount from about 15 wt % to about 17 wt %. In a yet further aspect, the impact modifier component is present in an amount from about 16 wt % to about 17 wt %.

Bulk Polymerized Acrylonitrile-Butadiene-Styrene Polymers (BABS)

In one aspect, the disclosed blended polycarbonate compositions with decreased splay of the present invention comprise a bulk polymerized acrylonitrile-butadiene-styrene polymer, or BABS polymer (which can be alternatively referred as a BABS component of the composition or simply BABS). In a further aspect, the disclosed blended polycarbonate compositions comprise a BABS component and a second impact modifier component. In a still further aspect, the disclosed blended polycarbonate compositions comprise at least one impact modifier, wherein the at least one impact modifier is BABS. In a yet further aspect, the disclosed blended polycarbonate compositions comprise two impact modifiers, that is, a first impact modifier component is BABS and a second impact modifier component.

Bulk polymerized ABS (BABS) (e.g., bulk polymerized ABS graft copolymer) comprises an elastomeric phase comprising one or more unsaturated monomers, such as butadiene having a Tg of less than or equal to 10° C., and a polymeric graft phase (e.g., rigid graft phase) comprising a copolymer of one or more monovinylaromatic monomers such as styrene and one or more unsaturated nitrile monomers, such as acrylonitrile having a Tg greater than 50° C. Rigid generally means a Tg greater than room temperature, e.g., a Tg greater than about 21° C. Bulk polymerized ABS can be prepared by first providing the elastomeric polymer, then polymerizing the constituent monomers of the rigid graft phase in the presence of the elastomer to obtain the elastomer modified copolymer. As the rigid graft phase copolymer molecular weight increases, a phase inversion occurs in which some of the rigid graft phase copolymer will be entrained within the elastomeric phase. Some of the grafts can be attached as graft branches to the elastomer phase.

Polybutadiene homopolymer can be used as the elastomer phase. Alternatively, the elastomer phase of the bulk polymerized ABS comprises butadiene copolymerized with up to about 25 wt. % of another conjugated diene monomer with a structure represented by the formula:

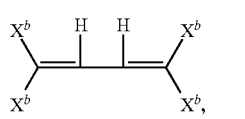

(6)

wherein each $X^b$ is independently $C_1$-$C_5$ alkyl. Examples of conjugated diene monomers that can be used are isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. An example of a specific conjugated diene is isoprene.

The elastomeric butadiene phase can additionally be copolymerized with up to 25 wt %, specifically up to about 15 wt. %, of another comonomer, for example monovinylaromatic monomers containing condensed aromatic ring structures such as vinyl naphthalene, vinyl anthracene and the like, or monomers with a structure represented by the formula:

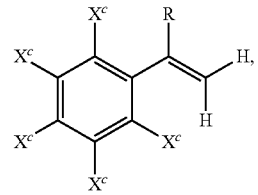

(7)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Examples of suitable monovinylaromatic monomers copolymerizable with the butadiene include styrene. 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, and the like, and combinations comprising at least one of the foregoing monovinylaromatic monomers. In a further aspect, the butadiene is copolymerized with up to about 12 wt. %, specifically about 1 to about 10 wt. % styrene and/or alpha-methyl styrene.

Other monomers that can be copolymerized with the butadiene are monovinylic monomers such as itaconic acid, acrylamide, N-substituted acrylamide or methacrylamide, maleic anhydride, maleimide, N-alkyl-, aryl-, or haloaryl-substituted maleimide, glycidyl(meth)acrylates, and monomers generally with a structure represented by the formula:

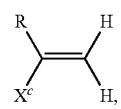

(8)

wherein R is hydrogen, $C_1$-$C_5$ alkyl, bromo, or chloro, and $X^c$ is cyano, $C_1$-$C_{12}$ alkoxycarbonyl, $C_1$-$C_{12}$ aryloxycarbonyl, hydroxy carbonyl, and the like. Examples of monomers of formula (10) include acrylonitrile, ethacrylonitrile, methacrylonitrile, alpha-chloroacrylonitrile, beta-chloroacrylonitrile, alpha-bromoacrylonitrile, acrylic acid, methyl(meth)acrylate, ethyl(meth)acrylate, n-butyl(meth)acrylate, t-butyl (meth)acrylate, n-propyl(meth)acrylate, isopropyl(meth)acrylate, 2-ethylhexyl(meth)acrylate, and the like, and combinations comprising at least one of the foregoing monomers. Monomers such as n-butyl acrylate, ethyl acrylate, and 2-ethylhexyl acrylate are commonly used as monomers copolymerizable with the butadiene.

The particle size of the butadiene phase is not critical, and can be, for example about 0.01 to about 20 micrometers, specifically about 0.5 to about 10 micrometers, more specifically about 0.6 to about 1.5 micrometers can be used for bulk polymerized rubber substrates. Particle size can be measured by light transmission methods or capillary hydrodynamic chromatography (CHDF). The butadiene phase can provide about 5 to about 95 wt. % of the total weight of the ABS impact modifier copolymer, more specifically about 20 to about 90 wt. %, and even more specifically about 40 to about 85 wt. % of the ABS impact modifier, the remainder being the rigid graft phase.

The rigid graft phase comprises a copolymer formed from a styrenic monomer composition together with an unsaturated monomer comprising a nitrile group. As used herein. "styrenic monomer" includes monomers of formula (7) wherein each $X^c$ is independently hydrogen, $C_1$-$C_4$ alkyl, phenyl, $C_7$-$C_8$ aralkyl, $C_7$-$C_9$ alkaryl, $C_1$-$C_4$ alkoxy, phenoxy, chloro, bromo, or hydroxy, and R is hydrogen, $C_1$-$C_2$ alkyl, bromo, or chloro. Specific examples styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, and the like. Combinations comprising at least one of the foregoing styrenic monomers can be used.

Further as used herein, an unsaturated monomer comprising a nitrile group includes monomers of formula (8) wherein R is hydrogen. $C_1$-$C_5$ alkyl, bromo, or chloro, and $X^c$ is cyano. Specific examples include acrylonitrile, ethacrylonitrile, methacrylonitrile, alpha-chloroacrylonitrile, beta-chloroacrylonitrile, alpha-bromoacrylonitrile, and the like. Combinations comprising at least one of the foregoing monomers can be used. The rigid graft phase of the bulk polymerized ABS can further optionally comprise other monomers copolymerizable therewith, including other monovinylaromatic monomers and/or monovinylic monomers such as itaconic acid, acrylamide, N-substituted acrylamide or methacrylamide, maleic anhydride, maleimide, N-alkyl-, aryl-, or haloaryl-substituted maleimide, glycidyl(meth)acrylates, and monomers of the generic formula (8). Specific comonomers include $C_1$-$C_4$ alkyl(meth)acrylates, for example methyl methacrylate.

The rigid copolymer phase will generally comprise about 10 to about 99 wt. %, specifically about 40 to about 95 wt. %, more specifically about 50 to about 90 wt. % of the styrenic monomer, about 1 to about 90 wt. %, specifically about 10 to about 80 wt. %, more specifically about 10 to about 50 wt. % of the unsaturated monomer comprising a nitrile group; and 0 to about 25 wt. %, specifically 1 to about 15 wt. % of other comonomer, each based on the total weight of the rigid copolymer phase.

The bulk polymerized ABS copolymer can further comprise a separate matrix or continuous phase of ungrafted rigid copolymer that can be simultaneously obtained with the ABS. The ABS can comprise about 40 to about 95 wt. % elastomer-modified graft copolymer and about 5 to about 65 wt. % rigid copolymer, based on the total weight of the ABS. In another embodiment, the ABS can comprise about 50 to about 85 wt. %, more specifically about 75 to about 85 wt. % elastomer-modified graft copolymer, together with about 15 to about 50 wt. %, more specifically about 15 to about 25 wt. % rigid copolymer, based on the total weight of the ABS.

A variety of bulk polymerization methods for ABS-type resins are known. In multizone plug flow bulk processes, a series of polymerization vessels (or towers), consecutively connected to each other, providing multiple reaction zones. The elastomeric butadiene can be dissolved in one or more of the monomers used to form the rigid phase, and the elastomer solution is fed into the reaction system. During the reaction, which can be thermally or chemically initiated, the elastomer is grafted with the rigid copolymer (i.e., SAN). Bulk copolymer (referred to also as free copolymer, matrix copolymer, or non-grafted copolymer) is also formed within the continuous phase containing the dissolved rubber. As polymerization continues, domains of free copolymer are formed within the continuous phase of rubber/comonomers to provide a two-phase system. As polymerization proceeds, and more free copolymer is formed, the elastomer-modified copolymer starts to disperse itself as particles in the free copolymer and the free copolymer becomes a continuous phase (phase inversion). Some free copolymer is generally occluded within the elastomer-modified copolymer phase as well. Following the phase inversion, additional heating can be used to complete polymerization. Numerous modifications of this basis process have been described, for example in U.S. Pat. No. 3,511,895, which describes a continuous bulk ABS process that provides controllable molecular weight distribution and microgel particle size using a three-stage reactor system. In the first reactor, the elastomer/monomer solution is charged into the reaction mixture under high agitation to precipitate discrete rubber particle uniformly throughout the reactor mass before appreciable cross-linking can occur. Solids levels of the first, the second, and the third reactor are carefully controlled so that molecular weights fall into a desirable range. U.S. Pat. No. 3,981,944 discloses extraction of the elastomer particles using the styrenic monomer to dissolve/disperse the elastomer particles, prior to addition of the unsaturated monomer comprising a nitrile group and any other comonomers. U.S. Pat. No. 5,414,045 discloses reacting in a plug flow grafting reactor a liquid feed composition comprising a styrenic monomer composition, an unsaturated nitrile monomer composition, and an elastomeric butadiene polymer to a point prior to phase inversion, and reacting the first polymerization product (grafted elastomer) therefrom in a continuous-stirred tank reactor to yield a phase inverted second polymerization product that then can be further reacted in a finishing reactor, and then devolatilized to produce the desired final product.

In a further aspect, the impact modifier component is a bulk polymerized ABS copolymer present in an amount from about 10 wt % to about 25 wt %. In a still further aspect, the impact modifier component is a bulk polymerized ABS copolymer present in an amount from about 12 wt % to about 25 wt %. In a yet further aspect, the impact modifier component is a bulk polymerized ABS copolymer present in an amount from about 13 wt % to about 25 wt %. In an even further aspect, the impact modifier component is a bulk polymerized ABS copolymer present in an amount from about 14 wt % to about 25 wt %. In a still further aspect, the impact modifier component is a bulk polymerized ABS copolymer present in an amount from about 15 wt % to about 25 wt %. In a yet further aspect, the impact modifier component is a bulk polymerized ABS copolymer present in an amount from about 16 wt % to about 25 wt %. In an even further aspect, the impact modifier component is a bulk polymerized ABS copolymer present in an amount from about 17 wt % to about 25 wt %.

In a further aspect, the impact modifier component is a bulk polymerized ABS copolymer present in an amount from about 10 wt % to about 22 wt %. In a still further aspect, the impact modifier component is a bulk polymerized ABS copolymer present in an amount from about 12 wt % to about 22 wt %. In a yet further aspect, the impact modifier component is a bulk polymerized ABS copolymer present in an amount from about 13 wt % to about 22 wt %. In an even further aspect, the impact modifier component is a bulk polymerized ABS copolymer present in an amount from about 14 wt % to about 22 wt %. In a still further aspect, the impact modifier component is a bulk polymerized ABS copolymer present in an amount from about 15 wt % to about 22 wt %. In a yet further aspect, the impact modifier component is a bulk polymerized ABS copolymer present in an amount from about 16 wt % to about 22 wt %. In an even further aspect, the impact modifier component is a bulk polymerized ABS copolymer present in an amount from about 17 wt % to about 22 wt %.

In a further aspect, the impact modifier component is a bulk polymerized ABS copolymer present in an amount from about 10 wt % to about 20 wt %. In a still further aspect, the impact modifier component is a bulk polymerized ABS copolymer present in an amount from about 12 wt % to about 20 wt %. In a yet further aspect, the impact modifier component is a bulk polymerized ABS copolymer present in an amount from about 13 wt % to about 20 wt %. In an even further aspect, the impact modifier component is a bulk polymerized ABS copolymer present in an amount from about 14 wt % to about 20 wt %. In a still further aspect, the impact modifier component is a bulk polymerized ABS copolymer present in an amount from about 15 wt % to about 20 wt %. In a yet further aspect, the impact modifier component is a bulk polymerized ABS copolymer present in an amount from about 16 wt % to about 20 wt %. In an even further aspect, the impact modifier component is a bulk polymerized ABS copolymer present in an amount from about 17 wt % to about 20 wt %.

In a further aspect, the impact modifier component is a bulk polymerized ABS copolymer present in an amount from about 10 wt % to about 18 wt %. In a still further aspect, the impact modifier component is a bulk polymerized ABS copolymer present in an amount from about 12 wt % to about 18 wt %. In a yet further aspect, the impact modifier component is a bulk polymerized ABS copolymer present in an amount from about 13 wt % to about 18 wt %. In an even further aspect, the impact modifier component is a bulk polymerized ABS copolymer present in an amount from about 14 wt % to about 18 wt %. In a still further aspect, the impact modifier component is a bulk polymerized ABS copolymer present in an amount from about 15 wt % to about 18 wt %. In a yet further aspect, the impact modifier component is a bulk polymerized ABS copolymer present in an amount from about 16 wt % to about 18 wt %. In an even further aspect, the impact modifier component is a bulk polymerized ABS copolymer present in an amount from about 17 wt % to about 18 wt %.

In a further aspect, the impact modifier component is a bulk polymerized ABS copolymer present in an amount from about 10 wt % to about 17 wt %. In a still further aspect, the impact modifier component is a bulk polymerized ABS copolymer present in an amount from about 12 wt % to about 17 wt %. In a yet further aspect, the impact modifier component is a bulk polymerized ABS copolymer present in an amount from about 13 wt % to about 17 wt %. In an even further aspect, the impact modifier component is a bulk polymerized ABS copolymer present in an amount from about 14 wt % to about 17 wt %. In a still further aspect, the impact modifier component is a bulk polymerized ABS copolymer present in an amount from about 15 wt % to about 17 wt %. In a yet further aspect, the impact modifier component is a bulk polymerized ABS copolymer present in an amount from about 16 wt % to about 17 wt %.

In a further aspect, the bulk polymerized ABS copolymer has a butadiene content of from about 10 wt % to about 17 wt %. In a still further aspect, the bulk polymerized ABS copolymer has a butadiene content of from about 11 wt % to about 17 wt %. In a yet further aspect, the bulk polymerized ABS copolymer has a butadiene content of from about 12 wt % to about 17 wt %. In an even further aspect, the bulk polymerized ABS copolymer has a butadiene content of from about 13 wt % to about 17 wt %. In a still further aspect, the bulk polymerized ABS copolymer has a butadiene content of from about 14 wt % to about 17 wt %.

In a yet further aspect, the bulk polymerized ABS copolymer has a butadiene content of from about 15 wt % to about 17 wt %.

In a further aspect, the bulk polymerized ABS copolymer has a butadiene content of from about 10 wt % to about 16 wt %. In a still further aspect, the bulk polymerized ABS copolymer has a butadiene content of from about 11 wt % to about 16 wt %. In a yet further aspect, the bulk polymerized ABS copolymer has a butadiene content of from about 12 wt % to about 16 wt %. In an even further aspect, the bulk polymerized ABS copolymer has a butadiene content of from about 13 wt % to about 16 wt %. In a still further aspect, the bulk polymerized ABS copolymer has a butadiene content of from about 14 wt % to about 16 wt %. In a yet further aspect, the bulk polymerized ABS copolymer has a butadiene content of from about 15 wt % to about 16 wt %.

In a further aspect, the bulk polymerized ABS copolymer has an acrylonitrile content of from about 11 wt % to about 22 wt %. In a still further aspect, the bulk polymerized ABS copolymer has an acrylonitrile content of from about 11 wt % to about 21 wt %. In a yet further aspect, the bulk polymerized ABS copolymer has an acrylonitrile content of from about 11 wt % to about 20 wt %. In an even further aspect, the bulk polymerized ABS copolymer has an acrylonitrile content of from about 11 wt % to about 19 wt %. In a still further aspect, the bulk polymerized ABS copolymer has an acrylonitrile content of from about 11 wt % to about 18 wt %. In a yet further aspect, the bulk polymerized ABS copolymer has an acrylonitrile content of from about 11 wt % to about 17 wt %. In an even further aspect, the bulk polymerized ABS copolymer has an acrylonitrile content of from about 11 wt % to about 16 wt %. In a still further aspect, the bulk polymerized ABS copolymer has an acrylonitrile content of from about 11 wt % to about 15 wt %. In a yet further aspect, the bulk polymerized ABS copolymer has an acrylonitrile content of from about 11 wt % to about 14 wt %. In an even further aspect, the bulk polymerized ABS copolymer has an acrylonitrile content of from about 11 wt % to about 13 wt %.

In a further aspect, the bulk polymerized ABS copolymer has an acrylonitrile content of from about 12 wt % to about 22 wt %. In a still further aspect, the bulk polymerized ABS copolymer has an acrylonitrile content of from about 12 wt % to about 21 wt %. In a yet further aspect, the bulk polymerized ABS copolymer has an acrylonitrile content of from about 12 wt % to about 20 wt %. In an even further aspect, the bulk polymerized ABS copolymer has an acrylonitrile content of from about 12 wt % to about 19 wt %. In a still further aspect, the bulk polymerized ABS copolymer has an acrylonitrile content of from about 12 wt % to about 18 wt %. In a yet further aspect, the bulk polymerized ABS copolymer has an acrylonitrile content of from about 12 wt % to about 17 wt %. In an even further aspect, the bulk polymerized ABS copolymer has an acrylonitrile content of from about 12 wt % to about 16 wt %. In a still further aspect, the bulk polymerized ABS copolymer has an acrylonitrile content of from about 12 wt % to about 15 wt %. In a yet further aspect, the bulk polymerized ABS copolymer has an acrylonitrile content of from about 12 wt % to about 14 wt %. In an even further aspect, the bulk polymerized ABS copolymer has an acrylonitrile content of from about 12 wt % to about 13 wt %.

In a further aspect, the bulk polymerized ABS copolymer ("BABS") has a weight average molecular weight from about 100,000 g/mol to about 190,000 g/mol when determined by gel permeation chromatography relative to traceable polystyrene standards. In reference to the weight average molecular weight ($M_w$) of the impact modifier component, including the bulk polymerized ABS, of the present invention, it is understood that the $M_w$ is the relative $M_w$ determined by gel permeation chromatography relative to traceable polystyrene standards.

Talc and Surface-Treated Talc

In various aspects, the blended polycarbonate compositions of the present invention comprise a filler. In a further aspect, the filler is a mineral filler. Mineral fillers are used in engineering a variety of thermoplastics to provide high performance properties, including improved impact properties while maintaining good ductility together with good flow. A variety of mineral fillers can be used in the disclosed blended polycarbonate compositions, including silicates such as mica, talc, clay, asbestos, feldspar, betonite, wollastonite, pyrophillite, and the like. In a further aspect, the mineral filler has a median particle size (i.e. $D_{50}$) of 15 microns or less, including a median particle size of 10 microns or less. In a still further aspect, the mineral filler is talc with a median particle size of from about 1 micron to about 5 microns. In an even further aspect, the mineral filler can have a topsize ($D_{90}$) of 15 microns or less, including 10 microns or less.

Talc is a hydrated magnesium silicate of the general chemical formula $Mg_8(OH)_4Si_8O_{20}$ or $3MgO.SiO_2.H_2O$. Depending upon the deposit and processing used, other minerals can be present, e.g. chlorite, dolomite, and magnesite. Synthetic talcs have also been described and are known to one skilled in the art. In the present invention, the blend polycarbonate compositions can optionally comprise a talc subjected to surface treatment by the use of a surface treatment agent. In various aspects, the disclosed blended polycarbonate compositions with improved impact properties of the present invention comprise a chemically treated talc filler.

Various aspects of particle size and distribution are important in obtaining optimal performance, e.g. increased impact strength. In a further aspect, the talc filler is micronized. In a still further aspect, the talc filler has a mean particle size of about 0.2 to about 20 µm. In a yet further aspect, the talc filler has a mean particle size of about 0.2 to about 5 µm. In an even further aspect, the talc filler has a mean particle size of about 0.2 to about 3 µm. In a still further aspect, the talc filler has a mean particle size of about 0.2 to about 2 µm. In a yet further aspect, the talc filler has a mean particle size of less than about 2 µm. In an even further aspect, the talc filler has a mean particle size of less than about 1 µm. In a still further aspect, the talc filler has a mean particle size of about 2.0 µm. In a yet further aspect, the talc filler has a mean particle size of about 1.8 µm. In an even further aspect, the talc filler has a mean particle size of about 1.1 µm. In a still further aspect, the talc filler has a mean particle size of about 0.9 µm. In a yet further aspect, the talc filler has a mean particle size of about 0.8 µm.

In a further aspect, the talc filer is Jetfine 3CC (Imerys Talc, Inc.). In a yet further aspect, the talc filer is Jetfine 3CA (Imerys Talc, Inc.). In a still further aspect, the talc filer is Flex Talc 610 (KISH Talc).

Median diameter $D_{50}$" is understood to mean a diameter such that 50% of the particles by weight have a size less than the said diameter; "Median diameter $D_{95}$" is understood to mean a diameter such that 95% of the particles by weight have a size less than the said diameter; and "Median diameter $D_{98}$" is understood to mean a diameter such that 98% of the particles by weight have a size less than the said diameter. For non-spherical particles, the size consists of the equivalent spherical diameter (Stocks diameter). All measurements of the diameters $D_{50}$, $D_{95}$, and $D_{98}$ can be carried out by means of a "Sedigraph" apparatus (trade name) by gravity sedimentation in accordance with standard AFNOR X11-683. "Specific surface area (BET)" is understood to mean the area of the surface of the particles of the powder with respect to unit mass, and can be determined according to the BET method by the quantity of argon adsorbed on the surface of the said particles so as to form a monomolecular layer completely covering the said surface (measurement according to the BET method, AFNOR standard X11-621 and 622).

In various further aspects, the talc filler has a particle distribution $D_{50}$ of less than 10 µm, less than 5 µm, less than 4 µm, less than 3 µm, less than 2 µm, less than 1.8 µm, less than 1.7 µm, less than 1.6 µm, less than 1.5 µm, less than 1.4 µm, less than 1.3 µm, less than 1.2 µm, less than 1.1 µm, less than 1.0 µm, less than 0.9 µm, and less than 0.8 µm. In a still further aspect, the talc filler has a medium diameter $D_{50}$ of the particles substantially between 1 and 3.5 µm. In a yet further aspect, the talc filler has a medium diameter $D_{50}$ of the particles substantially between 0.5 and 2.5 µm.

In a further aspect, the talc filler has a specific surface area substantially between 15 and 40 $m^2/g$. In a still further aspect, the talc filler has a specific surface area substantially between 15 and 30 $m^2/g$. In a yet further aspect, the talc filler has a specific surface area substantially between 15 and 25 $m^2/g$. In an even further aspect, the talc filler has a specific surface area substantially between 15 and 20 $m^2/g$. In a still further aspect, the talc filler has a specific surface area substantially between 25 and 40 $m^2/g$.

In a further aspect, the talc filler has a medium diameter $D_{50}$ of the particles substantially between 1 and 3.5 µm and a specific surface area substantially between 15 and 40 $m^2/g$. In a yet further aspect, the talc filler has a median particle size diameter $D_{50}$ substantially between 0.5 and 2.5 µm, a median diameter $D_{95}$ of less than 8 µm, a median diameter $D_{98}$ of less than 15 µm and a specific surface area (BET) substantially between 15 and 25 $m_2/g$.

In various aspects, the chemically treated talc can be prepared by treating a talc filler in such a way as to confer one or more predetermined surface properties upon them. The treatment process uses the hydrophilic surface sites on the talc filler (particularly silanol groups) and consists of fixing upon these sites molecules which have both a group providing attachment to the said sites and one or more groups conferring the desired property or properties. Molecules of the following families can be attached to the hydrophilic surface sites: epoxides, isocyanates, organic acids, acrylic acids, alcohols, acyl chlorides, anhydrides, organosilanes including at least one hydrolysable group (alkoxysilanes, chlorosilanes, etc.), in order to confer surface reactivity towards a specific organic matrix upon the substance. The chemical groups characteristic of these families have the property of reacting with the silanol group, thus creating a strong bond with the particle.

In a further aspect, the talc filler has been treated with a composition comprising at least one silane compound. In a yet further aspect, the talc filler has been treated with a composition comprising at least one organosilane compound. In an even further aspect, the talc filler is treated with a surface treatment agent comprising an organosilanes with at least one hydrolysable group. In a still further aspect, the organosilane is selected from an alkoxysilane and a halosilane. In a yet further aspect, the halosilane is a chlorosilane.

In a further aspect, the talc filler has been treated with a composition comprising at least one silane compound selected from chlorosilane, tridecafluoro-1,1,2,2-tetrahydrooctyl-1-dimethylsilane, monomethylsilanetriol dihydroxyprolenate, and monomethylsilanetriol ascorbate. In a still further aspect, the talc filler has been treated with a composition comprising at least one silane compound selected from 3-chloropropyltrimethoxysilane, 1-trimethoxysilyl-2-(p-,m-chloromethyl)phenylethane, 1,3-divinyltetramethyldisilazane, vinyltriethoxysilane, and vinyltrimethoxysilane.

In a further aspect, the talc filler has been treated with a composition comprising at a compound of the formula:

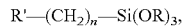

wherein R' is a radical selected from alkyl, aryl, vinyl, amino, mercapto, acetoxy, epoxy, and methacryloxy; R is a C1-C4 radical; and n is integer from 3 to 6.

In a further aspect, the talc filler has been treated with a composition comprising at a compound of the formula:

wherein $R^1$ is a non-hydrolyzable organic radical; $R^2$ is a hydrolysable group; and m is an integer from 1 to 3. In a yet further aspect, $R^1$ is selected from methyl, vinyl, phenyl, methacryloxypropyl, n-octyl, glycidoxypropyl, and octadecyl. In a still further aspect, $R^2$ is selected from alkoxy, acyloxy, amino, haloalkyl or halo. In a yet further aspect, $R^2$ is selected from chloro, methoxy, and ethoxy. In a yet further aspect, $R^2$ is chloro. In an even further aspect, $R^2$ is methoxy. In a still further aspect, $R^2$ is ethoxy. In an even further aspect, m is 1.

In a further aspect, the talc filler has been treated with a silane-based composition comprising the silane-based composition used to prepare Luzenac R7 talc.

In a further aspect, the talc filler is chemically treated Imerys Jetfine 3CC. In a yet further aspect, the Imerys Jetfine 3CC has been treated with a composition comprising at least one compound used to prepare Imerys surface-treated Luzenac R7. In an even further aspect, the Imerys Jetfine 3CC has been treated with a silane-based composition comprising the silane-based composition used to prepare Luzenac R7 talc. In a still further aspect, the Imerys Jetfine 3CC has been treated with a composition comprising at least one silane compound. In an even further aspect, the Imerys Jetfine 3CC has been treated with a composition comprising at least one surface active agent. In a still further aspect, the Imerys Jetfine 3CC has been treated with a composition comprising at least one silane compound selected from a halosilane and an alkoxysilane. In a yet further aspect, the Imerys Jetfine 3CC has been treated with a composition comprising at least one silane compound selected from chlorosilane, tridecafluoro-1,1,2,2-tetrahydrooctyl-1-dimethylsilane, monomethylsilanetriol dihydroxyprolenate, and mono-methylsilanetriol ascorbate.

In a further aspect, the Imerys Jetfine 3CC has been treated with a composition comprising at a compound of the formula:

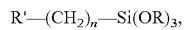

wherein R' is a radical selected from alkyl, aryl, vinyl, amino, mercapto, acetoxy, epoxy, and methacryloxy; R is a C1-C4 radical; and n is integer from 3 to 6.

In a further aspect, the Imerys Jetfine 3CC has been treated with a composition comprising at a compound of the formula:

wherein $R^1$ is a non-hydrolyzable organic radical; $R^2$ is a hydrolysable group; and m is an integer from 1 to 3. In a yet further aspect, $R^1$ is selected from methyl, vinyl, phenyl, methacryloxypropyl, n-octyl, glycidoxypropyl, and octadecyl. In a still further aspect, $R^2$ is selected from alkoxy, acyloxy, amino, haloalkyl or halo. In a yet further aspect, $R^2$ is selected from chloro, methoxy, and ethoxy. In a yet further aspect, $R^2$ is chloro. In an even further aspect, $R^2$ is methoxy. In a still further aspect, $R^2$ is ethoxy. In an even further aspect, m is 1.

In a further aspect, the talc filler is chemically treated Imerys Jetfine 3CA. In a yet further aspect, the Imerys Jetfine 3CA has been treated with a composition comprising at least one compound used to prepare Imerys surface-treated Luzenac R7. In an even further aspect, the Imerys Jetfine 3CA has been treated with a silane-based composition comprising the silane-based composition used to prepare Luzenac R7 talc. In a still further aspect, the Imerys Jetfine 3CA has been treated with a composition comprising at least one silane compound. In an even further aspect, the Imerys Jetfine 3CA has been treated with a composition comprising at least one surface active agent. In a still further aspect, the Imerys Jetfine 3CA has been treated with a composition comprising at least one silane compound selected from a halosilane and an alkoxysilane. In a yet further aspect, the Imerys Jetfine 3CA has been treated with a composition comprising at least one silane compound selected from chlorosilane, tridecafluoro-1,1,2,2-tetrahydrooctyl-1-dimethylsilane, monomethylsilanetriol dihydroxyprolenate, and mono-methylsilanetriol ascorbate.

In a further aspect, the Imerys Jetfine 3CA has been treated with a composition comprising at a compound of the formula:

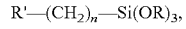

wherein R' is a radical selected from alkyl, aryl, vinyl, amino, mercapto, acetoxy, epoxy, and methacryloxy; R is a C1-C4 radical; and n is integer from 3 to 6.

In a further aspect, the Imerys Jetfine 3CA has been treated with a composition comprising at a compound of the formula:

wherein $R^1$ is a non-hydrolyzable organic radical; $R^2$ is a hydrolysable group; and m is an integer from 1 to 3. In a yet further aspect, $R^1$ is selected from methyl, vinyl, phenyl, methacryloxypropyl, n-octyl, glycidoxypropyl, and octadecyl. In a still further aspect, $R^2$ is selected from alkoxy, acyloxy, amino, haloalkyl or halo. In a yet further aspect, $R^2$ is selected from chloro, methoxy, and ethoxy. In a yet further aspect, $R^2$ is chloro. In an even further aspect, $R^2$ is methoxy. In a still further aspect, $R^2$ is ethoxy. In an even further aspect, m is 1.

In various aspects, blended polycarbonate compositions optionally comprise a surface-treated talc wherein the surface-treated talc is Luzenac R7.

Other Additives for Blended Polycarbonate Compositions

In addition to the foregoing components, the disclosed polycarbonate compositions can optionally comprise a balance amount of one or more additive materials ordinarily incorporated in polycarbonate resin compositions of this type, with the proviso that the additives are selected so as to not significantly adversely affect the desired properties of the polycarbonate composition. Combinations of additives can be used. Such additives can be mixed at a suitable time during the mixing of the components for forming the composition. Exemplary and non-limiting examples of additive materials that can be present in the disclosed polycarbonate compositions include an antioxidant, a stabilizer (including for example a heat stabilizer, a hydrolytic stabilizer, or a light stabilizer), UV absorbing additive, plasticizer, lubricant, mold release agent, antistatic agent, colorant (e.g., pigment and/or dye), or any combination thereof.

In a further aspect, the disclosed polycarbonate blend compositions can further comprise a primary antioxidant or "stabilizer" (e.g., a hindered phenol) and, optionally, a secondary antioxidant (e.g., a phosphate and/or thioester). Suitable antioxidant additives include, for example, organic phosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecyl-thiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of about 0.01 wt % to about 1 wt %, optionally about 0.05 wt % to about 0.5 wt % of the polycarbonate blend composition.

In various aspects, the disclosed polycarbonate blend composition further comprises a hydrolytic stabilizer, wherein the hydrolytic stabilizer comprises a hydrotalcite and an inorganic buffer salt. In a further aspect, the disclosed polycarbonate blend composition comprises a hydrolytic stabilizer, wherein the hydrolytic stabilizer comprises one or more hydrotalcites and an inorganic buffer salt comprising one or more inorganic salts capable of pH buffering. Either synthetic hydrotalcites or natural hydrotalcites can be used as the hydrotalcite compound in the present invention. Exemplary hydrotalcites that are useful in the compositions of the present are commercially available and include, but are not limited to, magnesium hydrotalcites such as DHT-4C (available from Kyowa Chemical Co.); Hysafe 539 and Hysafe 530 (available from J.M. Huber Corporation).

In a further aspect, suitable heat stabilizer additives include, for example, organic phosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, organic phosphates such as trimethyl phosphate, thioesters such as pentaerythritol betalaurylthiopropionate, and the like, or combinations comprising at least one of the foregoing heat stabilizers. Heat stabilizers are generally used in amounts of about 0.01 wt % to about 5 wt %, optionally about 0.05 wt % to about 0.3 wt % of the polycarbonate blend composition.

In a further aspect, light stabilizers and/or ultraviolet light (UV) absorbing additives can also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and benzophenones such as 2-hydroxy-4-n-octoxy benzophenone, or the like, or combinations comprising at least one of the foregoing light stabilizers. Light stabilizers are generally used in amounts of about 0.01 wt % to about 10 wt %, optionally about 0.1 wt % to about 1 wt % of the polycarbonate blend composition.

In a further aspect, suitable UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis (4H-3,1-benzoxazin-4-one) (CYASORB™ UV-3638); 1,3-bis[(2-cyano-3,3-diphenylacryloyl)oxy]-2,2-bis[[(2-cyano-3,3-diphenyl-acryloyl)oxy]methyl]propane (UVINUL™ 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenyl-acryloyl)oxy]methyl]propane; nano-size inorganic materials such as titanium oxide, cerium oxide, and zinc oxide, all with particle size less than about 100 nanometers; or the like, or combinations comprising at least one of the foregoing UV absorbers. UV absorbers are generally used in amounts of about 0.1 wt % to about 5 wt % of the polycarbonate blend composition.

In various aspects, plasticizers, lubricants, and/or mold release agents additives can also be used. There is a considerable overlap among these types of materials, which include, for example, poly-alpha-olefins; epoxidized soybean oil; silicones, including silicone oils; esters, for example, fatty acid esters such as medium and high molecular weight alkyl stearyl esters; mixtures of fatty acid esters and hydrophilic and hydrophobic nonionic surfactants comprising polyethylene glycol polymers, polypropylene glycol polymers, and copolymers thereof; waxes such as beeswax, montan wax, paraffin wax or the like. Such materials are generally used in amounts of about 0.1 wt % to about 20 wt %, optionally about 1 wt % to about 10 wt % the polycarbonate blend composition.

In a further aspect, colorants such as pigment and/or dye additives can also be present. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments. Pigments are generally used in amounts of about 0.01 wt % to about 10 wt %, the polycarbonate blend composition.

In a further aspect, suitable dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes;

carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3",5"-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or amounts of about 0.1 to about 10 ppm.

In a further aspect, the anti-drip agents can also be present. Exemplary anti-drip agents can include a fibril forming or non-fibril forming fluoropolymer such as polytetrafluoroethylene (PTFE). The anti-drip agent can optionally be encapsulated by a rigid copolymer, for example styrene-acrylonitrile (SAN). PTFE encapsulated in SAN is known as TSAN. Encapsulated fluoropolymers can be made by polymerizing the encapsulating polymer in the presence of the fluoropolymer, for example, in an aqueous dispersion. TSAN can provide significant advantages over PTFE, in that TSAN can be more readily dispersed in the composition. A suitable TSAN can comprise, for example, about 50 wt % PTFE and about 50 wt % SAN, based on the total weight of the encapsulated fluoropolymer. Alternatively, the fluoropolymer can be pre-blended in some manner with a second polymer, such as for, example, an aromatic polycarbonate resin or SAN to form an agglomerated material for use as an anti-drip agent. Either method can be used to produce an encapsulated fluoropolymer.

In various aspects, the blend polycarbonate compositions of the present invention further comprise an additive selected from coupling agents, antioxidants, mold release agents, UV absorbers, light stabilizers, heat stabilizers, lubricants, plasticizers, pigments, dyes, colorants, anti-static agents, nucleating agents, anti-drip agents, acid scavengers, and combinations of two or more of the foregoing. In a further aspect, the blend polycarbonate compositions of the present invention further comprise at least one polymer additive selected from a flame retardant, a colorant, a primary anti-oxidant, and a secondary anti-oxidant.

In a further aspect, the blended polycarbonate compositions further comprise a flame retardant selected from a chlorine-containing hydrocarbon, a bromine-containing hydrocarbon, boron compound, a metal oxide, antimony oxide, aluminum hydroxide, a molybdenum compound, zinc oxide, magnesium oxide, an organic phosphate, phosphinate, phosphite, phosphonate, phosphene, halogenated phosphorus compound, inorganic phosphorus containing salt, and a nitrogen-containing compound, or a combination comprising at least one of the foregoing.

In a further aspect, the flame retardant is a phosphorus-containing flame retardant. In yet a further aspect, phosphorus-containing flame retardant is an aromatic organophosphorus compound having at least one organic aromatic group and at least one phosphorus-containing group, or an organic compound having at least one phosphorus-nitrogen bond. In yet a further aspect, the organophosphorus compound is bisphenol A bis(diphenyl phosphate), hydroquinone bis(diphenyl phosphate), triphenyl phosphate, resorcinol bis(diphenyl phosphate), tricresyl phosphate, a phenol/bi-phenol polyphosphate, or mixtures thereof. In yet a further aspect, the organophosphorus compound containing a nitrogen-phosphorus bond is a phosphazene, phosphorus ester amide, phosphoric acid amide, phosphonic acid amide, phosphinic acid amide, tris(aziridinyl)phosphine oxide, or mixtures thereof.

In a further aspect, the blend polycarbonate compositions further comprise a primary anti-oxidant selected from a hindered phenol and secondary aryl amine, or a combination thereof. In a still further aspect, the hindered phenol comprises one or more compounds selected from triethylene glycol bis[3-(3-t-butyl-5-methyl-4-hydroxyphenyl)propionate], 1,6-hexanediol bis[3-(3,5-di-t-butyl-4-hydroxyphenyl)propionate], 2,4-bis(n-octylthio)-6-(4-hydroxy-3,5-di-t-butylanilino)-1,3,5-triazine, pentaerythrityl tetrakis[3-(3,5-di-t-butyl-4-hydroxyphenyl)propionate], 2,2-thiodiethylene bis[3-(3,5-di-t-butyl-4-hydroxyphenyl)propionate], octadecyl 3-(3,5-di-t-butyl-4-hydroxyphenyl)propionate, N,N'-hexamethylene bis(3,5-di-t-butyl-4-hydroxy-hydrocinnamamide), tetrakis(methylene 3,5-di-tert-butylhydroxycinnamate)methane, and octadecyl 3,5-di-tert-butylhydroxyhydrocinnamate. In a yet further aspect, the hindered phenol comprises octadecyl-3-(3,5-di-t-butyl-4-hydroxyphenyl)-propionate. In an even further aspect, the hindered phenol is present in an amount from about 0.01 wt % to about 0.50 wt %. In a still further aspect, the hindered phenol is present in an amount from about 0.01 wt % to about 0.20 wt %.

In a further aspect, the blend polycarbonate compositions further comprise a secondary anti-oxidant selected from an organophosphate and thioester, or a combination thereof. In a still further aspect, the secondary anti-oxidant comprises one or more compounds selected from tetrakis(2,4-di-tert-butylphenyl) [1,1-biphenyl]-4,4'-diylbisphosphonite, tris(2,4-di-tert-butylphenyl)phosphite, bis(2,4-di-tert-butylphenyl)pentaerythritol diphosphite, bis(2,4-dicumylphenyl)pentaerytritoldiphosphite, tris(nonyl phenyl)phosphite, and distearyl pentaerythritol diphosphite. In a yet further aspect, the secondary anti-oxidant comprises tris(2,4-di-tert-butylphenyl)phosphite. In an even further aspect, the secondary anti-oxidant is present in an amount from about 0.01 wt % to about 0.50 wt %. In a still further aspect, the secondary anti-oxidant is present in an amount from about 0.01 wt % to about 0.20 wt %.

In a further aspect, the blended polycarbonate compositions further comprise an anti-drip agent. In a still further aspect, the anti-drip agent is a styrene-acrylonitrile copolymer encapsulated PTFE (TSAN). In a yet further aspect, the anti-drip agent is present in an amount from about 0.1 wt % to about 5 wt %. In an even further aspect, the anti-drip agent is present in an amount from about 0.1 wt % to about 1 wt %.

Manufacture of Blended Polycarbonate Compositions

In various aspects, the blended polycarbonate compositions of the present invention can be manufactured by various methods. The compositions of the present invention can be blended with the aforementioned ingredients by a variety of methods involving intimate admixing of the materials with any additional additives desired in the formulation. Because of the availability of melt blending equipment in commercial polymer processing facilities, melt processing methods can be used. In various further aspects, the equipment used in such melt processing methods includes, but is not limited to, the following: co-rotating and counter-rotating extruders, single screw extruders, co-kneaders, disc-pack processors and various other types of extrusion equipment. In a further aspect, the extruder is a twin-screw extruder. In various further aspects, the melt processed composition exits processing equipment such as an extruder through small exit holes in a die. The resulting strands of molten resin are cooled by passing the strands through a water bath. The cooled strands can be chopped into small pellets for packaging and further handling.

The temperature of the melt is minimized in order to avoid excessive degradation of the resins. For example, it can be desirable to maintain the melt temperature between about 230° C. and about 350° C. in the molten resin composition, although higher temperatures can be used provided that the residence time of the resin in the processing equipment is kept short. In a still further aspect, the extruder is typically operated at a temperature of about 180° C. to about 385° C. In a yet further aspect, the extruder is typically operated at a temperature of about 200° C. to about 330° C. In an even further aspect, the extruder is typically operated at a temperature of about 220° C. to about 300° C.

In various aspects, the blended polycarbonate compositions of the present invention can be prepared by blending the polycarbonate, impact modifier, poly(alkylene ester), and filler components in mixer, e.g. a HENSCHEL-Mixer® high speed mixer or other suitable mixer/blender. Other low shear processes, including but not limited to hand mixing, can also accomplish this blending. The mixture can then be fed into the throat of a twin-screw extruder via a hopper. Alternatively, at least one of the components can be incorporated into the composition by feeding directly into the extruder at the throat and/or downstream through a side-stuffer. Additives can also be compounded into a masterbatch desired polymeric resin and fed into the extruder. The extruder generally operated at a temperature higher than that necessary to cause the composition to flow. The extrudate is immediately quenched in a water bath and pelletized. The pellets, so prepared, when cutting the extrudate can be one-fourth inch long or less as desired. Such pellets can be used for subsequent molding, shaping, or forming.

In one aspect, the invention pertains to methods of reducing splay of a blended polycarbonate composition comprising the step of combining: a) from about 30 wt % to about 85 wt % of a polycarbonate component; b) from about 1 wt % to about 10 wt % of a poly(alkylene ester) component; c) from about 10 wt % to about 30 wt % of an impact modifier component; and d) from about 5 wt % to about 25 wt % of a filler component; wherein all weight percent values are based on the total weight of the composition; and wherein the composition exhibits a splay less than that of that of a reference composition consisting essentially of substantially the same proportions of the same polycarbonate polymer composition, the same impact modifier component, and the same talc filler.

In one aspect, the invention pertains to methods of reducing splay of a blended polycarbonate composition comprising the step of combining: a) from about 30 wt % to about 85 wt % of a polycarbonate component; b) from about 1 wt % to about 10 wt % of a poly(alkylene terephthalate) component; c) from about 10 wt % to about 30 wt % of an impact modifier component; and d) from about 5 wt % to about 25 wt % of a filler component; wherein all weight percent values are based on the total weight of the composition; and wherein the composition exhibits a splay less than that of that of a reference composition consisting essentially of substantially the same proportions of the same polycarbonate polymer composition, the same impact modifier component, and the same talc filler.

In one aspect, the invention pertains to methods of reducing splay of a blended polycarbonate composition comprising the step of combining: a) from about 30 wt % to about 85 wt % of a polycarbonate component; b) from about 1 wt % to about 10 wt % of a polyethylene terephthalate component; c) from about 10 wt % to about 30 wt % of an impact modifier component; and d) from about 5 wt % to about 25 wt % of a filler component; wherein all weight percent values are based on the total weight of the composition; and wherein the composition exhibits a splay less than that of that of a reference composition consisting essentially of substantially the same proportions of the same polycarbonate polymer composition, the same impact modifier component, and the same talc filler.

Articles

In various aspects, the disclosed blended polycarbonate compositions with decreased splay of the present invention can be used in making articles. The disclosed blended polycarbonate compositions can be formed into useful shaped articles by a variety of means such as; injection molding, extrusion, rotational molding, compression molding, blow molding, sheet or film extrusion, profile extrusion, gas assist molding, structural foam molding and thermoforming. The blended polycarbonate compositions described herein resins can also be made into film and sheet as well as components of laminate systems. In a further aspect, in an embodiment, a method of manufacturing an article comprises melt blending the polycarbonate polymer composition, the impact modifier composition, and the SAN copolymer components; and molding the extruded composition into an article. In a still further aspect, the extruding is done with a twin-screw extruder.

Formed articles include, for example, computer and business machine housings, home appliances, trays, plates, handles, helmets, automotive parts such as instrument panels, cup holders, glove boxes, interior coverings and the like. In various further aspects, formed articles include, but are not limited to, food service items, medical devices, animal cages, electrical connectors, enclosures for electrical equipment, electric motor parts, power distribution equipment, communication equipment, computers and the like, including devices that have molded in snap fit connectors. In a further aspect, articles of the present invention comprise exterior body panels and parts for outdoor vehicles and devices including automobiles, protected graphics such as signs, outdoor enclosures such as telecommunication and electrical connection boxes, and construction applications such as roof sections, wall panels and glazing. Multilayer articles made of the disclosed polycarbonates particularly include articles which will be exposed to UV-light, whether natural or artificial, during their lifetimes, and most particularly outdoor articles; i.e., those intended for outdoor use. Suitable articles are exemplified by enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desk-top computer housings; portable computer housings; lap-top computer housings; palm-held computer housings; monitor housings; printer housings; keyboards; facsimile machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted articles; coated dyed articles; coated fluorescent articles; coated foam articles; and like applications.

In one aspect, the present invention pertains to articles comprising the disclosed blended polycarbonate compositions.

In a further aspect, the article comprising the disclosed blended polycarbonate compositions is used in automotive applications. In a yet further aspect, the article used in automotive applications is selected from instrument panels, overhead consoles, interior trim, center consoles, panels, quarter panels, rocker panels, trim, fenders, doors, deck lids, trunk lids, hoods, bonnets, roofs, bumpers, fascia, grilles, minor housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, and running boards. In an even further aspect, the article comprising the disclosed blended polycarbonate compositions is selected from mobile device exteriors, mobile device covers, enclosures for electrical and electronic assemblies, protective headgear, buffer edging for furniture and joinery panels, luggage and protective carrying cases, small kitchen appliances, and toys.

In one aspect, the present invention pertains to electrical or electronic devices comprising the disclosed blended polycarbonate compositions. In a further aspect, the electrical or electronic device comprising the disclosed blended polycarbonate compositions is a cellphone, a MP3 player, a computer, a laptop, a camera, a video recorder, an electronic tablet, a pager, a hand receiver, a video game, a calculator, a wireless car entry device, an automotive part, a filter housing, a luggage cart, an office chair, a kitchen appliance, an electrical housing, an electrical connector, a lighting fixture, a light emitting diode, an electrical part, or a telecommunications part.

In a further aspect, the article comprising the disclosed blended polycarbonate compositions is used in public transportation applications, including trains, subways and buses. In a yet further aspect, the article used in public transportation applications is selected from a primary seat structure, a seat shell, a seat back, a seat pan, a side wall, a front wall, an end-wall, a partition, a room divider, an interior door, a window insulation, a lining, a kitchen interior surface, a ceiling panel, an overhead or vertical luggage rack, a luggage container, a floor and wall composite, a luggage compartment, a window frame, an optionally folding table with downward facing surface, an airduct, an information display screen, an electrical and lighting component, an interior lining, a strip, a privacy divider, a head rest, a table tray, a center console, an arm rest, a leg rest, a food tray, an end bay, a shroud, a kick panel, a food well, a literature pocket, a monitor, a bezel, a line replaceable unit, or a foot bar.

In a further aspect, the article comprising the disclosed blended polycarbonate compositions is used in aircraft applications. In a yet further aspect, the article used in aircraft applications is selected from an access panel, an access door, an access door panel, an access door panel call button, a seat component, a seat housing, a seat back, a stow bin component, a magazine rack, a trolly cart, a component of a trolley cart, a light bezel, a door pull, a door handle, an arm rest, a foot rest, an air flow regulator, an air gasper, an air grille, a baggage storage door, a balcony component, a cabinet wall, a ceiling panel, a door pulls, a door handle, a duct housing, an enclosure for electronic devices, an equipment housing, an equipment panel, a floor panel, a food cart, a food tray, a galley surface, a grille, a handle, a housing for TVs and displays, a light panel, a magazine rack, a telephone housing, a partition, a railing component, a shelve, a side wall, a speaker housing, a storage compartment, a storage housing, a toilet seat, a tray table, a tray, a trim panel, a window molding, a window slide, a profile, a window frame, a window housing, an oxygen system cover, an oxygen system housing, a lighting rail, a grip rail, a passenger service unit component, a washing table, an in-flight entertainment housing, a display bezel, a crew communication device component, a literature pocket, a monitor cover, a kick panel, a tray table arm, a seat arm, a headrest, an air ducting component, a panel fixation, a cable bracket, a door handle, a hinge, or a connector.

In various aspects, the present invention pertains to and includes at least the following aspects.

Aspect 1: A blended polycarbonate composition with improved surface characteristics comprising: (a) from about 65 wt % to about 94 wt % of a polycarbonate component comprising a polycarbonate polymer, a poly(carbonate-siloxane) copolymer, or a combination thereof; (b) from about 1 wt % to about 20 wt % of a splay-reducing component; and (c) from about 5 wt % to about 25 wt % of a filler component; wherein all weight percent values are based on the total weight of the composition; and wherein the composition exhibits a splay less than that of that of a reference composition consisting essentially of substantially the same proportions of the same polycarbonate component and the same filler component.

Aspect 2: The composition of Aspect 1, wherein the composition exhibits a splay at least about 30% less than the reference composition.

Aspect 3: The composition of Aspect 1, wherein the composition exhibits a splay at least about 50% less than the reference composition.

Aspect 4: The composition of any of Aspects 1-3, wherein the composition further exhibits an Izod notched impact strength of at least about 6.0 kJ/m$^2$ determined in accordance with ISO 180.

Aspect 5: The composition of any of Aspects 1-3, wherein the composition further exhibits an Izod notched impact strength of at least about 7.0 kJ/m² determined in accordance with ISO 180.

Aspect 6: The composition of any of Aspects 1-5, wherein the polycarbonate component comprises Bisphenol A residues.

Aspect 7: The composition of any of Aspects 1-6, wherein the polycarbonate component has a weight average molecular weight of from about 20,000 g/mol to about 50,000 g/mol on an absolute polycarbonate molecular weight scale.

Aspect 8: The composition of any of Aspects 1-7, wherein the polycarbonate component is present in an amount from about 40 wt % to about 65 wt %.

Aspect 9: The composition of any of Aspects 1-5, the polycarbonate component comprises a first polycarbonate component and a second polycarbonate component.

Aspect 10: The composition of Aspect 9, wherein the first polycarbonate component comprises Bisphenol A residues.

Aspect 11: The composition of Aspect 9, wherein the second polycarbonate component comprises Bisphenol A residues.

Aspect 12: The composition of any of Aspects 9-11, wherein the first polycarbonate component has a weight average molecular weight of from about 20,000 g/mol to about 30,500 g/mol on an absolute polycarbonate molecular weight scale.

Aspect 13: The composition of any of Aspects 9-11, wherein the second polycarbonate component has a weight average molecular weight of from about 15,000 g/mol to about 25,000 g/mol on an absolute polycarbonate molecular weight scale.

Aspect 14: The composition of any of Aspects 9-13, wherein the first polycarbonate component is present in an amount from about 20 wt % to about 40 wt %.

Aspect 15: The composition of any of Aspects 9-13, wherein the second polycarbonate component is present in an amount from about 20 wt % to about 40 wt %.

Aspect 16: The composition of any of Aspects 9-15, wherein the first polycarbonate component is a low flow polycarbonate and wherein the second polycarbonate component is high flow polycarbonate.

Aspect 17: The composition of Aspect 16, wherein the first polycarbonate component has a melt volume flow rate ("MVR") of about 5.0 to about 7.2 g/10 min when determined at 300° C. under a load of 1.2 kg in accordance with ASTM D1238.

Aspect 18: The composition of Aspect 16, wherein the second polycarbonate component has a melt volume flow rate ("MVR") of about 22.0 to about 30.0 g/10 min when determined at 300° C. under a load of 1.2 kg in accordance with ASTM D1238.

Aspect 19: The composition of any of Aspects 1-18, wherein the poly(alkylene terephthalate) comprises one or more of PET, PBT, and PETG.

Aspect 20: The composition of any of Aspects 1-18, wherein the poly(alkylene terephthalate) comprises PET.

Aspect 21: The composition of any of Aspects 1-20, wherein the poly(alkylene terephthalate) component is present in an amount from about 2 wt % to about 8 wt %.

Aspect 22: The composition of any of Aspects 1-21, wherein the poly(alkylene terephthalate) component has an intrinsic viscosity of greater than or equal to about 0.80 when determined in accordance with ASTM D4603.

Aspect 23: The composition of any of Aspects 1-22, wherein the impact modifier component comprises one or more of an acrylonitrile butadiene styrene ("ABS") copolymer, a methacrylate butadiene styrene ("MBS") copolymer, and a bulk polymerized ABS ("BABS") copolymer.

Aspect 24: The composition of Aspect 23, wherein the impact modifier component is a bulk polymerized ABS copolymer.

Aspect 25: The composition of Aspect 24, wherein the bulk polymerized ABS copolymer is present in an amount from about 10 wt % to about 25 wt %.

Aspect 26: The composition of Aspect 24, wherein the bulk polymerized ABS copolymer has a butadiene content of from about 13 wt % to about 18 wt %.

Aspect 27: The composition of any of Aspects 23-26, wherein the impact modifier component is a methacrylate butadiene styrene copolymer.

Aspect 28: The composition of any of Aspects 23-26, wherein the impact modifier component is an acrylonitrile butadiene styrene copolymer.

Aspect 29: The composition of any of Aspects 1-28, wherein the impact modifier component is present in an amount from about 10 wt %/o to about 25 wt %/o.

Aspect 30: The composition of any of Aspects 1-29, wherein the filler component is a mineral powder.

Aspect 31: The composition of any of Aspects 1-30, wherein the filler component has a particle size from about 0.1 μm to about 3.0 μm.

Aspect 32: The composition of any of Aspects 1-31, wherein the filler component is one or more of talc, kaolin, mica, and clay.

Aspect 33: The composition of Aspect 1 or 32, wherein the filler component is talc.

Aspect 34: The composition of Aspect 33, wherein the talc is micronized.

Aspect 35: The composition of Aspect 33 or 34, wherein the talc has an average particle size of about 0.2 to about 2 μm.

Aspect 36: The composition of any of Aspects 33-35, wherein the talc has been surface treated.

Aspect 37: The composition of Aspect 36, wherein the composition further exhibits an Izod notched impact strength of at least about 15 kJ/m2 determined in accordance with ISO 180.

Aspect 38: The composition of Aspect 36, wherein the composition further exhibits an Izod notched impact strength of at least about 20 kJ/m2 determined in accordance with ISO 180.

Aspect 39: The composition of Aspect 36, wherein the composition further exhibits an Izod notched impact strength of at least about 25 kJ/m2 determined in accordance with ISO 180.

Aspect 40: The composition of any of Aspects 33-39, wherein the talc has been treated with a composition comprising at least one silane compound.

Aspect 41: The composition of any of Aspects 33-40, wherein the talc has been treated with a composition comprising at least one organosilane compound.

Aspect 42: The composition of any of Aspects 33-41, wherein the talc has been treated with a composition comprising at least one surface active agent.

Aspect 43: The composition of Aspect 40, wherein the talc has been treated with a composition comprising at least one silane compound comprising a halosilane or an alkoxysilane.

Aspect 44: The composition of Aspect 40 or 43, wherein the talc has been treated with a composition comprising at least one silane compound comprising chlorosilane, tridecafluoro-1,1,2,2-tetrahydrooctyl-1-dimethylsilane, monomethylsilanetriol dihydroxyprolenate, or mono-methylsilanetriol ascorbate.

Aspect 45: The composition of any of Aspects 33-44, wherein the talc has been treated with a composition comprising at a compound of the formula:

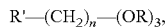

wherein R' is a radical selected from alkyl, aryl, vinyl, amino, mercapto, acetoxy, epoxy, and methacryloxy; and R is a C1-C4 radical; and n is integer from 3 to 6.

Aspect 46: The composition of any of Aspects 33-45, wherein the talc has been treated with a composition comprising at least one compound used to prepare Imerys surface-treated Luzenac R7.

Aspect 47: The composition of any of Aspects 1-46, further comprising an additive comprising coupling agents, antioxidants, mold release agents, UV absorbers, light stabilizers, heat stabilizers, lubricants, plasticizers, pigments, dyes, colorants, anti-static agents, nucleating agents, anti-drip agents, acid scavengers, quenchers, or combinations of two or more of the foregoing.

Aspect 48: The composition of any of Aspects 1-46, further comprising at least one polymer additive comprising a flame retardant, a colorant, a primary anti-oxidant, or a secondary anti-oxidant.

Aspect 49: The composition of Aspect 47 or 48, wherein the flame retardant comprises a chlorine-containing hydrocarbon, a bromine-containing hydrocarbon, boron compound, a metal oxide, antimony oxide, aluminum hydroxide, a molybdenum compound, zinc oxide, magnesium oxide, an organic phosphate, phosphinate, phosphite, phosphonate, phosphene, halogenated phosphorus compound, inorganic phosphorus containing salt, or a nitrogen-containing compound, or combinations thereof.

Aspect 50: The composition of any of Aspects 47 or 48, wherein the flame retardant is a phosphorus-containing flame retardant.

Aspect 51: The composition of Aspect 49 or 50, wherein the phosphorus-containing flame retardant comprises bisphenol A bis(diphenyl phosphate), hydroquinone bis(diphenyl phosphate), triphenyl phosphate, resorcinol bis(diphenyl phosphate), tricresyl phosphate, a phenol/bi-phenol polyphosphate, a phosphazene, phosphorus ester amide, phosphoric acid amide, phosphonic acid amide, phosphinic acid amide, tris(aziridinyl) phosphine oxide, or combinations thereof.

Aspect 52: The composition of any of Aspects 47-51, wherein the primary anti-oxidant comprises a hindered phenol or secondary aryl amine, or combinations thereof.

Aspect 53: The composition of Aspect 52, wherein the hindered phenol comprises triethylene glycol bis[3-(3-t-butyl-5-methyl-4-hydroxyphenyl)propionate], 1,6-hexanediol bis[3-(3,5-di-t-butyl-4-hydroxyphenyl)propionate], 2,4-bis(n-octylthio)-6-(4-hydroxy-3,5-di-t-butylanilino)-1,3,5-triazine, pentaerythrityl tetrakis[3-(3,5-di-t-butyl-4-hydroxyphenyl)propionate], 2,2-thiodiethylene bis[3-(3,5-di-t-butyl-4-hydroxyphenyl)propionate], octadecyl 3-(3,5-di-t-butyl-4-hydroxyphenyl)propionate, N,N'-hexamethylene bis(3,5-di-t-butyl-4-hydroxyhydrocinnamamide), tetrakis(methylene 3,5-di-tert-butylhydroxycinnamate)methane, or octadecyl 3,5-di-tert-butylhydroxyhydrocinnamate, or combinations thereof.

Aspect 54: The composition of Aspect 52 or 53, wherein the hindered phenol comprises octadecyl-3-(3,5-di-t-butyl-4-hydroxyphenyl)-propionate.

Aspect 55: The composition of any of Aspects 52-54, wherein the hindered phenol is present in an amount from about 0.01 wt %/o to about 0.50 wt %/o.

Aspect 56: The composition of any of Aspects 52-54, wherein the hindered phenol is present in an amount from about 0.01 wt %/o to about 0.20 wt %/o.

Aspect 57: The composition of any of Aspects 47-56, wherein the secondary anti-oxidant comprises an organophosphate or thioester, or a combination thereof.

Aspect 58: The composition of Aspect 57, wherein the secondary anti-oxidant comprises tetrakis(2,4-di-tert-butylphenyl) [1,1-biphenyl]-4,4'-diylbisphosphonite, tris(2,4-di-tert-butylphenyl)phosphite, bis(2,4-di-tert-butylphenyl)pentaerythritol diphosphite, bis(2,4-dicumylphenyl) pentaerythritoldiphosphite, tris(nonyl phenyl)phosphite, or distearyl pentaerythritol diphosphite, or combinations thereof.

Aspect 59: The composition of Aspect 57 or 58, wherein the secondary anti-oxidant comprises tris(2,4-di-tert-butylphenyl)phosphite.

Aspect 60: The composition of any of Aspects 57-59, wherein the secondary anti-oxidant is present in an amount from about 0.01 wt %/o to about 0.50 wt %/o.

Aspect 61: The composition of any of Aspects 57-59, wherein the secondary anti-oxidant is present in an amount from about 0.01 wt %/o to about 0.20 wt %/o.

Aspect 62: The composition of any of Aspects 1-61, further comprising an anti-drip agent.

Aspect 63: The composition of Aspect 62, wherein the anti-drip agent is styrene-acrylonitrile copolymer encapsulated PTFE (TSAN).

Aspect 64: The composition of Aspect 62 or 63, wherein the anti-drip agent is present in an amount from about 0.1 wt % to about 5 wt %.

Aspect 65: The composition of Aspect 62 or 63, wherein the anti-drip agent is present in an amount from about 0.1 wt % to about 1 wt %.

Aspect 66: An article comprising the composition of any of Aspects 1-65.

Aspect 67: The article of Aspect 66, wherein the article is injection molded.

Aspect 68: The article of Aspect 66, wherein the article is extrusion molded.

Aspect 69: The article of any of Aspects 66-68, wherein the article is used in aeronautical applications.

Aspect 70: The article of any of Aspects 66-68, wherein the article is used in train, subway, tram, or streetcar applications.

Aspect 71: The article of any of Aspects 66-68, wherein the article is used in maritime applications.

Aspect 72: The article of any of Aspects 66-68, wherein the article is used in automotive applications.

Aspect 73: The article of Aspect 72, wherein the article comprises instrument panels, overhead consoles, interior trim, center consoles, panels, quarter panels, rocker panels, trim, fenders, doors, deck lids, trunk lids, hoods, bonnets, roofs, bumpers, fascia, grilles, minor housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, or running boards.

Aspect 74: The article of any of Aspects 66-68, wherein the article comprises mobile device exteriors, mobile device covers, enclosures for electrical and electronic assemblies, protective headgear, buffer edging for furniture and joinery panels, luggage and protective carrying cases, small kitchen appliances, or toys.

Aspect 75: An electrical or electronic device comprising the composition of any of Aspects 1-65.

Aspect 76: The electrical or electronic device of Aspect 75, wherein the electrical or electronic device is a cellphone, a MP3 player, a computer, a laptop, a camera, a video recorder, an electronic tablet, a pager, a hand receiver, a video game, a calculator, a wireless car entry device, an automotive part, a filter housing, a luggage cart, an office chair, a kitchen appliance, an electrical housing, an electrical connector, a lighting fixture, a light emitting diode, an electrical part, or a telecommunications part.

Aspect 77: A transportation component or device comprising the composition of any of Aspects 1-65.

Aspect 78: The transportation component or device of Aspect 77, wherein the transportation component or device is an airplane component or device.

Aspect 79: The transportation component or device of Aspect 77, wherein the transportation component or device is an automotive, bus, or truck component or device.

Aspect 80: The transportation component or device of Aspect 79, wherein the automotive or truck component or device comprises instrument panels, overhead consoles, interior trim, center consoles, panels, quarter panels, rocker panels, trim, fenders, doors, deck lids, trunk lids, hoods, bonnets, roofs, bumpers, fascia, grilles, minor housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, or running boards.

Aspect 81: The transportation component or device of Aspect 77, wherein the transportation component or device is a train, subway, tram, or streetcar component or device.

Aspect 82: The transportation component or device of Aspect 77, wherein the transportation component or device is a ship component or device.

Aspect 83: A blended polycarbonate composition with improved surface characteristics comprising: a) from about 65 wt % to about 94 wt % of a component selected from a polycarbonate, a poly(carbonate-siloxane) copolymer, or a combination thereof; b) from about 1 wt % to about 10 wt % of a splay-reducing component; and c) from about 5 wt % to about 25 wt % of a filler component; wherein all weight percent values are based on the total weight of the composition; and wherein the composition exhibits a splay less than that of that of a reference composition consisting essentially of substantially the same proportions of the same polycarbonate component, the same impact modifier component, and the same filler component.

Aspect 84: The composition of Aspect 83, wherein the composition exhibits a splay at least about 30% less than the reference composition.

Aspect 85: The composition of Aspect 83, wherein the composition exhibits a splay at least about 50% less than the reference composition.

Aspect 86: The composition of any of Aspects 83-85, wherein the composition further exhibits an Izod notched impact strength of at least about 6.0 kJ/m$^2$ determined in accordance with ISO 180.

Aspect 87: The composition of any of Aspects 83-85, wherein the composition further exhibits an Izod notched impact strength of at least about 7.0 kJ/m$^2$ determined in accordance with ISO 180.

Aspect 88: The composition of any of Aspects 83-87, wherein the polycarbonate component comprises Bisphenol A residues.

Aspect 89: The composition of any of Aspects 83-88, wherein the polycarbonate component has a weight average molecular weight of from about 20,000 g/mol to about 50,000 g/mol on an absolute polycarbonate molecular weight scale.

Aspect 90: The composition of any of Aspects 83-89, wherein the polycarbonate component is present in an amount from about 40 wt %/o to about 65 wt %/o.

Aspect 91: The composition of any of Aspects 83-89, the polycarbonate component comprises a first polycarbonate component and a second polycarbonate component.

Aspect 92: The composition of Aspect 91, wherein the first polycarbonate component comprises Bisphenol A residues.

Aspect 93: The composition of Aspect 91, wherein the second polycarbonate component comprises Bisphenol A residues.

Aspect 94: The composition of any of Aspects 91-93, wherein the first polycarbonate component has a weight average molecular weight of from about 20,000 g/mol to about 30,500 g/mol on an absolute polycarbonate molecular weight scale.

Aspect 95: The composition of any of Aspects 91-93, wherein the second polycarbonate component has a weight average molecular weight of from about 15,000 g/mol to about 25,000 g/mol on an absolute polycarbonate molecular weight scale.

Aspect 96: The composition of any of Aspects 91-95, wherein the first polycarbonate component is present in an amount from about 20 wt % to about 40 wt %.

Aspect 97: The composition of any of Aspects 91-95, wherein the second polycarbonate component is present in an amount from about 20 wt % to about 40 wt %.

Aspect 98: The composition of any of Aspects 91-97, wherein the first polycarbonate component is a low flow polycarbonate and wherein the second polycarbonate component is high flow polycarbonate.

Aspect 99: The composition of Aspect 98, wherein the first polycarbonate component has a melt volume flow rate ("MVR") of about 5.0 to about 7.2 g/10 min when determined at 300° C. under a load of 1.2 kg in accordance with ASTM D1238.

Aspect 100: The composition of Aspect 98, wherein the second polycarbonate component has a melt volume flow rate ("MVR") of about 22.0 to about 30.0 g/10 min when determined at 300° C. under a load of 1.2 kg in accordance with ASTM D1238.

Aspect 101: The composition of Aspect 83, wherein the splay-reducing component comprises a polyester or an (isophthalic acid-terephthalic acid-resorcinol)-bisphenol A copolyestercarbonate copolymer (ITR—PC), or a mixture thereof.

Aspect 102 The composition of Aspects 83 or 101, wherein the splay-reducing component is an (isophthalic acid-terephthalic acid-resorcinol)-bisphenol A copolyestercarbonate copolymer (ITR-PC), Aspect 103: The composition of Aspects 102, wherein the (isophthalic acid-terephthalic acid-resorcinol)-bisphenol A copolyestercarbonate copolymer (ITR-PC) is present in an amount of 2 to 8 wt %.

Aspect 104: The composition of Aspects 83 or 101, wherein the splay-reducing component is a polyester.

Aspect 105: The composition of Aspects 83, 101, or 104, wherein the splay-reducing component is a poly(alkylene terephthalate).

Aspect 106: The composition of Aspect 103, wherein the poly(alkylene terephthalate) comprises PET or PBT, or a combination thereof.

Aspect 107: The composition of Aspects 103 or 104, wherein the poly(alkylene terephthalate) comprises PET.

Aspect 108: The composition of any of Aspects 101 or 104-107, wherein the poly(alkylene terephthalate) component is present in an amount from about 2 wt % to about 8 wt %.

Aspect 109: The composition of any of Aspects 101 or 104-107, wherein the poly(alkylene terephthalate) component has an intrinsic viscosity of greater than or equal to about 0.80 when determined in accordance with ASTM D4603.

Aspect 110: The composition of Aspect 83, further comprising an impact modifier component.

Aspect 111: The composition of Aspect 110, wherein the impact modifier component comprises one more of an acrylonitrile butadiene styrene ("ABS") copolymer, a methacrylate butadiene styrene ("MBS") copolymer, a bulk polymerized ABS ("BABS") copolymer or a silicon graft copolymer.

Aspect 112: The composition of Aspect 111, wherein the impact modifier component is a bulk polymerized ABS copolymer.

Aspect 113: The composition of Aspect 112, wherein the bulk polymerized ABS copolymer is present in an amount from about 10 wt % to about 25 wt %.

Aspect 114: The composition of Aspect 113, wherein the bulk polymerized ABS copolymer has a butadiene content of from about 13 wt % to about 18 wt %.

Aspect 115: The composition of any of Aspects 110-114, wherein the impact modifier component is a methacrylate butadiene styrene copolymer.

Aspect 116: The composition of any of Aspects 110-114, wherein the impact modifier component is an acrylonitrile butadiene styrene copolymer.

Aspect 116.1: The composition of Aspect 111, wherein the impact modifier component is a silicon graft copolymer.

Aspect 117: The composition of any of Aspects 110-116.1, wherein the impact modifier component is present in an amount from about 10 wt % to about 25 wt %.

Aspect 118: The composition of any of Aspects 83-117, wherein the filler component is a mineral powder.

Aspect 119: The composition of any of Aspects 83-118, wherein the filler component has a particle size from about 0.1 μm to about 3.0 μm.

Aspect 120: The composition of any of Aspects 83-119, wherein the filler component is one or more of talc, kaolin, mica, and clay.

Aspect 121: The composition of Aspect 83 or 120, wherein the filler component is talc.

Aspect 122: The composition of Aspect 121, wherein the talc is micronized.

Aspect 123: The composition of Aspect 121 or 122, wherein the talc has an average particle size of about 0.2 to about 2 μm.

Aspect 124: The composition of any of Aspects 121-123, wherein the talc has been surface treated.

Aspect 125: The composition of Aspect 124, wherein the composition further exhibits an Izod notched impact strength of at least about 15 kJ/m2 determined in accordance with ISO 180.

Aspect 126: The composition of Aspect 124, wherein the composition further exhibits an Izod notched impact strength of at least about 20 kJ/m2 determined in accordance with ISO 180.

Aspect 127: The composition of Aspect 124, wherein the composition further exhibits an Izod notched impact strength of at least about 25 kJ/m2 determined in accordance with ISO 180.

Aspect 128: The composition of any of Aspects 121-127, wherein the talc has been treated with a composition comprising at least one silane compound.

Aspect 129: The composition of any of Aspects 121-128, wherein the talc has been treated with a composition comprising at least one organosilane compound.

Aspect 130: The composition of any of Aspects 121-129, wherein the talc has been treated with a composition comprising at least one surface active agent.

Aspect 131: The composition of Aspect 128, wherein the talc has been treated with a composition comprising at least one silane compound comprising a halosilane or an alkoxysilane, or a combination thereof.

Aspect 132: The composition of Aspect 128 or 131, wherein the talc has been treated with a composition comprising at least one silane compound comprising chlorosilane, tridecafluoro-1,1,2,2-tetrahydrooctyl-1-dimethylsilane, monomethylsilanetriol dihydroxyprolenate, or monomethylsilanetriol ascorbate, or combinations thereof.

Aspect 133: The composition of any of Aspects 121-132, wherein the talc has been treated with a composition comprising at a compound of the formula:

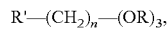

wherein R' is a radical selected from alkyl, aryl, vinyl, amino, mercapto, acetoxy, epoxy, and methacryloxy; and R is a C1-C4 radical; and n is integer from 3 to 6.

Aspect 134: The composition of any of Aspects 121-133, wherein the talc has been treated with a composition comprising at least one compound used to prepare Imerys surface-treated Luzenac R7.

Aspect 135: The composition of any of Aspects 83-134, further comprising an additive comprising coupling agents, antioxidants, mold release agents, UV absorbers, light stabilizers, heat stabilizers, lubricants, plasticizers, pigments, dyes, colorants, anti-static agents, nucleating agents, anti-drip agents, acid scavengers, or quenchers, or combinations of two or more of the foregoing.

Aspect 136: The composition of any of Aspects 83-134, further comprising at least one polymer additive comprising a flame retardant, a colorant, a primary anti-oxidant, or a secondary anti-oxidant, or combinations thereof.

Aspect 137: The composition of Aspect 135 or 136, wherein the flame retardant comprises a chlorine-containing hydrocarbon, a bromine-containing hydrocarbon, boron compound, a metal oxide, antimony oxide, aluminum hydroxide, a molybdenum compound, zinc oxide, magnesium oxide, an organic phosphate, phospinate, phosphite, phosphonate, phosphene, halogenated phosphorus compound, inorganic phosphorus containing salt, or a nitrogen-containing compound, or a combination comprising at least one of the foregoing.

Aspect 138: The composition of Aspect 135 or 136, wherein the flame retardant is a phosphorus-containing flame retardant.

Aspect 139: The composition of Aspect 137 or 138, wherein the phosphorus-containing flame retardant comprises bisphenol A bis(diphenyl phosphate), hydroquinone bis(diphenyl phosphate), triphenyl phosphate, resorcinol bis(diphenyl phosphate), tricresyl phosphate, a phenol/bi-phenol polyphosphate, a phosphazene, phosphorus ester amide, phosphoric acid amide, phosphonic acid amide, phosphinic acid amide, tris(aziridinyl)phosphine oxide or mixtures thereof.

Aspect 140: The composition of any of Aspects 136-139, wherein the primary anti-oxidant comprises a hindered phenol or a secondary aryl amine, or a combination thereof.

Aspect 141: The composition of Aspect 140, wherein the hindered phenol comprises triethylene glycol bis[3-(3-t-butyl-5-methyl-4-hydroxyphenyl)propionate], 1,6-hexanediol bis[3-(3,5-di-t-butyl-4-hydroxyphenyl)propionate], 2,4-bis(n-octylthio)-6-(4-hydroxy-3,5-di-t-butylanilino)-1,3,5-triazine, pentaerythrityl tetrakis[3-(3,5-di-t-butyl-4-hydroxyphenyl)propionate], 2,2-thiodiethylene bis[3-(3,5-di-t-butyl-4-hydroxyphenyl)propionate], octadecyl 3-(3,5-di-t-butyl-4-hydroxyphenyl)propionate, N,N'-hexamethylene bis(3,5-di-t-butyl-4-hydroxy-hydrocinnamamide), tetrakis(methylene 3,5-di-tert-butyl-hydroxycinnamate)methane, or octadecyl 3,5-di-tert-butylhydroxyhydrocinnamate, or combinations thereof.

Aspect 142: The composition of Aspect 140 or 141, wherein the hindered phenol comprises octadecyl-3-(3,5-di-t-butyl-4-hydroxyphenyl)-propionate.

Aspect 143: The composition of any of Aspects 140-142, wherein the hindered phenol is present in an amount from about 0.01 wt % to about 0.50 wt %.

Aspect 144: The composition of any of Aspects 140-142, wherein the hindered phenol is present in an amount from about 0.01 wt % to about 0.20 wt %.

Aspect 145: The composition of any of Aspects 136-144, wherein the secondary anti-oxidant comprises an organophosphate or a thioester, or a combination thereof.

Aspect 146: The composition of Aspect 145, wherein the secondary anti-oxidant comprises tetrakis(2,4-di-tert-butylphenyl) [1,1-biphenyl]-4,4'-diylbisphosphonite, tris(2,4-di-tert-butylphenyl)phosphite, bis(2,4-di-tert-butylphenyl)pentaerythritol diphosphite, bis(2,4-dicumylphenyl) pentaerytritoldiphosphite, tris(nonyl phenyl)phosphite, or distearyl pentaerythritol diphosphate, or combinations thereof.

Aspect 147: The composition of Aspect 145 or 146, wherein the secondary anti-oxidant comprises tris(2,4-di-tert-butylphenyl)phosphite.

Aspect 148: The composition of any of Aspects 145-147, wherein the secondary anti-oxidant is present in an amount from about 0.01 wt %/o to about 0.50 wt %/o.

Aspect 149: The composition of any of Aspects 145-147, wherein the secondary anti-oxidant is present in an amount from about 0.01 wt % to about 0.20 wt %.

Aspect 150: The composition of any of Aspects 83-149, further comprising an anti-drip agent.

Aspect 151: The composition of Aspect 150, wherein the anti-drip agent is styrene-acrylonitrile copolymer encapsulated PTFE (TSAN).

Aspect 152: The composition of Aspect 150 or 151, wherein the anti-drip agent is present in an amount from about 0.1 wt % to about 5 wt %.

Aspect 153: The composition of Aspect 150 or 149, wherein the anti-drip agent is present in an amount from about 0.1 wt % to about 1 wt %.

Aspect 154: An article comprising the composition of any of Aspects 83-153.

Aspect 155: The article of Aspect 154, wherein the article is injection molded.

Aspect 156: The article of Aspect 154, wherein the article is extrusion molded.

Aspect 157: The article of any of Aspects 154-156, wherein the article is used in aeronautical applications.

Aspect 158: The article of any of Aspects 154-156, wherein the article is used in train, subway, tram, or streetcar applications.

Aspect 159: The article of any of Aspects 154-156, wherein the article is used in maritime applications.

Aspect 160: The article of any of Aspects 154-156, wherein the article is used in automotive applications.

Aspect 161: The article of Aspect 160, wherein the article used in automotive applications comprises instrument panels, overhead consoles, interior trim, center consoles, panels, quarter panels, rocker panels, trim, fenders, doors, deck lids, trunk lids, hoods, bonnets, roofs, bumpers, fascia, grilles, minor housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, or running boards.

Aspect 162: The article of any of Aspects 154-156, wherein the article comprises mobile device exteriors, mobile device covers, enclosures for electrical and electronic assemblies, protective headgear, buffer edging for furniture and joinery panels, luggage and protective carrying cases, small kitchen appliances, or toys.

Aspect 163: An electrical or electronic device comprising the composition of any of Aspects 83-153.

Aspect 164: The electrical or electronic device of Aspect 163, wherein the electrical or electronic device is a cellphone, a MP3 player, a computer, a laptop, a camera, a video recorder, an electronic tablet, a pager, a hand receiver, a video game, a calculator, a wireless car entry device, an automotive part, a filter housing, a luggage cart, an office chair, a kitchen appliance, an electrical housing, an electrical connector, a lighting fixture, a light emitting diode, an electrical part, or a telecommunications part.

Aspect 165: A transportation component or device comprising the composition of any of Aspects 83-153.

Aspect 166: The transportation component or device of Aspect 165, wherein the transportation component or device is an airplane component or device.

Aspect 167: The transportation component or device of Aspect 165, wherein the transportation component or device is an automotive, bus, or truck component or device.

Aspect 168: The transportation component or device of Aspect 167, wherein the automotive, bus, or truck component or device comprises instrument panels, overhead consoles, interior trim, center consoles, panels, quarter panels, rocker panels, trim, fenders, doors, deck lids, trunk lids, hoods, bonnets, roofs, bumpers, fascia, grilles, minor housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, or running boards.

Aspect 169: The transportation component or device of Aspect 165, wherein the transportation component or device is a train, subway, tram, or streetcar component or device.

Aspect 170: The transportation component or device of Aspect 165, wherein the transportation component or device is a ship component or device.

Aspect 171: A blended polycarbonate composition with improved surface characteristics comprising: (a) from about 65 wt % to about 94 wt % of a polycarbonate component comprising a polycarbonate polymer, a poly(carbonate-siloxane) copolymer, or a combination thereof; (b) from about 1 wt % to about 20 wt % of a splay-reducing component; and (c) from about 5 wt % to about 25 wt % of a filler component; wherein all weight percent values are based on the total weight of the composition; and wherein the composition exhibits a splay less than that of that of a reference composition consisting essentially of substantially the same proportions of the same polycarbonate component and the same filler component.

Aspect 172: The composition of Aspect 171, wherein the composition exhibits a splay at least about 30% less than the reference composition.

Aspect 173: The composition of Aspects 171 or 172, wherein splay is determined by scanning a molded article using a flat-bed high definition scanner and each pixel is assigned a black/white value (or L-value); and wherein the splay value for the article is the standard deviation for the L-values calculated for the ensemble data set of L-values.

Aspect 174: The composition of any of Aspects 171-173, wherein the composition further exhibits an Izod notched impact strength of at least about 6.0 kJ/m² determined in accordance with ISO 180.

Aspect 175: The composition of any of Aspects 171-174, wherein the polycarbonate polymer comprises a linear polycarbonate homopolymer comprising repeating units of the formula:

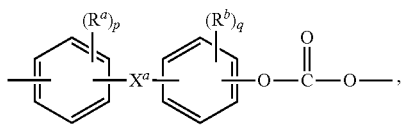

wherein each occurrence of $R^a$ and $R^b$ is independently a C1-12 alkyl group, C1-12 alkenyl, C3-8 cycloalkyl, or C1-12 alkoxy; wherein p and q are each independently integers of 0 to 4; and wherein $X^a$ is a single bond, —O—, —S—, —S(O)—, —S(O)$_2$—, —C(O)—, a C1-11 alkylidene of formula —C($R^c$)($R^d$)—; wherein $R^c$ and $R^d$ are each independently hydrogen or C1-10 alkyl, or a group of the formula —C(=$R^e$)—; and wherein $R^e$ is a divalent C1-10 hydrocarbon group.

Aspect 176: The composition of Aspect 175, wherein the linear polycarbonate homopolymer comprises bisphenol A carbonate units.

Aspect 177: The composition of Aspect 175 or 176, wherein the linear polycarbonate homopolymer is made via an interfacial polymerization process.

Aspect 178: The composition of Aspect 175 or 176, wherein the linear polycarbonate homopolymer is made via a melt polymerization process.

Aspect 179: The composition of any of Aspects 171-178, wherein the poly(carbonate-siloxane) copolymer comprises first repeating units and second repeating units; wherein the first repeating units are bisphenol carbonate units of the formula:

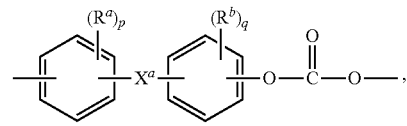

wherein each occurrence of $R^a$ and $R^b$ is independently a C1-12 alkyl group, C1-12 alkenyl, C3-8 cycloalkyl, or C1-12 alkoxy; wherein p and q are each independently integers of 0 to 4; and wherein $X^a$ is a single bond, —O—, —S—, —S(O)—, —S(O)$_2$—, —C(O)—, a C1-11 alkylidene of formula —C($R^c$)($R^d$)—; wherein $R^c$ and $R^d$ are each independently hydrogen or C1-10 alkyl, or a group of the formula —C(=$R^e$)—; wherein $R^e$ is a divalent C1-10 hydrocarbon group; and wherein the second repeating units are siloxane units of the formula:

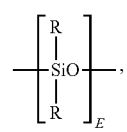

wherein each occurrence of R is independently a C1-13 monovalent hydrocarbon group; and wherein E has an average value of 2 to 200.

Aspect 180: The composition of Aspect 179, wherein the siloxane units are a combination of one or more units of the formula:

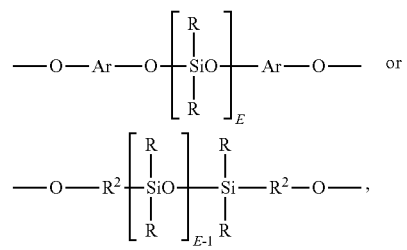

wherein each occurrence of R is independently a C1-C13 monovalent hydrocarbon group; wherein each occurrence of Ar is independently a C6-C30 aromatic group; wherein each occurrence of $R^2$ is independently a C2-C8 alkylene group; and wherein E has an average value of 2 to 200.

Aspect 181: The composition of Aspect 179, wherein the siloxane units are a combination of one or more units of the formula:

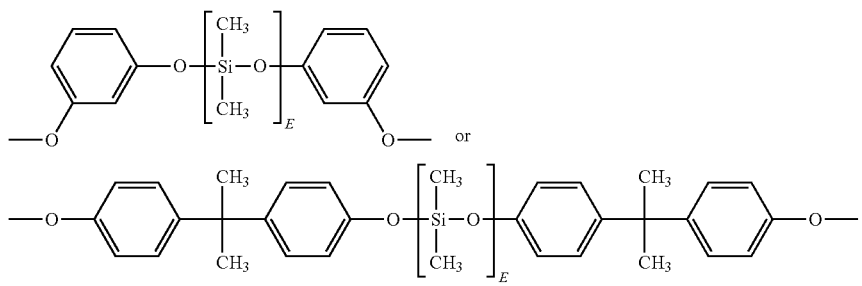

wherein E has an average value of 2 to 200.

Aspect 182: The composition of Aspect 179, wherein the siloxane units are a the formula:

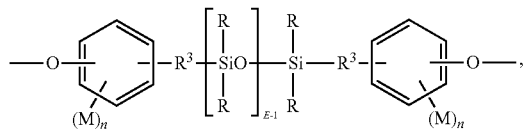

wherein each occurrence of R is independently a C1-C13 monovalent hydrocarbon group; wherein each occurrence of $R^3$ is independently a divalent C1-C8 aliphatic group; wherein each occurrence of M is independently a halogen, cyano, nitro, C1-8 alkylthio, C1-8 alkyl, C1-8 alkoxy, C2-8 alkenyl, C2-8 alkenyloxy group, C3-8 cycloalkyl, C3-8 cycloalkoxy, C6-10 aryl, C6-10 aryloxy, C7-12 arylalkyl, C7-12 arylalkoxy, C7-12 alkylaryl, or C7-12 alkylaryloxy, or a combination comprising at least one of the foregoing; wherein each occurrence of n is independently 0, 1, 2, 3, or 4; and wherein E has an average value of 2 to 200.

Aspect 183: The composition of Aspect 179, wherein the siloxane units are a combination of one or more units of the formula:

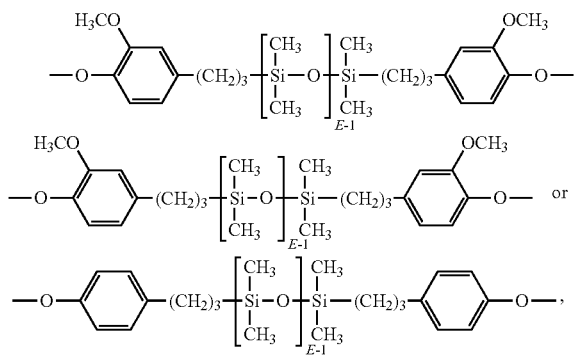

wherein E has an average value of 2 to 200.

Aspect 184: The composition of Aspect 183, wherein E has an average value of 5 to 120.

Aspect 185: The composition of any of Aspects 179-184, wherein the splay-reducing component is present in an amount from about 1 wt % to about 10 wt %.

Aspect 186: The composition of any of Aspects 179-185, wherein the splay-reducing component comprises a polyester polymer, an (isophthalic acid-terephthalic acid-resorcinol)-bisphenol A copolyestercarbonate copolymer, or combinations thereof.

Aspect 187: The composition of any of Aspects 179-186, wherein the splay-reducing component is not fully miscible with the polycarbonate component.

Aspect 188: The composition of any of Aspects 179-187, wherein the splay-reducing component is an (isophthalic acid-terephthalic acid-resorcinol)-bisphenol A copolyestercarbonate copolymer.

Aspect 189: The composition of any of Aspects 179-187, wherein the splay-reducing component is a polyester.

Aspect 190: The composition of Aspect 189, wherein the polyester is a poly(alkylene terephthalate).

Aspect 191: The composition of Aspect 189 or 190, wherein the poly(alkylene terephthalate) comprises PET or PBT, or a combination thereof.

Aspect 192: The composition of Aspect 189 or 190, wherein the poly(alkylene terephthalate) comprises PET.

Aspect 193: The composition of any of Aspects 190-192, The composition of any of Aspects 20, wherein the poly (alkylene terephthalate) component is present in an amount from about 2 wt % to about 8 wt %.

Aspect 194: The composition of any of Aspects 179-191, further comprising an impact modifier component.

Aspect 195: The composition of Aspect 194, wherein the impact modifier component comprises one more of an acrylonitrile butadiene styrene ("ABS") copolymer, a methacrylate butadiene styrene ("MBS") copolymer, a bulk polymerized ABS ("BABS") copolymer, or a silicone graft copolymer.

Aspect 196: The composition of Aspect 194 or 195, wherein the impact modifier component is an ABS copolymer.

Aspect 197: The composition of Aspect 196, wherein the ABS copolymer is a bulk polymerized ABS copolymer.

Aspect 198: The composition of Aspect 194 or 195, wherein the impact modifier component is a MBS copolymer.

Aspect 199: The composition of any of Aspects 194-198, wherein the impact modifier is present in an amount from about 10 wt % to about 25 wt %.

Aspect 200: The composition of Aspect 194 or 195, wherein the impact modifier component is a silicon graft copolymer.

Aspect 201: The composition of Aspect 200, wherein the silicon graft copolymer is present in an amount from about 2 wt % to about 10 wt %.

Aspect 202: The composition of any of Aspects 179-201, wherein the filler component is talc.

Aspect 203: The composition of Aspect 202, wherein the talc has an average particle size of about 0.2 to about 2 μm.

Aspect 204: The composition of any of Aspects 179-203, further comprising at least one polymer additive comprising a flame retardant, a colorant, a primary anti-oxidant, or a secondary anti-oxidant.

Aspect 205: A blended polycarbonate composition with improved surface characteristics comprising: (a) from about 30 wt % to about 85 wt % of a polycarbonate component; (b) from about 1 wt % to about 10 wt % of a poly(alkylene terephthalate) component; (c) from about 10 wt % to about 30 wt % of an impact modifier component; and (d) from about 5 wt % to about 25 wt % of a filler component; wherein all weight percent values are based on the total weight of the composition; and wherein the composition exhibits a splay less than that of that of a reference composition consisting essentially of substantially the same proportions of the same polycarbonate component, the same impact modifier component, and the same filler component.

Aspect 206: An article comprising the composition of any of Aspects 179-205.

Aspect 207: The article of Aspect 206, wherein the article is used in aeronautical applications.

Aspect 208: The article of Aspect 206, wherein the article is used in automotive applications.

Aspect 209: The article of Aspect 208, wherein the article comprises instrument panels, overhead consoles, interior trim, center consoles, panels, quarter panels, rocker panels, trim, fenders, doors, deck lids, trunk lids, hoods, bonnets, roofs, bumpers, fascia, grilles, minor housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, or running boards.

Aspect 210: The article of Aspect 206, wherein the article is used in public transportation applications.

Aspect 211: The article of Aspect 210, wherein the public transportation application comprises an airplane, train, subway, or bus.

Without further elaboration, it is believed that one skilled in the art can, using the description herein, utilize the present invention. The following examples are included to provide addition guidance to those skilled in the art of practicing the claimed invention. The examples provided are merely representative of the work and contribute to the teaching of the present invention. Accordingly, these examples are not intended to limit the invention in any manner.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein can be different from the actual publication dates, which can require independent confirmation.

Example

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

The materials shown in Table 1 were used to prepare the compositions described and evaluated herein.

TABLE 1

| Item | Description | Supplier |
|------|-------------|----------|
| PC1 | BPA polycarbonate resin made by the interfacial process with an MVR at 300° C./1.2 kg, of 5.6-6.2 g/10 min with a weight average molecular weight (Mw) of about 30,500 g/mol determined on a polycarbonate standard basis. | SABIC-Innovative Plastics ("SABIC I.P.") |
| PC2 | BPA polycarbonate resin made by the interfacial process with an MVR at 300° C./1.2 kg, of 26.9-32.8 g/10 min with a weight average molecular weight (Mw) of about 21,800 g/mol determined on a polycarbonate standard basis. | SABIC I.P. |
| PC3 | BPA polycarbonate resin made by the interfacial process with an MVR at 300° C./1.2 kg, of 82-144 g/10 min with a weight average molecular weight (Mw) of about 18,800 g/mol determined on a polycarbonate standard basis. | SABIC IP |
| PC4 | BPA polycarbonate resin made by the melt process with an MVR at 300° C./1.2 kg, of 5.1-6.9 g/10 min with a weight average molecular weight (Mw) of about 30,500 g/mol determined on a polycarbonate standard basis. | SABIC IP |
| PC5 | BPA polycarbonate resin made by the melt process with an MVR at 300° C./1.2 kg, of 23.5-28.5 g/10 min with a weight average molecular weight (Mw) of about 22,300 g/mol determined on a polycarbonate standard basis. | SABIC IP |
| PET | PET sold under the trade name Vorcalor 9921W with an intrinsic viscosity of about 0.8 dl/gm. | Indorama Polymers |
| PBT | Polybutyleneterephthalate with a weight average molecular weight (Mw) of about 110000 dalton. | SABIC I.P. |
| ITR-PC1 | ITR (Isophthalic acid-terephthalic acid-resorcinol) - bisphenol A copolyestercarbonate copolymer, ester content 83 mol %, interfacial polymerization, $M_w$ about 21,000 g/mol, para-cumyl phenol end-capped. | SABIC IP |
| ITR-PC2 | ITR (Isophthalic acid-terephthalic acid-resorcinol) - bisphenol A copolyestercarbonate copolymer, ester content 19 mol %, interfacial polymerization, $M_w$ about 30,200 g/mol, para-cumyl phenol end-capped. | SABIC IP |
| PCCD | 1,4cyclohexanedicarboxylic acid, polymer with 1,4-cyclohexanedimethanol. | SABIC I.P. |
| PCTG | Polycyclohexaneterephthalate, 80% 1,4-cyclohexanedimethanol (CHDM) and 20% ethylene glycol (EG) as alcohols. | Eastman Chemical |
| PPC | Poly(phthalate-carbonate) copolymer, produced via interfacial polymerization, about 81 mol % ester units, Mw about 28,500 g/mol as determined via GPC using polycarbonate standards, para-cumylphenol (PCP) end-capped. | SABIC IP |

TABLE 1-continued

| Item | Description | Supplier |
|---|---|---|
| PC-PS1 | PDMS (polydimethylsiloxane) - Bisphenol A Polycarbonate copolymer, produced via interfacial polymerization, 6 wt. % siloxane containing eugenol endcaps, average PDMS block length of 45 units (D45), Mw about 23,000 g/mol as determined by GPC using polycarbonate standards, para-cumylphenol (PCP) end-capped. | SABIC IP |
| PC-PS2 | PDMS (polydimethylsiloxane) - Bisphenol A Polycarbonate copolymer, produced via interfacial polymerization, 20 wt. % siloxane containing eugenol end-caps, average PDMS block length of 45 units (D45), Mw about 30,000 g/mol as determined by GPC using polycarbonate standards, para-cumylphenol (PCP) end-capped. | SABIC IP |
| MR1 | Kane Ace MR01; Siloxane-Acrylic ester copolymer. | Kaneka |
| BABS | Bulk ABS with a butadiene content of about 16 wt %. | SABIC IP |
| TALC1 | Uncoated micronized talc (magnesium silicate hydrate) with a mean particle size of 0.8 microns. Sold under the trade name Jefine ® 3CA talc. | Imerys |
| TALC2 | Surface-modified talc (magnesium silicate hydrate) with a mean particle size of 1.8 microns. Sold under the trade name Luzenac ® R7. | Imerys |
| ADD | Additive package comprising a primary antioxidant, e.g. a hindered phenol such as 3-(3',5'-di-tert-Butyl-4'-hydroxyphenyl)propionic acid stearyl ester (CAS 2082-79-3; e.g. product available under the trade name IRGANOX ™ 1076, Ciba); a second anti-oxidant, e.g. an aryl phosphite such as the product available under the trade name IRGAFOS ™ 168 (Ciba); a stabilizer, e.g. phosphoric acid; a mold release agent, e.g. PETS; and a colorant, e.g. carbon black. | — |

In each of the examples, sample batches (5 kg) were prepared by pre-blending all constituents in a dry-blend and paint shake for two minutes. The pre-blend was fed directly to a co-rotation twin screw extruder (25 mm) at a nominal melt temperature of 260° C., (700 mm) of mercury vacuum, and 300 rpm. The extrudate was pelletized and dried at about 100° C. for about 4 hours. To make test specimens, the dried pellets were injection molded to form appropriate test samples.

Izod notched impact Strength ('INI') was used to compare the impact resistances of plastic materials and was determined in accordance with ISO 180. The ISO results are defined as the impact energy in joules used to break the test specimen, divided by the specimen area at the notch. Results are reported in kJ/m².

Instrumented Impact (dart impact or multiaxial "MA" impact) Energy was determined per ASTM D3763, determined using a 4-inch (10 cm) diameter, 3.2 millimeter (mm)-thick disk at a specified temperature, ½-inch (12.7 mm) diameter dart, and an impact velocity of 2.2 meters per second (m/s) and 6.6 m/s as indicated at a temperature of 23° C. Ductility is reported as the percentage of ten samples which, upon failure in the impact test (ASTM D3763), exhibited a ductile failure rather than rigid failure, the latter being characterized by cracking and the formation of shards.

Splay was determined by scanning a molded article (disk, 80 mm diameter) at 600 DPI using a flat-bed high definition scanner (Epson V750 PRO, Epson Europe B.V., Amsterdam, The Netherlands) and color scanning software Epson Scan (version V3.81EN; Epson Europe B.V.). The images obtained were analyzed using ImageJ (version 1.44o; National Institutes of Health, Bethesda, Md., USA). The imagine analysis software, ImageJ, was used to assign to each scanned pixel an L-value based on the lightness of the pixel. The standard deviation of the average L-value (σL) was calculated from the data set, and provides the measure of scatter in L-values for the molded article sample. The splay measurement unit is calculated standard deviation of the average L-value (σL).

Briefly, splay is measured using the images obtained at 600 DPI. ImageJ is able to see how many pixels of the image are black and white. Therefore it gives an L value. The L-value is the value for lightness. The more splay, the more deviation between white and black pixels will appear and thus the higher the scatter in L value. For splay the scatter in L-value is used as measurement unit. The scatter in L-value is the standard deviation of the average L-value (σL).

Melt Volume Rate (MVR) is measured using the Zwick 4106 MVR/MFI machine according to ISO 1133. A polymer melt is forced through a standard 2 mm die under the influence of a defined force and temperature (260° C. and 5 kg or 300° C. 1.2 kg), depending on the test. The measurement unit is the volume of the melt that is forced through the die in ten minutes, given in CC/10 minutes.

Tensile tests are measured according to ISO 527, using a Zwick 2020 tensile-flex robot. For the tensile test 4 mm thick tensile bars are used and conditioned 24 hrs at 50% RH prior to testing.

Flexural tests are measured according to ISO 178, using a Zwick 2020 tensile-flex robot. For the tensile test 4 mm thick impact bars are used and conditioned 24 hrs at 50% RH prior to testing.

Table 2 shows the composition of different polycarbonate blend compositions described herein, including a control blend, labeled "COMP. 1", and example blends of the present invention comprising varied amounts of a high intrinsic viscosity polyethylene terephthalate. As shown in Table 2, in order to have the same overall final composition as the amount of PET was varied, the amount of the impact modifier (BABS) was adjusted accordingly. The blends were prepared as described herein.

TABLE 2*

| No. | Item | COMP. 1 | EX. 1 | EX. 2 | EX. 3 |
|---|---|---|---|---|---|
| 1 | PC1 | 29.93 | 29.93 | 29.93 | 29.93 |
| 2 | PC2 | 29.93 | 29.93 | 29.93 | 29.93 |
| 3 | PET | — | 2.50 | 5.00 | 7.50 |
| 4 | BABS | 22.00 | 19.50 | 17.00 | 14.50 |
| 5 | TALC1 | 15.00 | 15.00 | 15.00 | 15.00 |
| 6 | TALC2 | — | — | — | — |
| 7 | ADD | 3.15 | 3.15 | 3.15 | 3.15 |
| | Total | 100 | 100 | 100 | 100 |

*Amounts provided in terms of percent of total composition (by weight).

Typical strength properties (INI and MAI ductility) and splay values are shown in Table 3. As the data show, the splay level decreased significantly with addition of PET and about a 46-53% reduction in splay was observed when PET was present in an amount of 2.50-7.50 wt %. The reduction in splay value did not change appreciably over the relative amounts of PET shown. The value for INI and MAI ductility also showed a decrease as shown in Table 3.

TABLE 3

| No. | Test | Test Detail | Units | COMP. 1 | EX. 1 | EX. 2 | EX. 3 |
|---|---|---|---|---|---|---|---|
| 1 | SPLAY | — | stdev | 6.5 | 2.8 | 2.1 | 2.8 |
| 2 | INI | Impact, 23° C./ 5.5 J | kJ/m$^2$ | 14.0 | 7.6 | 6.7 | 6.8 |
| 3 | MAI | Ductility, 23° C./ 2.2 m/s | % | 100 | 40 | 40 | 40 |
|   |   | Ductility, 23° C./ 6.6 m/s | % | 100 | 40 | 40 | 40 |

Table 4 shows the composition of different polycarbonate blend compositions described herein, including a control blend, labeled "COMP. 2", and example blends of the present invention comprising varied amounts of a high intrinsic viscosity polyethylene terephthalate (labeled as "EX. 2" and "EX. 4"). It should be noted that EX. 2 in Table 4 is identical to EX. 2 shown in Table 2, but these two were distinct batches prepared separately from one another. As shown in Table 4, in order to have the same overall final composition as the amount of PET was varied, the amount of the impact modifier (BABS) was adjusted accordingly. The blends were prepared as described herein. In addition, the example compositions shown in Table 4 vary the type of talc used: a micronized, fine talc (TALC1 in Table 4) is compared to a surface-treated talc sold under the trade name Luzenac® R7 (TALC2 in Table 4)

TABLE 4*

| No. | Item | COMP. 2 | EX. 2 | EX. 4 |
|---|---|---|---|---|
| 1 | PC1 | 29.93 | 29.93 | 29.93 |
| 2 | PC2 | 29.93 | 29.93 | 29.93 |
| 3 | PET | — | 5.00 | 5.00 |
| 4 | BABS | 22.00 | 17.00 | 17.00 |
| 5 | TALC1 | 15.00 | 15.00 | — |
| 6 | TALC2 | — | — | 15.00 |
| 7 | ADD | 3.15 | 3.15 | 3.15 |
| | Total | 100 | 100 | 100 |

*Amounts provided in terms of percent of total composition (by weight).

Typical strength properties (INI and MAI ductility) and splay values are shown in Table 5. As the data show, the splay level decreased significantly with addition of PET and about a 46-58% reduction in splay was observed when PET was present. The reduction in splay value did not change appreciably with talc type used in the composition. The data show a surprising and robust improvement in INI impact strength when the talc used in the composition was a surface-treated talc such as Luzenac® R7 compared to a non-surface treated talc, Jetfine 3CA. In parallel, the reduction in MAI ductility observed upon addition of PET when in the presence of a non-surface treated talc was completely reversed when PET was added in the presence of a surface-treated talc.

TABLE 5

| No. | Test | Test Detail | Units | COMP. 1 | EX. 2 | EX. 4 |
|---|---|---|---|---|---|---|
| 1 | SPLAY | — | stdev | 6.5 | 2.5 | 3.0 |
| 2 | INI | Impact, 23° C./5.5 J | kJ/m$^2$ | 13.5 | 8.1 | 33.2 |
| 3 | MAI | Ductility, 23° C./2.2 m/s | % | 100 | 40 | 100 |
|   |   | Ductility, 23° C./6.6 m/s | % | 100 | 40 | 100 |

Table 6 shows the composition of different polycarbonate blend compositions described herein, including a control blend, labeled "COMP. 3", and example blends (EX. 5-EX. 11) of the present invention comprising polycarbonates and varied amounts of exemplary splay-reducing components (e.g. PET, PBT, and ITR-PC2). The blends were prepared as described herein.

TABLE 6

| No. | Item | COMP. 3 | EX. 5 | EX. 6 | EX. 7 | EX. 8 |
|---|---|---|---|---|---|---|
| 1 | PC1 | 41.88 | 39.38 | 39.38 | 39.38 | 39.38 |
| 2 | PC2 | 41.88 | 39.38 | 39.38 | 39.38 | 39.38 |
| 3 | PET | — | 5.00 | — | — | — |
| 4 | PBT | — | — | — | — | — |
| 5 | ITR-PC1 | — | — | 5.00 | — | — |
| 6 | PCCD | — | — | — | 5.00 | — |
| 7 | PCTG | — | — | — | — | 5.00 |
| 8 | PPC | — | — | — | — | — |
| 9 | TALC1 | 15.00 | 15.00 | 15.00 | 15.00 | 15.00 |
| 10 | ADD | 1.25 | 1.25 | 1.25 | 1.25 | 1.25 |
| | Total | 100 | 100 | 100 | 100 | 100 |

| No. | Item | EX. 9 | EX. 11 |
|---|---|---|---|
| 1 | PC1 | 39.38 | 39.38 |
| 2 | PC2 | 39.38 | 39.38 |
| 3 | PET | — | — |
| 4 | PBT | — | 5.00 |
| 5 | ITR-PC1 | — | — |
| 6 | PCCD | — | — |
| 7 | PCTG | — | — |
| 8 | PPC | 5.00 | — |
| 9 | TALC1 | 15.00 | 15.00 |
| 10 | ADD | 1.25 | 1.25 |
| | Total | 100 | 100 |

* Amounts provided in terms of percent of total composition (by weight).

The data in Table 7 show various measured properties of the compositions described in Table 6. The data show a profound reduction in splay for compositions EX. 5, EX. 6, and EX. 11, while retaining comparable tensile, flexural, and impact properties compared to the control composition (COMP. 3). Surprisingly, a profound reduction in splay is found for formulations where PET, PBT and ITR-PC1 is used as the splay reducer. These splay reducers are all immiscible with PC. For the examples where no profound reduction in splay is observed (addition of 5% of PCCD, PCTG, PPC), the splay reducer is miscible with PC.

TABLE 7

| No. | Test | Test Detail | Units | COMP. 3 | EX. 5 | EX. 6 | EX. 7 |
|---|---|---|---|---|---|---|---|
| 1 | SPLAY | — | stdev | 8.95 | 2.91 | 3.08 | 9.11 |
|   |   | Reduction* | % | — | 67 | 66 | -2 |
| 2 | MVR | 2.16 kg load | ml/10 min | n.a.[†††] | n.a. | 18 | 23 |
|   |   | 1.2 kg load | ml/10 min | n.a. | n.a. | 10 | 12 |
| 3 | Tensile** | Chord modulus | MPa | 4292 | 4470 | 4216 | 4009 |
|   |   | Stress at yield | MPa | 65 | 67 | 66 | 64 |
|   |   | Stress at break | MPa | 53 | 51 | 52 | 50 |
|   |   | Strain at yield | % | 3.7 | 3.6 | 3.8 | 3.8 |
|   |   | Nominal strain[†] | % | 6.3 | 7.9 | 12.7 | 15.7 |
| 4 | Flexural** | Flexural modulus | MPa | 4107 | 4239 | 4256 | 3849 |
|   |   | Flexural strength | MPa | 104 | 107 | 108 | 100 |
|   |   | Strain at strength | % | 5.5 | 5.3 | 5.5 | 5.6 |
|   |   | Stress at strain[††] | MPa | 94 | 98 | 98 | 89 |
| 5 | INI | Impact strength | kJ/m$^2$ | 5.6 | 5.5 | 5.9 | 7.4 |

| No. | Test | Test Detail | Units | EX. 8 | EX. 9 | EX. 11 |
|---|---|---|---|---|---|---|
| 1 | SPLAY | — | stdev | 7.68 | 8.26 | 4.76 |
|   |   | Reduction* | % | 14 | 8 | 47 |
| 2 | MVR | 2.16 kg load | ml/10 min | 22 | 19 | n.a. |
|   |   | 1.2 kg load | ml/10 min | 12 | 10 | n.a. |
| 3 | Tensile** | Chord modulus | MPa | 4120 | 4180 | n.a. |
|   |   | Stress at yield | MPa | 66 | 65 | n.a. |
|   |   | Stress at break | MPa | 50 | 51 | n.a. |
|   |   | Strain at yield | % | 3.9 | 3.9 | n.a. |
|   |   | Nominal strain[†] | % | 13.0 | 10.1 | n.a. |
| 4 | Flexural** | Flexural modulus | MPa | 3983 | 3906 | n.a. |
|   |   | Flexural strength | MPa | 103 | 102 | n.a. |
|   |   | Strain at strength | % | 5.6 | 5.6 | n.a. |
|   |   | Stress at strain[††] | MPa | 91 | 90 | n.a. |
| 5 | INI | Impact strength | kJ/m$^2$ | 7.2 | 5.8 | n.a. |

*Percent reduction of splay versus the reference example.
**Values are average values of 5 individual sample measurements.
[†]Nominal strain at break.
[††]Stress at 3.5% strain.
[†††]"n.a." indicates value is not available.

Table 8 shows the composition of different polycarbonate blend compositions described herein, including a control blend, labeled "COMP. 4" or "COMP. 5", and example blends (EX. 12-EX. 20) of the present invention comprising polycarbonates and/or polycarbonate-polysiloxane copolymers with varied amounts of exemplary splay-reducing components (e.g. PET and ITR-PC3). The blends were prepared as described herein.

TABLE 8

| No. | Item | COMP. 4 | EX. 12 | COMP. 5 | EX. 14 | EX. 15 |
|---|---|---|---|---|---|---|
| 1 | PC1 | — | — | 26.88 | 24.38 | 24.38 |
| 2 | PC2 | — | — | 26.88 | 24.38 | 24.38 |
| 3 | PET | — | 5.00 | — | 5.00 | — |
| 4 | ITR-PC1 | — | — | — | — | 5.00 |
| 5 | PC-PS1 | 83.75 | 78.75 | 30.00 | 30.00 | 30.00 |
| 6 | PC-PS2 | — | — | — | — | — |
| 7 | MR1 | — | — | — | — | — |
| 8 | TALC1 | 15.00 | 15.00 | 15.00 | 15.00 | 15.00 |
| 9 | ADD | 1.25 | 1.25 | 1.25 | 1.25 | 1.25 |
| Total | | 100 | 100 | 100 | 100 | 100 |

| No. | Item | COMP. 6 | EX. 16 | COMP. 7 | EX. 18 | COMP. 8 | EX. 20 |
|---|---|---|---|---|---|---|---|
| 1 | PC1 | 36.88 | 34.38 | 36.88 | 34.38 | 40.63 | 38.13 |
| 2 | PC2 | 36.88 | 34.38 | 36.88 | 34.38 | 40.63 | 38.13 |
| 3 | PET | — | 5.00 | — | 5.00 | — | 5.00 |
| 4 | ITR-PC1 | — | — | — | — | — | — |
| 5 | PC-PS1 | 10.00 | 10.00 | — | — | — | — |
| 6 | PC-PS2 | — | — | 10.00 | 10.00 | — | — |
| 7 | MR1 | — | — | — | — | 2.50 | 2.50 |
| 8 | TALC1 | 15.00 | 15.00 | 15.00 | 15.00 | 15.00 | 15.00 |
| 9 | ADD | 1.25 | 1.25 | 1.25 | 1.25 | 1.25 | 1.25 |
| Total | | 100 | 100 | 100 | 100 | 100 | 100 |

* Amounts provided in terms of percent of total composition (by weight).

The data in Table 9 show various measured properties of the compositions described in Table 8. The data show a profound reduction (45-76%) in splay for exemplary compositions EX. 12, EX. 14, EX. 15, EX. 16, EX. 18, and EX. 20, while retaining comparable tensile, flexural, and impact properties compared to the control composition (COMP. 4 5, 6, 7 or 8 as appropriate). Moreover, the exemplary compositions with significant reduction in splay also retained commercially useful flow properties. The data show that the unexpected splay-reduction properties of exemplary splay-reducing components, such as PET or ITR-PC1, reduce splay in formulations comprising polycarbonate, polycarbonate/polycarbonate-polysiloxane copolymer mixtures, or polycarbonate-polysiloxane copolymers.

TABLE 9

| No. | Test | Test Detail | Units | COMP. 4 | EX. 12 | COMP. 5 | EX. 14 |
|---|---|---|---|---|---|---|---|
| 1 | SPLAY | — | stdev | 11.05 | 3.57 | 10.27 | 2.42 |
|   |   | Reduction* | % | — | 68 | — | 76 |
| 2 | MVR | 2.16 kg load | ml/10 min | 29 | 23 | n.a.[†††] | 23 |
|   |   | 1.2 kg load | ml/10 min | 15 | 11 | n.a. | 12 |
| 3 | Tensile** | Chord modulus | MPa | 3672 | 3949 | 3970 | 4137 |
|   |   | Stress at yield | MPa | 56 | 61 | 59 | 65 |
|   |   | Stress at break | MPa | 50 | 54 | 45 | 52 |
|   |   | Strain at yield | % | 3.4 | 3.4 | 3.7 | 3.7 |
|   |   | Nominal strain[†] | % | 5.1 | 5.7 | 7.0 | 6.4 |
| 4 | Flexural** | Flexural modulus | MPa | 3568 | 3704 | 3883 | 3792 |
|   |   | Flexural strength | MPa | 88 | 94 | 96 | 100 |
|   |   | Strain at strength | % | 5.3 | 5.3 | 5.5 | 5.5 |
|   |   | Stress at strain[††] | MPa | 81 | 87 | 87 | 90 |
| 5 | INI | Impact strength | kJ/m$^2$ | 6.4 | 5.7 | 7.9 | 5.7 |

| No. | Test | Test Detail | Units | EX. 15 | COMP. 6 | EX. 16 | EX. 17 |
|---|---|---|---|---|---|---|---|
| 1 | SPLAY | — | stdev | 4.04 | 10.52 | 3.77 | 13.16 |
|   |   | Reduction* | % | 61 | — | 64 | — |
| 2 | MVR | 2.16 kg load | ml/10 min | 19 | n.a. | 23 | 15 |
|   |   | 1.2 kg load | ml/10 min | 11 | n.a. | 12 | 8 |
| 3 | Tensile** | Chord modulus | MPa | 3869 | 4165 | 4262 | 3801 |
|   |   | Stress at yield | MPa | 61 | 61 | 67 | 56 |
|   |   | Stress at break | MPa | 47 | 48 | 50 | 50 |
|   |   | Strain at yield | % | 3.7 | 3.7 | 3.7 | 4.0 |
|   |   | Nominal strain[†] | % | 9.3 | 10.3 | 7.5 | 71.6 |
| 4 | Flexural** | Flexural modulus | MPa | 3760 | 3970 | 3969 | 3629 |
|   |   | Flexural strength | MPa | 96 | 99 | 105 | 90 |
|   |   | Strain at strength | % | 5.6 | 5.5 | 5.5 | 5.7 |
|   |   | Stress at strain[††] | MPa | 85 | 90 | 94 | 79 |
| 5 | INI | Impact strength | kJ/m$^2$ | 8.9 | 7.2 | 5.5 | 24.8 |

| No. | Test | Test Detail | Units | EX. 18 | COMP. 8 | EX. 20 |
|---|---|---|---|---|---|---|
| 1 | SPLAY | — | stdev | 6.36 | 8.92 | 4.89 |
|   |   | Reduction* | % | 52 | — | 45 |
| 2 | MVR | 2.16 kg load | ml/10 min | 18 | 11 | 12 |
|   |   | 1.2 kg load | ml/10 min | 9 | 4 | 5 |
| 3 | Tensile** | Chord modulus | MPa | 4098 | 4118 | 4148 |
|   |   | Stress at yield | MPa | 62 | 58 | 61 |
|   |   | Stress at break | MPa | 46 | 48 | 49 |
|   |   | Strain at yield | % | 3.6 | 3.7 | 3.6 |
|   |   | Nominal strain[†] | % | 20.0 | 50.8 | 23.6 |
| 4 | Flexural** | Flexural modulus | MPa | 3861 | 3949 | 3928 |
|   |   | Flexural strength | MPa | 97 | 93 | 96 |
|   |   | Strain at strength | % | 5.5 | 5.5 | 5.5 |
|   |   | Stress at strain[††] | MPa | 88 | 85 | 88 |
| 5 | INI | Impact strength | kJ/m$^2$ | 6.5 | 29.6 | 6.6 |

*Percent reduction of splay versus the reference example.
**Values are average values of 5 individual sample measurements.
[†]Nominal strain at break.
[††]Stress at 3.5% strain.
[†††]"n.a." indicates value is not available.

Table 10 shows the composition of different polycarbonate blend compositions described herein, including a control blend, labeled "COMP. 9", and example blends (EX. 21-EX. 26) of the present invention comprising blends of polycarbonates and polycarbonate-polysiloxane copolymers with varied amounts of an exemplary splay-reducing component (PET). The blends were prepared as described herein.

TABLE 10

| No. | Item | COMP. 9 | EX. 21 | EX. 22 | EX. 23 | EX. 24 |
|---|---|---|---|---|---|---|
| 1 | PC1 | 26.88 | 26.63 | 26.38 | 25.88 | 25.38 |
| 2 | PC2 | 26.88 | 26.63 | 26.38 | 25.88 | 25.38 |
| 3 | PET | — | 0.50 | 1.00 | 2.00 | 3.00 |
| 4 | PC-PS1 | 30.00 | 30.00 | 30.00 | 30.00 | 30.00 |
| 5 | TALC1 | 15.00 | 15.00 | 15.00 | 15.00 | 15.00 |
| 6 | ADD | 1.25 | 1.25 | 1.25 | 1.25 | 1.25 |
| Total |  | 100 | 100 | 100 | 100 | 100 |

TABLE 10-continued

| No. | Item | EX. 25 | EX. 26 |
|---|---|---|---|
| 1 | PC1 | 24.38 | 23.38 |
| 2 | PC2 | 24.38 | 23.38 |
| 3 | PET | 5.00 | 7.00 |
| 4 | PC-PS1 | 30.00 | 30.00 |
| 5 | TALC1 | 15.00 | 15.00 |
| 6 | ADD** | 1.25 | 1.25 |
| Total |  | 100 | 100 |

*Amounts provided in terms of percent of total composition (by weight).

The data in Table 11 show various measured properties of the compositions described in Table 10. The data show a profound reduction in splay for compositions EX. 24, EX. 25, and EX. 26, while retaining comparable tensile, flexural, and impact properties compared to the control composition (COMP. 6).

TABLE 11

| No. | Test | Test Detail | Units | COMP. 9 | EX. 21 | EX. 22 | EX. 23 |
|---|---|---|---|---|---|---|---|
| 1 | SPLAY | — | stdev | 10.27 | 9.64 | 9.39 | 5.76 |
|   |   | Reduction* | % | — | 6 | 9 | 44 |
| 2 | MVR | 2.16 kg load | ml/10 min | n.a. | n.a.[†††] | n.a. | n.a. |
|   |   | 1.2 kg load | ml/10 min | n.a. | n.a. | n.a. | n.a. |
| 3 | Tensile** | Chord modulus | MPa | 3970 | n.a. | n.a. | n.a. |
|   |   | Stress at yield | MPa | 59 | n.a. | n.a. | n.a. |
|   |   | Stress at break | MPa | 45 | n.a. | n.a. | n.a. |
|   |   | Strain at yield | % | 3.7 | n.a. | n.a. | n.a. |
|   |   | Nominal strain[†] | % | 7.0 | n.a. | n.a. | n.a. |
| 4 | Flexural** | Flexural modulus | MPa | 3883 | n.a. | n.a. | n.a. |
|   |   | Flexural strength | MPa | 96 | n.a. | n.a. | n.a. |
|   |   | Strain at strength | % | 5.5 | n.a. | n.a. | n.a. |
|   |   | Stress at strain[††] | MPa | 87 | n.a. | n.a. | n.a. |
| 5 | INI | Impact strength | kJ/m$^2$ | 7.9 | n.a. | n.a. | n.a. |

| No. | Test | Test Detail | Units | EX. 24 | EX. 25 | EX. 26 |
|---|---|---|---|---|---|---|
| 1 | SPLAY | — | stdev | 3.54 | 2.42 | 3.15 |
|   |   | Reduction* | % | 66 | 76 | 69 |
| 2 | MVR | 2.16 kg load | ml/10 min | n.a. | 23 | n.a. |
|   |   | 1.2 kg load | ml/10 min | n.a. | 12 | n.a. |
| 3 | Tensile** | Chord modulus | MPa | 4127 | 4137 | 4124 |
|   |   | Stress at yield | MPa | 65 | 65 | 66 |
|   |   | Stress at break | MPa | 52 | 52 | 53 |
|   |   | Strain at yield | % | 3.5 | 3.7 | 3.6 |
|   |   | Nominal strain[†] | % | 5.5 | 6.4 | 6.0 |
| 4 | Flexural** | Flexural modulus | MPa | 3852 | 3792 | 3980 |
|   |   | Flexural strength | MPa | 101 | 100 | 103 |
|   |   | Strain at strength | % | 5.6 | 5.5 | 5.4 |
|   |   | Stress at strain[††] | MPa | 90 | 90 | 93 |
| 5 | INI | Impact strength | kJ/m$^2$ | 5.8 | 5.7 | 7.4 |

*Percent reduction of splay versus the reference example.
**Values are average values of 5 individual sample measurements.
[†]Nominal strain at break.
[††]Stress at 3.5% strain.
[†††]"n.a." indicates value is not available.

Table 12 shows the composition of different polycarbonate blend compositions described herein, including a control blend, labeled "COMP. 7", and example blends (EX. 27-EX. 32) of the present invention comprising different polycarbonate types (e.g. low flow vs. high flow; interfacial vs. melt polycarbonates) with varied amounts of an exemplary splay-reducing component (PET). The blends were prepared as described herein.

TABLE 12

| No. | Item | COMP. 10 | EX. 27 | COMP. 11 | EX. 29 | EX. 30 |
|---|---|---|---|---|---|---|
| 1 | PC1 | 10.00 | 10.00 | 26.88 | 24.38 | — |
| 2 | PC2 | — | — | — | — | — |
| 3 | PC3 | — | — | — | — | 48.75 |
| 4 | PC4 | 16.88 | 14.38 | 26.88 | 24.38 | — |
| 5 | PC5 | 26.88 | 24.38 | — | — | — |
| 6 | PET | — | 5.00 | — | 5.00 | 5.00 |
| 7 | PC-PS1 | 30.00 | 30.00 | 30.00 | 30.00 | 30.00 |
| 8 | TALC1 | 15.00 | 15.00 | 15.00 | 15.00 | 15.00 |
| 9 | ADD | 1.25 | 1.25 | 1.25 | 1.25 | 1.25 |
| Total | | 100 | 100 | 100 | 100 | 100 |

| No. | Item | EX. 31 | EX. 32 |
|---|---|---|---|
| 1 | PC1 | — | 48.75 |
| 2 | PC2 | 48.75 | — |
| 3 | PC3 | — | — |
| 4 | PC4 | — | — |
| 5 | PC5 | — | — |
| 6 | PET | 5.00 | 5.00 |
| 7 | PC-PS1 | 30.00 | 30.00 |
| 8 | TALC1 | 15.00 | 15.00 |
| 9 | ADD** | 1.25 | 1.25 |
| Total | | 100 | 100 |

*Amounts provided in terms of percent of total composition (by weight).

The data in Table 13 show various measured properties of the compositions described in Table 12. The data show a profound reduction (41-67%) in splay for compositions EX. 27 and EX. 29-32, while retaining comparable tensile, flexural, and impact properties compared to the control composition (COMP. 7). Thus, the unexpected reduction in splay demonstrated by the incorporation of a splay-reducing component such as PET in blended thermoplastic compositions appears to translate to multiple polycarbonate types with varied flow properties (e.g. high vs. low flow polycarbonates) or preparation method (e.g. interfacial vs. melt polymerization).

TABLE 13

| No. | Test | Test Detail | Units | COMP. 10 | EX. 27 | COMP. 11 | EX. 29 |
|---|---|---|---|---|---|---|---|
| 1 | SPLAY | — | stdev | 7.03 | 2.98 | 10.27 | 2.42 |
|   |   | Reduction* | % | — | 58 | — | 66 |
| 2 | MVR | 2.16 kg load | ml/10 min | 21 | 21 | n.a.††† | 23 |
|   |   | 1.2 kg load | ml/10 min | 11 | 11 | n.a. | 12 |
| 3 | Tensile** | Chord modulus | MPa | 3907 | 4095 | 3970 | 4137 |
|   |   | Stress at yield | MPa | 61 | 65 | 59 | 65 |
|   |   | Stress at break | MPa | 47 | 50 | 45 | 52 |
|   |   | Strain at yield | % | 3.7 | 3.6 | 3.7 | 3.7 |
|   |   | Nominal strain† | % | 16.1 | 6.7 | 7.0 | 6.4 |
| 4 | Flexural** | Flexural modulus | MPa | 3827 | 3927 | 3883 | 3792 |
|   |   | Flexural strength | MPa | 98 | 102 | 96 | 100 |
|   |   | Strain at strength | % | 5.5 | 5.5 | 5.5 | 5.5 |
|   |   | Stress at strain†† | MPa | 87 | 92 | 87 | 90 |
| 5 | INI | Impact strength | kJ/m² | 6.6 | 6.0 | 7.9 | 5.7 |

| No. | Test | Test Detail | Units | EX. 30 | EX. 31 | EX. 32 |
|---|---|---|---|---|---|---|
| 1 | SPLAY | — | stdev | 2.95 | 2.33 | 4.15 |
|   |   | Reduction* | % | 58 | 67 | 41 |
| 2 | MVR | 2.16 kg load | ml/10 min | n.a. | n.a. | n.a. |
|   |   | 1.2 kg load | ml/10 min | n.a. | n.a. | n.a. |
| 3 | Tensile** | Chord modulus | MPa | 3996 | 4017 | 4144 |
|   |   | Stress at yield | MPa | 64 | 64 | 67 |
|   |   | Stress at break | MPa | 57 | 61 | 51 |
|   |   | Strain at yield | % | 3.5 | 3.5 | 3.7 |
|   |   | Nominal strain† | % | 4.8 | 4.7 | 8.3 |
| 4 | Flexural** | Flexural modulus | MPa | 3909 | 3823 | 3882 |
|   |   | Flexural strength | MPa | 101 | 101 | 103 |
|   |   | Strain at strength | % | 5.4 | 5.6 | 5.6 |
|   |   | Stress at strain†† | MPa | 92 | 91 | 92 |
| 5 | INI | Impact strength | kJ/m² | 6.6 | 4.2 | 8.0 |

*Percent reduction of splay versus the reference example.
**Values are average values of 5 individual sample measurements.
†Nominal strain at break.
††Stress at 3.5% strain.
†††"n.a." indicates value is not available.

The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A blended polycarbonate composition with improved surface characteristics comprising:
    (a) from about 55 wt % to about 94 wt % of a polycarbonate component comprising a polycarbonate polymer, a poly(carbonate-siloxane) copolymer, or a combination thereof;
    (b) from greater than 1 wt % to about 10 wt % of a splay-reducing component; and
    (c) from about 5 wt % to about 25 wt % of a filler component;
    wherein all weight percent values are based on the total weight of the composition;
    wherein the splay-reducing component is not fully miscible with the polycarbonate component; and
    wherein the composition exhibits a splay at least about 30% less than a splay of a reference composition consisting essentially of from about 55 wt % to about 94 wt % of a polycarbonate component comprising a polycarbonate polymer, a poly(carbonate-siloxane) copolymer, or a combination thereof and from about 5 wt % to about 25 wt % of a filler component.

2. The composition of claim 1, wherein splay is determined by scanning a molded article using a flat-bed high definition scanner and each pixel is assigned a black/white value (or L-value); and wherein the splay value for the article is the standard deviation for the L-values calculated for the ensemble data set of L-values.

3. The composition of claim 1, wherein the composition further exhibits an Izod notched impact strength of at least about 6.0 kJ/m² determined in accordance with ISO 180.

4. The composition of claim 1, wherein the polycarbonate polymer comprises a linear polycarbonate homopolymer comprising repeating units of the formula:

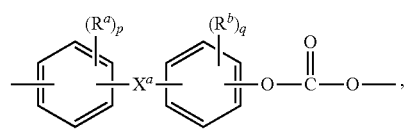

wherein each occurrence of $R^a$ and $R^b$ is independently a C1-12 alkyl group, C1-12 alkenyl, C3-8 cycloalkyl, or C1-12 alkoxy;
wherein p and q are each independently integers of 0 to 4; and
wherein $X^a$ is a single bond, —O—, —S—, —S(O)—, —S(O)$_2$—, —C(O)—, a C1-11 alkylidene of formula $C(R^c)(R^d)$—;
wherein $R^c$ and $R^d$ are each independently hydrogen or C1-10 alkyl, or a group of the formula —C(=$R^e$)—;
wherein $R^e$ is a divalent C1-10 hydrocarbon group.

5. The composition of claim 4, wherein the linear polycarbonate homopolymer comprises bisphenol A carbonate units.

6. The composition of claim 4, wherein the linear polycarbonate homopolymer is made via an interfacial polymerization process.

7. The composition of claim 4, wherein the linear polycarbonate homopolymer is made via a melt polymerization process.

8. The composition of claim 1, wherein the poly(carbonate-siloxane) copolymer comprises first repeating units and second repeating units;
wherein the first repeating units are bisphenol carbonate units of the formula:

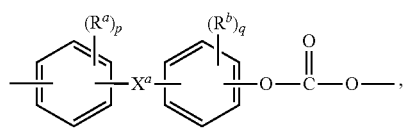

wherein each occurrence of $R^a$ and $R^b$ is independently a C1-12 alkyl group, C1-12 alkenyl, C3-8 cycloalkyl, or C1-12 alkoxy;
wherein p and q are each independently integers of 0 to 4; and
wherein $X^a$ is a single bond, —O—, —S—, —S(O)—, —S(O)$_2$—, —C(O)—, a C1-11 alkylidene of formula —C($R^c$)($R^d$)—;
wherein $R^c$ and $R^d$ are each independently hydrogen or C1-10 alkyl, or a group of the formula —C(=$R^e$)—;
wherein $R^e$ is a divalent C1-10 hydrocarbon group; and
wherein the second repeating units are siloxane units of the formula:

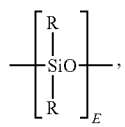

wherein each occurrence of R is independently a C1-13 monovalent hydrocarbon group; and
wherein E has an average value of 2 to 200.

9. The composition of claim 8, wherein the siloxane units are a combination of one or more units of the formula:

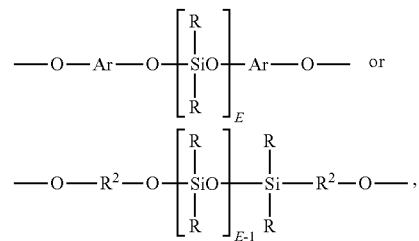

wherein each occurrence of R is independently a C1-C13 monovalent hydrocarbon group;
wherein each occurrence of Ar is independently a C6-C30 aromatic group;
wherein each occurrence of $R^2$ is independently a C2-C8 alkylene group; and
wherein E has an average value of 2 to 200.

10. The composition of claim 8, wherein the siloxane units are a combination of one or more units of the formula:

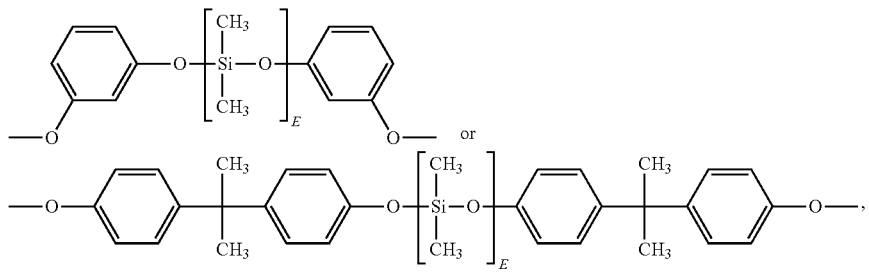

wherein E has an average value of 2 to 200.

11. The composition of claim 8, wherein the siloxane units are the formula:

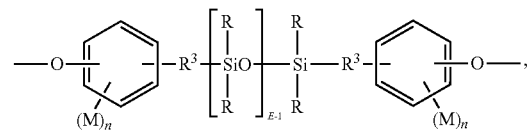

wherein each occurrence of R is independently a C1-C13 monovalent hydrocarbon group;
wherein each occurrence of $R^3$ is independently a divalent C1-C8 aliphatic group;
wherein each occurrence of M is independently a halogen, cyano, nitro, C1-8 alkylthio, C1-8 alkyl, C1-8 alkoxy, C2-8 alkenyl, C2-8 alkenyloxy group, C3-8 cycloalkyl, C3-8 cycloalkoxy, C6-10 aryl, C6-10 aryloxy, C7-12 arylalkyl, C7-12 arylalkoxy, C7-12 alkylaryl, or C7-12 alkylaryloxy, or a combination comprising at least one of the foregoing;
wherein each occurrence of n is independently 0, 1, 2, 3, or 4; and
wherein E has an average value of 2 to 200.

12. The composition of claim 8, wherein the siloxane units are a combination of one or more units of the formula:

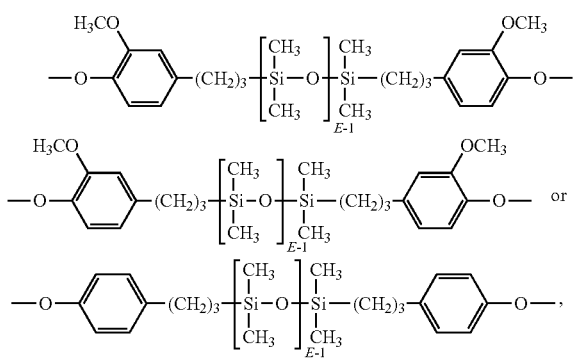

wherein E has an average value of 2 to 200.

13. The composition of claim 12, wherein E has an average value of 5 to 120.

14. The composition of claim 1, wherein the splay-reducing component is present in an amount from about 2 wt % to about 8 wt %.

15. The composition of claim 1, wherein the splay-reducing component comprises a polyester polymer, an (isophthalic acid-terephthalic acid-resorcinol)-bisphenol A copolyestercarbonate copolymer, or combinations thereof.

16. The composition of claim 15, wherein the splay-reducing component is an (isophthalic acid-terephthalic acid-resorcinol)-bisphenol A copolyestercarbonate copolymer.

17. The composition of claim 15, wherein the splay-reducing component is a polyester.

18. The composition of claim 17, wherein the polyester is a poly(alkylene terephthalate).

19. The composition of claim 18, wherein the poly(alkylene terephthalate) comprises PET or PBT, or a combination thereof.

20. The composition of claim 19, wherein the poly(alkylene terephthalate) comprises PET.

21. The composition of claim 18, wherein the poly(alkylene terephthalate) component is present in an amount from about 2 wt % to about 8 wt %.

22. The composition of claim 1, further comprising an impact modifier component.

23. The composition of claim 22, wherein the impact modifier component comprises one more of an acrylonitrile butadiene styrene ("ABS") copolymer, a methacrylate butadiene styrene ("MBS") copolymer, a bulk polymerized ABS ("BABS") copolymer, or a silicone graft copolymer.

24. The composition of claim 23, wherein the impact modifier component is an ABS copolymer.

25. The composition of claim 24, wherein the ABS copolymer is a bulk polymerized ABS copolymer.

26. The composition of claim 23, wherein the impact modifier component is a MBS copolymer.

27. The composition of claim 22, wherein the impact modifier component is present in an amount from about 10 wt % to about 25 wt %.

28. The composition of claim 23, wherein the impact modifier component is a silicon graft copolymer.

29. The composition of claim 28, wherein the silicon graft copolymer is present in an amount from about 2 wt % to about 10 wt %.

30. The composition of claim 1, wherein the filler component is talc.

31. The composition of claim 30, wherein the talc has an average particle size of about 0.2 to about 2 µm.

32. The composition of claim 1, further comprising at least one polymer additive comprising a flame retardant, a colorant, a primary anti-oxidant, or a secondary anti-oxidant.

33. A blended polycarbonate composition with improved surface characteristics comprising:
(a) from about 30 wt % to about 85 wt % of a polycarbonate component;
(b) from greater than 1 wt % to about 20 wt % of an (isophthalic acid-terephthalic acid-resorcinol)-bisphenol A copolyestercarbonate copolymer;
(c) from about 10 wt % to about 30 wt % of an impact modifier component; and
(d) from about 5 wt % to about 25 wt % of a filler component;
wherein all weight percent values are based on the total weight of the composition; and
wherein the composition exhibits a splay at least about 30% less than a splay of a reference composition consisting essentially of from about 30 wt % to about 85 wt % of a polycarbonate component comprising a polycarbonate polymer, a poly(carbonate-siloxane) copolymer, or a combination thereof; from about 10 wt % to about 30 wt % of an impact modifier component; and from about 5 wt % to about 25 wt % of a filler component.

34. An article comprising the composition of claim 33.

35. The article of claim 34, wherein the article is used in aeronautical applications.

36. The article of claim 34, wherein the article is used in automotive applications.

37. The article of claim 36, wherein the article comprises instrument panels, overhead consoles, interior trim, center consoles, panels, quarter panels, rocker panels, trim, fenders, doors, deck lids, trunk lids, hoods, bonnets, roofs, bumpers, fascia, grilles, minor housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, or running boards.

38. The article of claim 34, wherein the article is used in public transportation applications.

39. The article of claim 38, wherein the public transportation application comprises an airplane, train, subway, or bus.

40. The composition of claim 33, wherein the impact modifier component comprises one more of an acrylonitrile butadiene styrene ("ABS") copolymer, a methacrylate butadiene styrene ("MBS") copolymer, a bulk polymerized ABS ("BABS") copolymer, or a silicone graft copolymer.

41. An article comprising the composition of claim 1.

* * * * *